United States Patent
Helmick et al.

(10) Patent No.: US 12,452,222 B2
(45) Date of Patent: Oct. 21, 2025

(54) SYSTEMS, METHODS, AND APPARATUS FOR PROTECTION FOR DEVICE DATA TRANSFERS

(71) Applicant: Samsung Electronics Co., Ltd., Suwon-si (KR)

(72) Inventors: Daniel Lee Helmick, Broomfield, CO (US); Jisoo Kim, Seongnam-si (KR); Sang Young Ye, Osan-Si (KR); Eric Hibbard, Sunnyvale, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 142 days.

(21) Appl. No.: 18/224,048

(22) Filed: Jul. 19, 2023

(65) Prior Publication Data
US 2024/0129282 A1 Apr. 18, 2024

Related U.S. Application Data

(60) Provisional application No. 63/415,624, filed on Oct. 12, 2022, provisional application No. 63/415,626, filed on Oct. 12, 2022.

(51) Int. Cl.
*H04L 9/40* (2022.01)
*G06F 21/60* (2013.01)
(Continued)

(52) U.S. Cl.
CPC ........ *H04L 63/0478* (2013.01); *G06F 21/602* (2013.01); *G06F 21/606* (2013.01);
(Continued)

(58) Field of Classification Search
CPC ..... H04L 63/062; H04L 9/008; H04L 9/0891; H04L 9/0894; H04L 63/0428;
(Continued)

(56) References Cited

U.S. PATENT DOCUMENTS

| 6,775,672 B2 | 8/2004 | Mahalingam et al. |
| 8,281,152 B2 | 10/2012 | LeCrone et al. |

(Continued)

FOREIGN PATENT DOCUMENTS

| CN | 111949372 A | 11/2020 |
| CN | 115460229 A | 12/2022 |
| EP | 3193274 B1 | 1/2021 |

OTHER PUBLICATIONS

Anala, M. R., "A Framework for Secure Live Migration of Virtual Machines," 2013 International Conference on Advances in Computing, Communications and Informatics (ICACCI), Oct. 2013, pp. 243-248.

(Continued)

*Primary Examiner* — Shaqueal D Wade-Wright
(74) *Attorney, Agent, or Firm* — Renaissance IP Law Group LLP

(57) ABSTRACT

An apparatus may include a device including a first controller, and a second controller, wherein the device may be configured to receive, using the first controller, data, apply, to the data, a first protection scheme, and send, from the device, using the second controller, the data having a second protection scheme. The first protection scheme and the second protection scheme may be the same. The second controller may be configured to apply, to the data, the second protection scheme. The first protection scheme may include a first salt, and the second protection scheme may include a second salt. The first salt may be determined by the device, and the second salt may be determined by a user. The method may further include applying, at the device, to controller state information for the first controller, a third protection scheme to generate controller state information having the third protection scheme.

20 Claims, 30 Drawing Sheets

(51) Int. Cl.
*G06F 21/62* (2013.01)
*H04L 9/08* (2006.01)
*H04L 9/14* (2006.01)

(52) U.S. Cl.
CPC ............ *G06F 21/62* (2013.01); *H04L 63/062* (2013.01); *H04L 9/0894* (2013.01); *H04L 9/14* (2013.01); *H04L 63/0428* (2013.01)

(58) Field of Classification Search
CPC ....... H04L 63/04; H04L 63/0478; H04L 9/14; G06F 21/606; G06F 21/62; G06F 21/53; G06F 21/602
See application file for complete search history.

(56) References Cited

U.S. PATENT DOCUMENTS

| | | | |
|---|---|---|---|
| 8,458,696 | B2 | 6/2013 | Park et al. |
| 8,627,079 | B2* | 1/2014 | Cizas ................ G06F 21/445 713/169 |
| 8,983,061 | B2* | 3/2015 | Watanabe ............ H04L 63/164 713/168 |
| 9,578,017 | B2 | 2/2017 | Ferguson et al. |
| 9,893,977 | B2 | 2/2018 | Johnsen et al. |
| 10,579,409 | B2 | 3/2020 | Beveridge et al. |
| 10,608,819 | B1* | 3/2020 | Brown ................ G06F 21/74 |
| 10,693,844 | B2 | 6/2020 | Noel et al. |
| 10,831,532 | B2 | 11/2020 | Castet |
| 10,880,205 | B1 | 12/2020 | Puttagunta et al. |
| 11,307,998 | B2* | 4/2022 | Irwin ................ G06F 3/0683 |
| 11,467,776 | B1 | 10/2022 | Chang et al. |
| 2007/0180539 | A1 | 8/2007 | Holtzman et al. |
| 2014/0245098 | A1* | 8/2014 | Sharon ............ H03M 13/2942 714/755 |
| 2014/0281574 | A1* | 9/2014 | Webb ................ H04L 9/0863 713/189 |
| 2017/0161205 | A1 | 6/2017 | Leggette et al. |
| 2020/0278893 | A1 | 9/2020 | Niell et al. |
| 2021/0019172 | A1 | 1/2021 | Patel et al. |
| 2021/0034270 | A1 | 2/2021 | Gupta et al. |
| 2021/0091954 | A1 | 3/2021 | Brown et al. |
| 2021/0132860 | A1 | 5/2021 | Kou et al. |
| 2021/0173685 | A1 | 6/2021 | Tsirkin et al. |
| 2021/0263762 | A1 | 8/2021 | Kachare et al. |
| 2021/0278978 | A1 | 9/2021 | Lee et al. |
| 2021/0334222 | A1 | 10/2021 | Wood |
| 2021/0349841 | A1 | 11/2021 | Makhervaks et al. |
| 2022/0198034 | A1* | 6/2022 | Rodriguez ................ H04L 9/30 |
| 2022/0206842 | A1 | 6/2022 | Sahita et al. |
| 2024/0323007 | A1* | 9/2024 | Nagahara ............ H04L 9/0891 |

OTHER PUBLICATIONS

Dong, Yaozu et al., "SR-IOV Networking in Xen: Architecture, Design and Implementation," Dec. 2021, 7 pages.
Emerick, Ron, "PCI Express IO Virtualization Overview," SNIA, 2012 Storage Networking Industry Association, 2012, 34 pages.
European Extended Search Report for Application No. 23199637.2, mailed Dec. 19, 2023.
European Extended Search Report for Application No. 23199676.0, mailed Dec. 19, 2023.
Hu, Yaohui et al., "Performance Analysis of Encryption in Securing the Live Migration of Virtual Machines," 2015 IEEE 8th International Conference on Cloud Computing, Jul. 2015, pp. 613-620.
Keeriyadath, Sangeeth, "NVMe Virtualization Ideas for Machines on Cloud," SNIA, 2016 Storage Developer Conference, 2016, 33 pages.
Li, Mengyuan, "Understanding and Exploiting Design Flaws of AMD Secure Encrypted Virtualization," Diss. The Ohio State University, 2022, 222 pages.
Merlin, Sengole, et al., "Automated Intelligent Systems for Secure Live Migration," 2018 Second International Conference on Inventive Communication and Computational Technologies (ICICCT), Sep. 2018, pp. 1360-1371.
NVM Express, "NVM Express Base Specification, Revision 2.0a" Jul. 2021, 454 pages.
NVM Express, "NVM Express Over Fabrics Revision 1.1a," Jul. 2021, 84 pages.
NVM Express, "NVMe Over Fabrics—Part Two," Apr. 2021, 7 pages.
NVM Express, "NVMe™ Management Interface (NVMe-MI™) Workgroup Update," Dec. 2022, 25 pages.
Onufryk, Peter, "NVM Express State of the Union," NVM Express, Worldwide Solid-State Storage Forcast, 2022-2026, May 2022, 23 pages.
European Office Action for Application No. 23199637.2, mailed Oct. 16, 2024.
Office Action for U.S. Appl. No. 18/224,047, mailed Jun. 4, 2025.
European Office Action for Application No. 23199676.0, mailed Jan. 13, 2025.
European Office Action for Application No. 23199637.2, mailed Jul. 4, 2025.
European Office Action for Application No. 23199676.0, mailed Sep. 1, 2025.

* cited by examiner

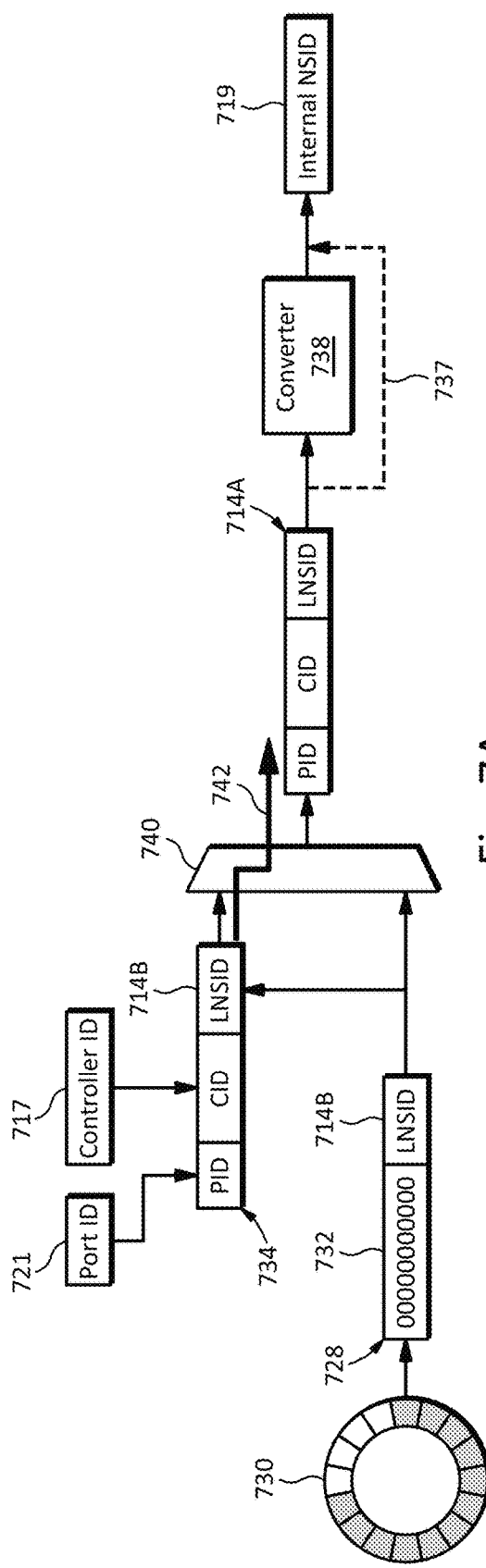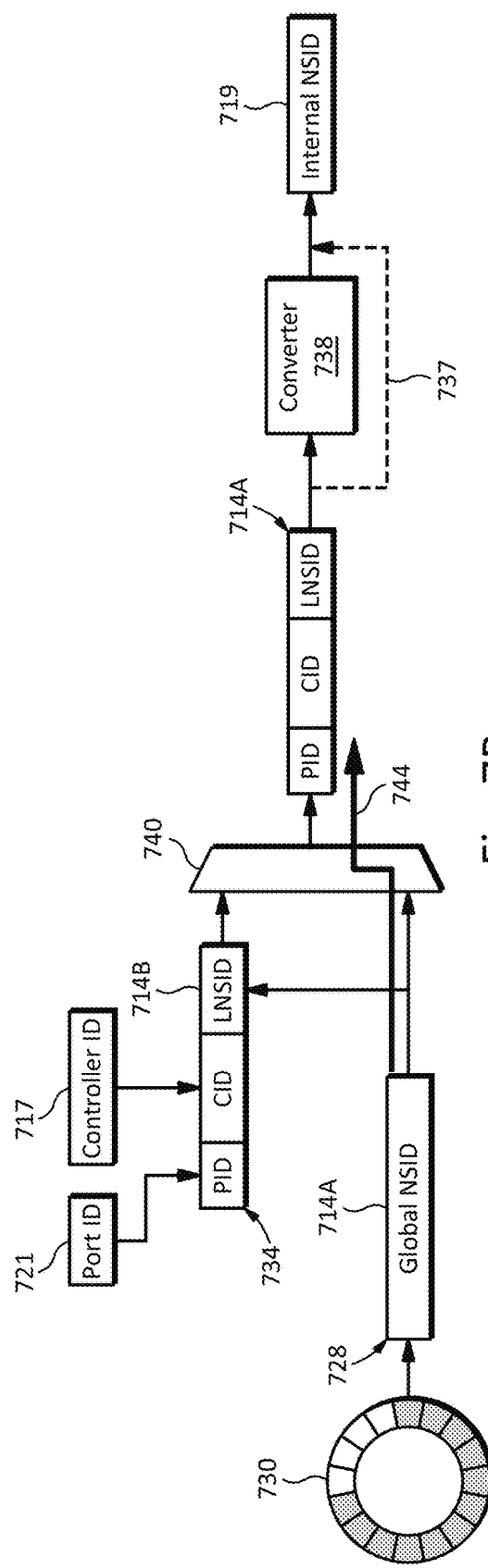

SYSTEMS, METHODS, AND APPARATUS FOR PROTECTION FOR DEVICE DATA TRANSFERS

REFERENCE TO RELATED APPLICATION

This application claims priority to, and the benefit of, U.S. Provisional Patent Applications Ser. No. 63/415,624 filed Oct. 12, 2022 and Ser. No. 63/415,626 filed Oct. 12, 2022, both of which are incorporated by reference.

TECHNICAL FIELD

This disclosure relates generally to data transfers, and more specifically to systems, methods, and apparatus for protection for device data transfers.

BACKGROUND

A processing operation may be relocated for one or more reasons such as availability of resources, power outages, cost, efficiency, and/or the like. For example, a program, an operating system, a virtual machine, and/or the like, using a first set of processing and/or storage resources in a data center may be relocated to use a second set of processing and/or storage resources at a different location within the data center, at a different data center, and/or the like. Relocating a processing operation may involve transferring data such as state information, metadata, user data, and/or the like.

The above information disclosed in this Background section is only for enhancement of understanding of the background of some aspects of the disclosure and therefore it may contain information that does not constitute prior art.

SUMMARY

A method may include performing, by a controller at a device, using a first namespace identifier, a first access of a namespace of the device, and performing, using a second namespace identifier, a second access of the namespace of the device, wherein the second namespace identifier may include first information to determine the first namespace identifier, and second information to identify the controller. The first information may include the first namespace identifier, and the second information may include a controller identifier for the controller. The second namespace identifier may include the first namespace identifier concatenated with the controller identifier. The second namespace identifier may include third information to identify a port associated with the controller. The first information may include the first namespace identifier, the second information may include a controller identifier for the controller, and the third information may include a port identifier for the port. The second namespace identifier may include a concatenation of the first namespace identifier, the controller identifier, and the port identifier. The controller may include a storage protocol controller. The controller may include at least a portion of a communication endpoint. The communication endpoint may include at least a portion of a function of an interconnect interface. The communication endpoint may include at least a portion of a network endpoint. The controller may be a first controller and the second access may be performed by a second controller at the device. The first controller may include a child controller, and the second controller may include a parent controller. The second controller may include a primary controller, and the first controller may include a secondary controller. The first controller may include at least a portion of a first physical function, and the second controller may include at least a portion of a second physical function. The second controller may include at least a portion of a physical function, and the first controller may include at least a portion of a virtual function. The second controller may include at least a portion of a nonvolatile memory (NVM) subsystem, and the first controller may include at least a portion of an exported NVM subsystem based on the NVM subsystem. The first controller may include a secondary controller for a storage protocol, and the second controller may include a primary controller for the storage protocol. The first controller may perform the first access using a data queue. The second controller may perform the second access using an administrative queue. The second controller may perform the second access using a data queue. The first namespace identifier may be determined using at least a first portion of a hardware path, and the second namespace identifier may be determined using at least a second portion of the hardware path. The first access may be performed by the controller based on a first privilege, and the second access may be performed by the controller based on a second privilege. The first namespace identifier may be determined using at least a first portion of a hardware path, and the second namespace identifier may be determined using at least a second portion of the hardware path.

An apparatus may include a device including a controller configured to perform, using a first namespace identifier, a first access of a namespace of the device, wherein the device may be configured to perform, using a second namespace identifier, a second access of the namespace of the device, and wherein the second namespace identifier may include first information to determine the first namespace identifier, and second information to identify the controller. The first information may include the first namespace identifier, and the second information may include a controller identifier for the controller. The second namespace identifier may include the first namespace identifier concatenated with the controller identifier. The controller may be a first controller, and the device may further include a second controller configured to perform the second access. The first controller may include a child controller, and the second controller may include a parent controller. The second controller may include a primary controller, and the first controller may include a secondary controller associated. The second controller may include at least a portion of a physical function, and the first controller may include at least a portion of a virtual function. The second namespace identifier may include third information to identify a port associated with the controller. The controller may include a storage protocol controller. The controller may include at least a portion of a communication endpoint. The communication endpoint may include at least a portion of a function of an interconnect interface or at least a portion of a network endpoint. The first controller may include at least a portion of a first physical function, and the second controller may include at least a portion of a second physical function. The second controller may include at least a portion of a nonvolatile memory (NVM) subsystem, and the first controller may include at least a portion of an exported NVM subsystem based on the NVM subsystem. The first controller may include a secondary controller for a storage protocol, and the second controller may include a primary controller for the storage protocol. The controller may be configured to perform the first access based on a first privilege and perform the second access based on a second privilege.

An apparatus may include a first user configured to perform, using a first namespace identifier, a first access of a namespace of a device, and a second user configured to perform, using a second namespace identifier, a second access of the namespace of the device, wherein the second namespace identifier may include first information to determine the first namespace identifier, and second information to identify a controller of the device. The first user may include at least one of a host, a device, a virtual machine, or a virtual machine manager. The first information may include the first namespace identifier, and the second information may include a controller identifier for the controller. The second namespace identifier may include the first namespace identifier concatenated with the controller identifier. The second user may be configured to migrate, using the second access, the first user.

An apparatus may include a device including a first controller, and a second controller, wherein the device may be configured to receive, using the first controller, data, apply, to the data, a first protection scheme, and send, from the device, using the second controller, the data having a second protection scheme. The first protection scheme and the second protection scheme may be the same. The second controller may be configured to apply, to the data, the second protection scheme. The first protection scheme may include a salt. The salt may be a first salt, and the second protection scheme may include a second salt. The first salt may be determined by the device, and the second salt may be determined by a user. The first protection scheme may be based on a first key associated with a first request and a second key associated with a second request. The first protection scheme may be based on a first key associated with a first request and a second key associated with a second request. The first protection scheme may include a first type of encryption, and the second protection scheme may include a second type of encryption. The device may be configured to apply, to controller state information for the first controller, a third protection scheme to generate controller state information having the third protection scheme. The second controller may be configured to send, from the device, the controller state information having the third protection scheme. The third protection scheme may be the same as the first protection scheme or the second protection scheme. The data may be first data and the device may be configured to receive, using the second controller, second data having the second protection scheme, and apply the first protection scheme to the second data.

A method may include receiving, at a device, using a first controller, data, applying, at the device, to the data, a first protection scheme, and sending, from the device, using a second controller, the data having a second protection scheme. The first protection scheme and the second protection scheme may be the same. The method may further include applying, at the device, to the data, the second protection scheme. The method may further include applying, at the device, to controller state information for the first controller, a third protection scheme to generate controller state information having the third protection scheme. The method may further include sending, from the device, using the second controller, the controller state information having the third protection scheme.

An apparatus may include a device including a first controller, and a second controller, wherein the device may be configured to receive, using the first controller, first data, apply, to the first data, a first protection scheme, generate, based on the first data, second data, and send, from the device, using the second controller, the second data having a second protection scheme. The device may be configured to generate the first data having the first protection scheme, and generate the second data having the second protection scheme by performing an operation on the first data having the first protection scheme.

An apparatus may include a device including a first controller, and a second controller, wherein the device may be configured to receive, using the first controller, data having a first protection scheme, apply, to the data, a second protection scheme, and send, from the device, using the second controller, the data having the second protection scheme.

An apparatus may include a device including a first controller, and a second controller, wherein the device may be configured to apply, to controller state information for the first controller, a protection scheme to generate the controller state information having the protection scheme, and send, from the device, using the second controller, the controller state information having the protection scheme.

An apparatus may include a device including a first controller, and a second controller, wherein the device may be configured to receive, using the first controller, controller state information having a protection scheme, and provide, to the second controller, the controller state information.

An apparatus may include a device including a first controller, and a second controller, wherein the device may be configured to receive, using the first controller, first data having a first protection scheme, apply, to the first data, a second protection scheme, generate, based on the first data, second data, and send, from the device, using the second controller, the second data having the second protection scheme. The device may be configured to generate the second data having the second protection scheme by performing an operation on the first data having the first protection scheme.

An apparatus may include a communication interface configured to communicate with a device, and user logic configured to determine a portion of a protection scheme for a data migration operation, and communicate, to the device, using the communication interface, the portion of the protection scheme. The portion of the protection scheme may include a salt. The portion of the protection scheme may include an encryption algorithm. The portion of the protection scheme may be based on a first key associated with a first request and a second key associated with a second request.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

FIG. 7A illustrates a first operation of a second embodiment of a path for processing a namespace identifier in accordance with example embodiments of the disclosure.

FIG. 7B illustrates a second operation of a second embodiment of a path for processing a namespace identifier in accordance with example embodiments of the disclosure.

DETAILED DESCRIPTION

Figure 1:
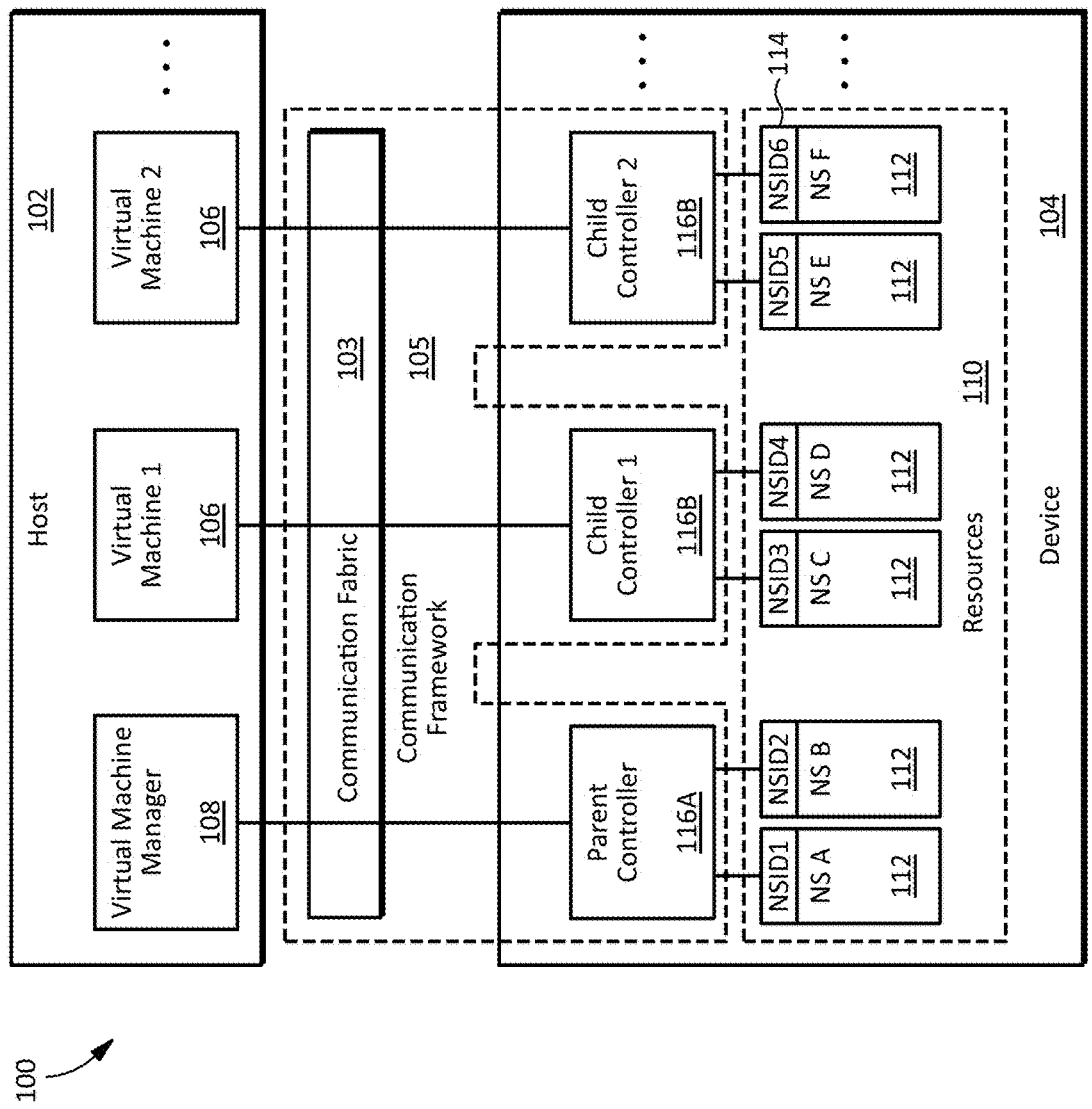
FIG. 1 illustrates an embodiment of a system with namespace identifiers in accordance with example embodiments of the disclosure.

A device such as a storage device, a computational device, and/or the like, may use a namespace to refer to a collection of one or more resources such as storage resources, compute resources, memory resources, and/or the like. A namespace may enable a user such as a host, another device, a program, an operating system, and/or the like, to access a collection of one or more resources as a unit that may be, for example, logically separate, individually addressable, and/or the like.

A namespace identifier may be used to identify a namespace to enable the namespace to be created, configured, allocated, attached, accessed, deleted, and/or the like. For example, a host may write data to a storage namespace in a storage device by sending the storage device a write command that includes a namespace identifier to identify the storage namespace in which the data is to be stored. Depending on the implementation details, the storage namespace (and/or the resources referred to by the storage namespace) may appear to the host as a separate logical storage device within one or more physical storage devices.

Namespaces and/or namespace identifiers may be used in different contexts. For example, a virtual machine (VM) running on a host may be configured to access a relatively small number of storage namespaces located on one or more storage devices. In contrast, a virtual machine manager (VMM) may manage multiple virtual machines and a relatively large number of storage namespaces that may be configured across one or more storage devices, chassis, servers, racks, datacenters, and/or the like. As another example, a virtual machine may be configured to access a namespace using a single controller at a device, whereas a virtual machine manager may manage different virtual machines that may be configured to access different namespaces using one or more controllers at one or more devices. As a further example, a child controller at a device may be configured to access one or more namespaces for a single subsystem (e.g., an NVM subsystem) and/or a single user (e.g., a virtual machine), whereas a parent controller at a device may interact with one or more namespaces for one or more subsystems (e.g., NVM subsystems), one or more users, a virtual machine manager, and/or the like.

Some aspects of this disclosure relate to namespace identification for devices. For example, one or more characteristics of a namespace identifier may in accordance with example embodiments of the disclosure be based on a context in which the namespace identifier may be used. For example, a virtual machine manager may use a relatively large (e.g., 64-bit) namespace identifier to enable the virtual machine manager to manage a relatively large number of namespaces for multiple virtual machines. In contrast, a virtual machine that is managed by the virtual machine manager may use a relatively small number of namespaces that may be represented with a relatively small (e.g., 2-bit) namespace identifier. However, depending on the implementation details, the use of a relatively large namespace identifier by a virtual machine may result in an inefficient use of resources such as memory space, bandwidth, processing power, and/or the like. Thus, in accordance with example embodiments of the disclosure, one user (e.g., a virtual machine manager) may use a relatively large namespace identifier, a portion thereof, a compressed version thereof, and/or the like, to identify a namespace, whereas another user (e.g., a virtual machine) may use a relatively small namespace identifier, or portion thereof, compressed version thereof, and/or the like, to identify the same namespace.

As a further example, in some namespace identifier schemes in accordance with example embodiments of the disclosure, a namespace may be identified by different namespace identifiers, and/or different types of namespace identifiers based on a type of controller that may be used to access the namespace. For example, in some embodiments, a first controller (e.g., a child controller) may perform a first access of a namespace using a first namespace identifier (e.g., a local namespace identifier), whereas a second controller (e.g., a parent controller) may perform a second access of the namespace using a second namespace identifier (e.g., a global namespace identifier). Additionally, or alternatively, a controller may refer to a namespace using different namespace identifiers, and/or different types of namespace identifiers based on an operating mode of the controller. For example, a controller may operate in a first mode (e.g., a reduced privilege mode) in which it may identify a namespace using a first namespace identifier (e.g., a local namespace identifier), and/or a second mode (e.g., an increased privilege mode) in which it may identify a namespace using a second namespace identifier (e.g., a global namespace identifier).

In some embodiments, a second namespace identifier may include information to determine a first namespace identifier. For example, the first namespace identifier may be encoded in, embedded in, and/or the like, the second namespace identifier. Additionally, or alternatively, the second namespace identifier may include information to identify an apparatus (e.g., a controller, a device, a port, and/or the like) that may implement the namespace. For example, in an embodiment in which a first namespace identifier may be implemented with a local namespace identifier, the second namespace identifier may include the local namespace identifier concatenated with a controller identifier for a controller that may implement the namespace and/or a port identifier for a device port that the controller may use to communicate.

In some namespace identifier schemes in accordance with example embodiments of the disclosure, different communication paths may be used to perform input and/or output (I/O or IO) operations for a namespace using different types of controllers, different namespace identifiers and/or types of namespace identifiers, and/or the like. For example, in some embodiments, a child controller may use a local namespace identifier received in an IO queue to access a namespace attached to the child controller. As another example, in some embodiments, a parent controller may use a local namespace identifier received in an IO queue to access a namespace attached to the parent controller, whereas the parent controller may use a global namespace identifier received in an administrative queue to access a namespace attached to the child controller. As a further example, in some embodiments, a parent controller may use one or more global namespace identifiers received in one or more IO queues to access one or more namespaces attached to a child controller and/or the parent controller. In some embodiments, a controller using a global namespace identifier received in an IO queue may use a namespace processing path that may be implemented, at least partially, using hardware acceleration.

Some additional aspects of this disclosure relate to data protection for data transfer operations. For example, a device may include a first controller configured to receive data (e.g., from a user such as a host), generate data that may be protected with a protection scheme (which may be referred to as protected data) based on the received data (e.g., using encryption), and write the protected data to a device functionality circuit (e.g., one or more storage resources, compute resources, memory resources, network resources, and/or the like). The device may also include a second controller configured to read the protected data from the device functionality circuit, generate clear data from the protected data (e.g., using decryption), and send the clear data from the device (e.g., to the host).

However, sending clear (e.g., unprotected) data from a device may create a security risk. For example, a first device may send migration data such as user data, controller metadata, and/or the like, to a second device as part of a migration operation to migrate a program, a virtual machine, a physical machine, an operating system, and/or the like, to a different location. However, if the first device sends migration data in a clear (e.g., unprotected) form, the clear data may be used for unauthorized purposes by one or more hosts, virtual machines, virtual machine managers, hypervisors, additional devices, and/or the like, located between the first device and the second device.

In a data protection scheme in accordance with example embodiments of the disclosure, a controller may send data from a device in a protected form. For example, a parent controller at a source device may send migration data in a protected (e.g., encrypted) form to a target device as part of a migration operation.

In some embodiments, migration data may be converted to a protected form, at least in part, by another apparatus at the device. For example, a child controller at a source device may encrypt user data which a parent controller at the source device may send, in encrypted form, to a target device. Additionally, or alternatively, migration or other data may be converted to a protected form by a separate processor, encryption engine, and/or the like, at the device.

In some embodiments, migration data may be converted to a protected form, at least in part, by a controller that may send the migration data. For example, a parent controller at a source device may encrypt child controller metadata and send the child controller metadata in encrypted form to a target device. In some embodiments, the target device may decrypt and/or use the child controller metadata, for example, to configure a child controller at the target device.

In some embodiments, and depending on the implementation details, sending data such as migration data from a device in a protected form may reduce or eliminate one or more security risks. Moreover, some embodiments may exploit existing protection (e.g., encryption) resources. For example, a device may include existing encryption resources that a child controller may use to write protected user data to a device functionality circuit. A parent controller may send the user data, which may already have been encrypted, as part of a migration operation. Thus, depending on the implementation details, migration data may be sent in a protected form without involving additional protection (e.g., encryption) resources.

This disclosure encompasses numerous aspects relating to namespaces and namespace identifiers for devices, protection schemes for data transfers, and/or the like. The aspects disclosed herein may have independent utility and may be embodied individually, and not every embodiment may utilize every aspect. Moreover, the aspects may also be embodied in various combinations, some of which may amplify some benefits of the individual aspects in a synergistic manner.

For purposes of illustration, some example embodiments may be described in the context of some specific implementation details. For example, some embodiments may be described with users implemented with virtual machines and/or virtual machine managers, devices implemented with storage devices, resources configured as namespaces, namespaces implemented with Nonvolatile Memory Express (NVMe) namespaces, controllers implemented with protocol controllers such as NVMe controllers, controllers implemented within Peripheral Component Interconnect Express (PCIe) functions, operations implemented in the context of migrations (e.g., live migrations) and/or the like. As another example, some embodiments may be described in the context of migration operations. However, aspects of the disclosure are not limited to these or any other implementation details. For example, in some embodiments, a controller may be implemented within one or more network endpoints as an alternative to, or in addition to, one or more PCIe functions. As another example, in some embodiments, device capabilities (e.g., computational storage and/or compute functions, storage local memory (SLM), and/or the like) may not be configured using namespaces. As a further example, one or more device resources may be implemented, for example, with one or more capabilities such as compression (e.g., compression in a data processing unit (DPU) as data passes through the DPU), computational storage and/or compute functions, storage local memory (SLM) and/or the like.

FIG. 1 illustrates an embodiment of a system with namespace identifiers in accordance with example embodiments of the disclosure. The system illustrated in FIG. 1 may include at least one host 102 and at least one device 104 that may communicate using a communication fabric 103. One or more virtual machines 106 (identified as VM1, VM2, . . . ) may run on the host 102. One or more virtual machine managers (e.g., hypervisors) 108 may run on the host 102 and manage the one or more virtual machines 106.

The device 104 may include one or more resources 110 (e.g., storage resources, compute resources, memory resources, and/or the like). One or more namespaces 112 (identified as NS A through NS F) may be configured to refer to one or more collections of the resources 110. The one or more namespaces 112 may be identified by one or more corresponding namespace identifiers (NSIDs) 114.

The device 104 may also include one or more controllers 116A, 116B, . . . (which may be referred to individually and/or collectively as 116). In the embodiment illustrated in FIG. 1, the one or more controllers 116 may include one or more parent controllers 116A and/or one or more child controllers 116B (identified as Child Controller 1 and/or Child Controller 2). A controller 116 may be configured as an interface between a host 102 (e.g., one or more virtual machine managers 108 and/or one or more virtual machines 106) and one or more namespaces 112. A controller 116 may be implemented, for example, as a PCIe function, a software thread, and/or the like as described below. A controller 116 may be connected to a user (e.g., a host 102, a virtual machine 106, a virtual machine manager 108, and/or the like), for example, by being assigned to the user using a protocol such as NVMe (which may use an underlying communication connection such as PCIe, Ethernet, and/or the like). In some embodiments in which PCIe may be used as an underlying transport, a controller 116 may be a PCIe function. One or more controllers 116 may be configured with individual connections (e.g., one-to-one connections) to one or more users (e.g., hosts 102, virtual machines 106, virtual machine managers 108, and/or the like). Additionally, or alternatively, one or more controllers 116 may share a connection to a user, one or more users may share a connection to a controller 116, or controllers 116 and users may be connected in any other configuration. In some embodiments, a controller 116 may provide a host 102 (e.g., one or more virtual machine managers 108 and/or one or more virtual machines 106) with access to one or more namespaces 112 (e.g., using one or more namespace identifiers 114 to identify one or more corresponding namespaces 112).

In some embodiments, the use of namespaces 114 may enable a virtual machine manager 108 and/or a virtual machine 106 running on a host 102 to access a namespace 112 as a unit that may be, for example, logically separate, individually addressable, and/or the like. Depending on the implementation details, a namespace 112 (and/or resources referred to by a namespace) may appear to a host 102 as a separate logical storage device within a physical storage device 104. Depending on the implementation details, the use of namespaces may provide isolation between resources in different namespaces, for example, to provide and/or preserve isolation between virtual machines 106.

In some embodiments, a namespace 112 may be configured to refer to resources 116 in more than one device 102 (e.g., to configure multiple namespaces in more than one device 102 to appear as (e.g., function as) one storage space). For example, in some embodiments, a logical NVMe namespace may be implemented using software on a host computer that may be configured with one or more network connections to one or more additional host apparatus (e.g., host enclosures). One or more (e.g., each) of the host apparatus may include one or more additional host processors, storage devices, and/or the like, that may be implemented, for example, with an NVMe protocol. In such an embodiment, the host software implementation may have a namespace. Depending on the implementation details, the host software implementation may perform one or more services (e.g., background services) that may include accessing one or more physical NVMe drives that may have one or more internal namespaces that may be hidden from an end client that may accesses the one or more services. As another example, in some embodiments, a host software implementation as described above may be implemented, partially or entirely, in hardware, for example, with a DPU.

In some embodiments, one or more resources in one namespace 112 may overlap with one or more resources in another namespace 112. In some embodiments, a virtual machine manager 108 and/or a virtual machine 106 may interface with more than one controller 116. In some embodiments, a controller 116 may interface with more than one virtual machine manager 108 and/or virtual machine 106.

In some embodiments, a namespace 112 may be implemented as a private namespace that may be accessible (e.g., only accessible) by a corresponding controller 116, virtual machine 106, and/or the like. In some embodiments, a namespace 112 may be implemented as a shared namespace that may be accessible by one or more controllers 116, virtual machines 106, and/or the like. In some embodiments, a private namespace may be configured, implemented, enforced, and/or the like, using a namespace data structure that may include a portion to indicate a status (e.g., private, shared, and/or the like) of a namespace. For example, a namespace may be managed using one or more commands (e.g., from a host) such as create, modify, delete, attach, detach, and/or the like, which may use a namespace data structure to indicate whether a namespace is private, read-only, shared, and/or the like. In some embodiments, one or more IO commands may access a specific namespace based on the status of one or more portions of the namespace data structure.

Although the system illustrated in FIG. 1 is not limited to any specific implementation details, in some embodiments, one or more components, operations, and/or the like, may be implemented, at least in part, with a protocol such as NVMe. For example, a parent controller 116A may be implemented with an NVMe primary controller, and a child controller 116B may be implemented with an NVMe secondary controller (e.g., a secondary controller associated with a primary controller used to implement a parent controller 116A). As another example, a namespace 112 may be implemented with one or more NVMe storage namespaces, compute namespaces, memory namespaces, and/or a combination thereof. As a further example, one or more controllers 116 and/or one or more corresponding namespaces 112 may be configured as an NVM subsystem. For instance, in an embodiment implemented at least in part with NVMe, one or more controllers 116, one or more corresponding namespaces 112, one or more ports of a communication framework 105, and/or the like, may be implemented with an exported NVM subsystem that may be configured, for example, using one or more resources from an underlying NVM subsystem. In such an embodiment, a parent controller may enable a host to create one or more namespaces (e.g., underlying namespaces) and/or map one or more exported namespaces (e.g., to one or more underlying namespaces in an exported NVM subsystem).

In some embodiments, a communication framework 105 may be used to implement at least a portion of the communication fabric 103 and/or one or more components (e.g., communication endpoints), operations, and/or the like, of the at least one device 104 illustrated in FIG. 1. For example, at least a portion of the communication fabric 103 may be implemented with one or more PCIe interconnects, interfaces, and/or the like. In such an embodiment, one or more controllers 116 may be implemented with one or more PCIe functions. For example, a parent controller 116A may be implemented with a PCIe physical or virtual function, and a child controller 116B may be implemented with a PCIe physical or virtual function. In some example embodiments, a parent controller 116A may be implemented with a PCIe physical function (e.g., PF0), and a child controller 116B may be implemented with a virtual function associated with a physical function (e.g., VF1) used to implement a parent controller 116A. In some example embodiments, a parent controller 116A may be implemented with a PCIe physical function (e.g., PF0), and a child controller 116B may be implemented with a different physical function (e.g., PF1).

As another example, at least a portion of the communication fabric 103 may be implemented with a network fabric such as Ethernet, FibreChannel, InfiniBand, and/or the like. In an embodiment implemented at least partially with a network fabric, one or more controllers may be implemented, at least partially, with a network endpoint.

In some embodiments, there may not be a one-to-one correspondence (e.g., alignment) between one or more components, operations, and/or the like, illustrated in FIG. 1, and an implementing technology. For example, in some embodiments, a controller 116 may be implemented with more than one NVMe controller, PCIe function, network endpoint, and/or the like. As another example, in some embodiments, an NVMe controller, a PCIe function, a network endpoint, and/or the like may be used to implement more than one controller 116.

A parent controller and/or a child controller may have one or more (but not necessarily any) of the following characteristics, implement one or more (but not necessarily any) of the following features, and/or the like.

In some embodiments, and depending on the implementation details, a parent controller may allocate, attach, manage, and/or the like, one or more resources for a child controller. For example, a parent controller (e.g., a controller implemented at least partially with an NVMe primary controller) may allocate, attach, manage, and/or the like, one or more queue resources (e.g., virtual queue resources for managing a submission queue, a completion queue, and/or the like), interrupt resources (e.g., virtual interrupt resources), and/or the like, for a child controller (e.g., a controller implemented at least partially with an NVMe secondary controller). As another example, a parent controller (e.g., a controller implemented at least partially with a PCIe physical function) may initially control (e.g., own or possess) one or more physical resources such as memory, I/O resources (e.g., access to a network port), queues, and/or the like. The parent controller may manage one or more of the physical resources for, and/or transfer one or more of the physical resources to, a child controller (e.g., a controller implemented at least partially with a PCIe virtual function).

In some embodiments, and depending on the implementation details, a parent controller may perform one or more administrative functions for a child controller. For example, a parent controller may receive (e.g., from a host) and/or execute administrative commands, for example, to create, configure, allocate, attach, map, delete, and/or the like, one or more namespaces.

In some embodiments, and depending on the implementation details, a parent controller may have greater visibility and/or greater privileges than a child controller. For example, a child controller may be capable of receiving and/or using (e.g., only receiving and/or using) local namespace identifiers, whereas a parent controller may be capable of receiving and/or using global namespace identifiers (e.g., using a mapping of one or more global namespace identifiers to one or more local namespace identifiers and/or child controllers). As a further example, a parent controller may have one or more privileges to perform a migration (e.g., a live migration) of an NVM namespace (e.g., from a first controller and/or NVM subsystem to a second controller and/or NVM subsystem).

Any of the hosts disclosed herein including a host 102 illustrated in FIG. 1 may be implemented with any component or combination of components including one or more of a client device, a server, a storage node, a CPU, a personal computer, a tablet computer, a smartphone, and/or the like.

Any of the communication connections, interfaces, protocols, fabrics, frameworks, controllers, functions, endpoints, and/or the like, disclosed herein including a communication fabric 103 and/or framework 105 illustrated in FIG. 1 may be implemented, for example, with PCIe, NVMe, NVMe-over-fabric (NVMe-oF), Ethernet, Transmission Control Protocol/Internet Protocol (TCP/IP), Direct Memory Access (DMA) Remote DMA (RDMA), RDMA over Converged Ethernet (ROCE), FibreChannel, InfiniBand, Serial ATA (SATA), Small Computer Systems Interface (SCSI), Serial Attached SCSI (SAS), iWARP, Compute Express Link (CXL), and/or a coherent protocol such as CXL.mem, CXL.cache, CXL.IO and/or the like, Gen-Z, Open Coherent Accelerator Processor Interface (OpenCAPI), Cache Coherent Interconnect for Accelerators (CCIX), and/or the like, Advanced eXtensible Interface (AXI), any generation of wireless network including 2G, 3G, 4G, 5G, 6G, and/or the like, any generation of Wi-Fi, Bluetooth, near-field communication (NFC), and/or the like, or any combination thereof.

Any of the devices disclosed herein including the device 104 illustrated in FIG. 1 may be implemented with a storage device, a computational device (e.g., an accelerator), a network interface card (NIC), a memory buffer (e.g., memory expander), and/or the like, or a combination thereof, and the one or more resources 110 may include hardware and/or software resources to implement a primary function of the device 104.

For example, if the device 104 is implemented as a storage device, the resources 110 may include a storage medium such as one or more flash memory devices, a flash translation layer (FTL), and/or the like. As another example, if the device 104 is implemented as a network interface card (NIC), the resources 110 may include one or more modems, network interfaces, physical layers (PHYs), medium access control layers (MACs), and/or the like.

As a further example, if a device 104 is implemented as an accelerator, the one or more resources 110 may be implemented with one or more computational resources (which may also be referred to as compute resources) which may include one or more compute engines, programs, and/or the like. In some embodiments, a compute engine may include combinational logic, sequential logic, one or more timers, counters, registers, and/or state machines, one or more complex programmable logic devices (CPLDs), FPGAs, application specific integrated circuits (ASICs), central processing units (CPUs) such as complex instruction set computer (CISC) processors (e.g., x86 processors) and/or reduced instruction set computer (RISC) processors such as ARM processors, graphics processing units (GPUs), neural processing units (NPUs), tensor processing units (TPUs), data processing units (DPUs), and/or a combination thereof.

In some embodiments, a namespace may refer to any device resources 110 that may be implemented with a device 104. For example, a storage namespace may refer to a collection of one or more logical block addresses (LBAs), physical block addresses (PBAs), nonvolatile memory devices, cylinders, tracks, channels, pages, and/or the like. As another example, a compute namespace may refer to a collection of one or more compute engines, programs, and/or the like. As a further example, a memory namespace may refer to a collection of one or more addresses, ranges of addresses, and/or the like, of memory cells, lines, columns, bytes, words, pages, blocks, and/or the like.

Any of the devices disclosed herein that may be implemented as storage devices may be implemented with any type of nonvolatile storage media based on solid state media, magnetic media, optical media, and/or the like. For example, in some embodiments, a storage device may be implemented as an SSD based on not-AND (NAND) flash memory, persistent memory such as cross-gridded nonvolatile memory, memory with bulk resistance change, phase change memory (PCM), and/or the like, or any combination thereof.

Any of the devices disclosed herein including a device 104 illustrated in FIG. 1 may be implemented in any form factor such as 3.5 inch, 2.5 inch, 1.8 inch, M.2, Enterprise and Data Center Standard Form Factor (EDSFF), NF1, and/or the like, using any connector configuration such as Serial ATA (SATA), Small Computer System Interface (SCSI), Serial Attached SCSI (SAS), U.2, and/or the like. Any of the devices disclosed herein may be implemented entirely or partially with, and/or used in connection with, a server chassis, server rack, dataroom, datacenter, edge datacenter, mobile edge datacenter, and/or any combinations thereof.

In some embodiments, the at least one device 104 may be implemented with multiple devices. For example, in some embodiments, the resources 110 may be implemented with multiple devices. Such an embodiment may include, between the communication framework 105 and the resources 110, a network and/or interconnect switch and/or an intermediate processor that may route accesses of the resources to the multiple devices. In such an embodiment, a namespace may be configured to include one or more resources on one device and/or on multiple devices. In such an embodiment, one or more of the controllers 116 may be implemented, for example, with a network and/or interconnect switch, endpoint, and/or the like. In such an embodiment, one or more of the controllers 116 may be implemented with a data processing unit (DPU), for example, with single root IO virtualization (SR-IOV).

In some embodiments, one or more of the host 102 and/or controllers 116 may be implemented with one or more software threads. For example, in some embodiments, one or more (e.g., each) of the host 102 and/or controllers 116A and/or 116B may be implemented with one or more software threads (e.g., one thread per controller) on one or more processors. In such an embodiment, the one or more threads may implement internal and/or external communications using a protocol such as NVMe. In some such embodiments, one or more of the controllers 116 may be implemented as an emulated controller.

In any of the embodiments disclosed herein, one or more components (e.g., one or more hosts) may communicate with one or more other components (e.g., one or more devices) using one or more communication fabrics 103, frameworks 105, and/or the like, as illustrated in FIG. 1.

Figure 2:
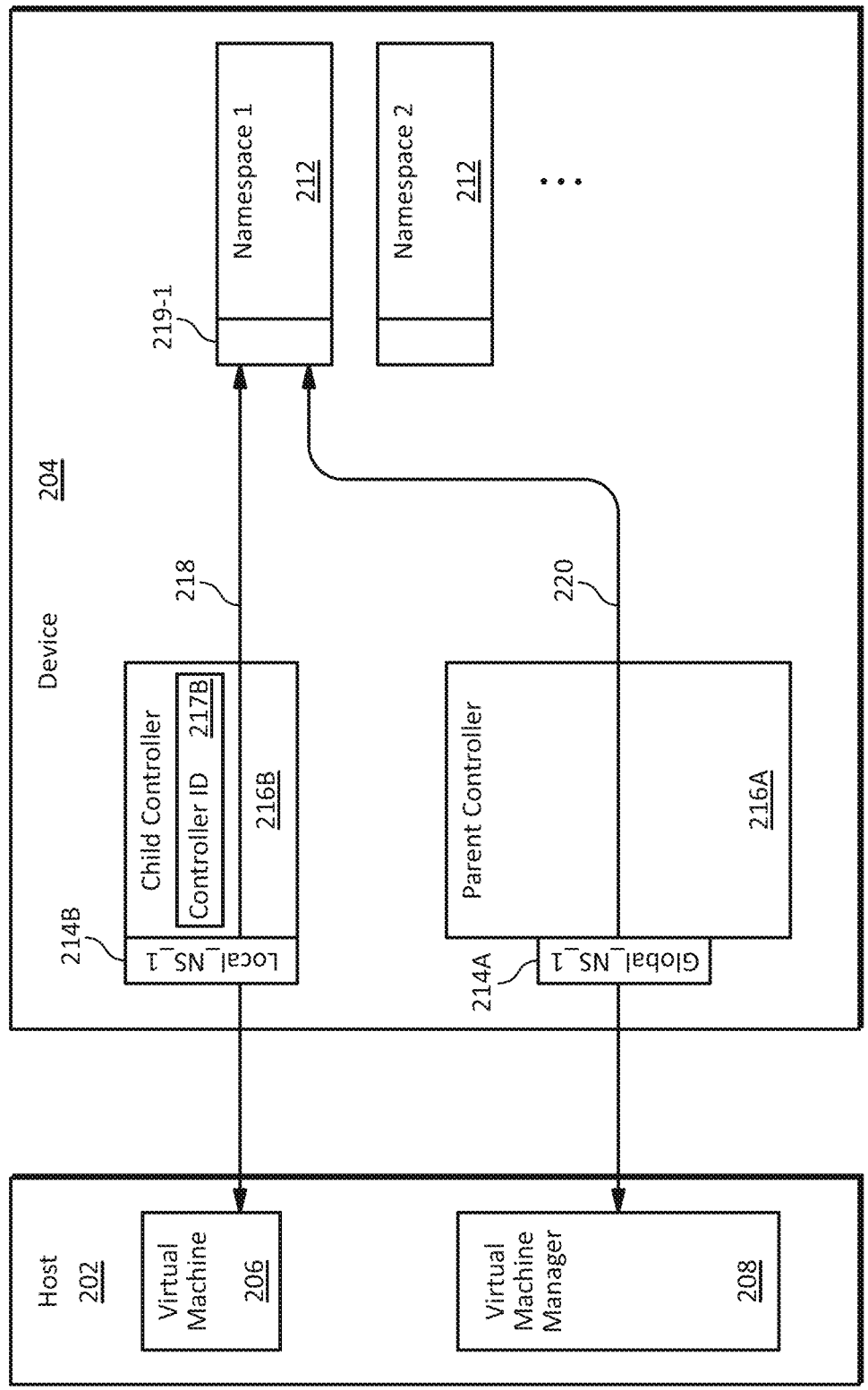
FIG. 2 illustrates an embodiment of a first namespace access scheme using namespace identifiers in accordance with example embodiments of the disclosure.

FIG. 2 illustrates an embodiment of a first namespace access scheme using namespace identifiers in accordance with example embodiments of the disclosure. The embodiment illustrated in FIG. 2 may be implemented, for example, using the embodiment illustrated in FIG. 1 in which similar elements may be indicated by reference numbers ending in, and/or containing, the same digits, letters, and/or the like.

The embodiment illustrated in FIG. 2 may include a host 202 and a device 204 which may communicate using a communication fabric and/or communication framework such as those illustrated in FIG. 1. The device 204 may include one or more namespaces 212, some examples of which are illustrated as Namespace 1, Namespace 2, .... A virtual machine 206 running on the host 202 may be configured to access Namespace 1 using a child controller 216B as shown by arrow 218. In some embodiments, the child controller 216B may be described as being assigned to the virtual machine 206. In some embodiments, Namespace 1 may be described as being attached to the child controller 216B. For purposes of illustration, Namespace 1 may be implemented as a storage namespace (e.g., using one or more storage resources), but aspects of the disclosure may be applied to any type(s) of namespace(s).

Depending on the implementation details, the child controller 216B and/or Namespace 1 may be configured to appear as a separate logical device (e.g., a logical storage device). For example, the child controller 216B and/or Namespace 1 may be configured as an NVM subsystem. Moreover, depending on the implementation details, Namespace 1 may be implemented, at least from the perspective of the virtual machine 206, as a private namespace.

The virtual machine 206 may therefore be configured to run one or more operating systems, applications, services, processes, and/or the like, and store user data in Namespace 1 which, at least from the perspective of the virtual machine 206, may appear to be a separate logical storage device that may be isolated from one or more other resources of the device 204. Thus, depending on the implementation details, the virtual machine 206 may not be aware of one or more other controllers 216, namespaces 212, and/or the like, at device 204.

In some embodiments, the child controller 216B may have relatively limited visibility (e.g., may only be able to see and/or access namespaces attached to the child controller 216B). Thus, the virtual machine 206 may use a local namespace identifier 214B (which may be referred to as local namespace ID or local NSID) to indicate to the child controller 216B that the virtual machine 206 is accessing Namespace 1. Moreover, because the virtual machine 206 may be limited to accessing a relatively small number of namespaces 212 attached to the child controller 216B, the local namespace identifier may be implemented with a relatively small identifier (e.g., a relatively small number of bits). For example, in some embodiments, child controller 2162 may use a local namespace identifier that may include two bits to identify up to four namespaces that may be attached to the child controller 216B (e.g., local namespace identifier Local_NS_1 (binary value 00) may identify Namespace 1, local namespace identifier Local_NS_2 (binary value 01) may identify Namespace 2, local namespace identifier Local_NS_3 (binary value 10) may identify Namespace 3, and/or Local_NS_4 (binary value 11) may identify Namespace 4).

Although the child controller 216B may receive a local namespace identifier 2142 from the virtual machine 206 to identify a namespace accessed by the virtual machine 206, the device 204 may include one or more namespaces 212 than the child controller 216B may not be able to access. Thus, in some embodiments, the child controller 216B may convert the local namespace identifier 214B received from the virtual machine 206 to an internal namespace identifier 219-1 that may enable an interface to internal resources within the device 204 (e.g., in the case of a storage device, a nonvolatile memory interface such as a flash translation layer (FTL), channel controller, and/or the like) to distinguish between namespaces 212 that may be attached to different controllers 216. Examples of internal namespace identifiers may include a global namespace identifier as described below (e.g., a child controller 216B may reconstruct a global namespace identifier from a local namespace identifier), a physical namespace identifier, an underlying namespace identifier, and/or the like. In some embodiments, an internal namespace identifier 219-1 may be implemented, for example, with a compressed namespace identifier that may reduce a bit width of the identifier to reduce power consumption, circuit area, latency, and/or the like.

In some embodiments, the device 204 illustrated in FIG. 2 may include one or more additional child controllers 216B that may be assigned to one or more additional virtual machines 206 running on the host 202. If the one or more additional child controllers 2162 are configured in a manner similar to the child controller 2162 illustrated in FIG. 2 (e.g., each child controller 216B is assigned to a corresponding virtual machine 206), the child controllers 216B may use overlapping local namespace identifiers (e.g., each child controller 216B may use Local_NS_1 (binary value 00) through Local_NS_4 (binary value 11)) to identify their respective attached underlying namespaces at the device 204 because the combination of the specific child controller 216B (which may be attached to the virtual machine 206) and local namespace identifier 214B may uniquely identify an underlying namespace at the device 204 (e.g., using an internal namespace identifier 219-1).

A virtual machine manager 208 running on the host 202 may be configured to access Namespace 1 using a parent controller 216A as shown by arrow 220. However, the parent controller 216A may be associated with multiple child controllers 216B, some of which may use overlapping local namespace identifiers to identify their respective attached namespaces (e.g., each of the associated child controllers 216B may use local namespaces numbered 1-4). Thus, the virtual machine manager 208 may not be able to identify a specific namespace 212 (e.g., Namespace 1) to the parent controller 216A using only a local namespace identifier 214B.

In some embodiments, a parent controller 216A may be placed in a mode in which the parent controller 216A may perform a migration operation for a child controller 216B. In such a mode, the parent controller 216A may use a local namespace identifier 214B, for example during all or a portion of the operation to migrate the child controller 216B. In such a mode, the parent controller 216A may decode a local namespace identifier 214B received, for example, from a virtual machine manager 208, to refer to the child controller 216B being migrated.

In the embodiment illustrated in FIG. 2, the virtual machine manager 208 may use a global namespace identifier 214A to identify the Namespace 1 to the parent controller 216B. In some embodiments, and depending on the context, a global namespace identifier may include first information that may identify a namespace and second information that may identify a context for the namespace. For example, in the embodiment illustrated in FIG. 2, the global namespace identifier 214A may include first information that may identify Namespace 1 and second information that may identify the child controller 216B to which Namespace 1 may be attached. In some embodiments, second information that may identify a broader context for the namespace may include information that may identify a port through which the namespace may communicate, a subsystem (e.g., an NVM subsystem), device, system, chassis, server, rack, datacenter, and/or the like in which the namespace may be used, and/or the like. In some embodiments, and depending on the context, a global namespace identifier may be unique, for example, within a subsystem (e.g., an NVM subsystem), device, system, chassis, server, rack, datacenter, and/or the like in which the namespace may be used.

In some example embodiments, the global namespace identifier 214A may include the local namespace identifier 214B concatenated with a controller identifier 217B (which may be referred to as a controller ID) that may identify the child controller 216B. In some example embodiments, the global namespace identifier 214A may include the local namespace identifier 214B concatenated with a controller identifier 217B and a port identifier (e.g., a port number) through which a controller may communicate. In some other example embodiments, the first information to identify a namespace and second information to identify a broader context in which the namespace may be used may be combined, encoded, and/or the like, to create the global namespace identifier 214A. For example, in some embodiments, the local namespace identifier 214B and the controller identifier 217B may be combined using an encoding algorithm to generate a compressed global namespace identifier 214A.

In the embodiment illustrated in FIG. 2, the child controller 216B may be identified as Controller 1 by the controller identifier 217B. Thus, Namespace 1 may be identified as Global_NS_1 by the global namespace identifier 214A which may implement Global_NS_1 as a concatenation of a local namespace identifier (e.g., Local_NS_1) and a controller identifier 217B (e.g., Controller 1).

The virtual machine manager 208 may, therefore, use the global namespace identifier Global_NS_1 to identify Namespace 1 when the virtual machine manager 208 accesses Namespace 1 using the parent controller 216A.

In embodiments in which the internal namespace identifier 219-1 is implemented with a global namespace identifier 214A, parent controller 216A may simply use the global namespace identifier 214A received from the virtual machine controller 208 (e.g., Global_NS_5) as the internal namespace identifier 219-1. In other embodiments, however, the parent controller 216A may convert the global namespace identifier 214A received from the virtual machine controller 208 to a format used for the internal namespace identifier 219-1 (e.g., a physical namespace identifier, an underlying namespace identifier, a compressed namespace identifier, and/or the like.

In an embodiment in which device 204 may be implemented with a storage device, one or more child controllers 216B, one or more namespaces 212, and/or one or more parent controller 216A may be configured, at least in part, as one or more NVM subsystems. For example, a child controller 216B, a namespace 212, and/or a parent controller 216A may be configured as an NVM subsystem. As another example, a parent controller 216A may be configured as part of an underlying NVM subsystem, and a child controller 216B and Namespace 1 may be configured as part of an exported NVM subsystem that may be exported from the underlying NVM subsystem.

In some embodiments of a data transfer (e.g., migration) operation, a parent controller 216A may be placed in a mode (e.g., a migration mode based on a command received from a host) in which the parent controller 216A may use a local namespace (e.g., Local_NS_1) for one or more (e.g., all) requests for the duration of the transfer operation.

In the embodiment illustrated in FIG. 2, the host 202 and device 204 may communicate using a communication fabric, framework, and/or the like, as described with respect to the embodiment illustrated in FIG. 1. For example, in some embodiments, the host 202 and device 204 may communicate using a PCIe fabric, and one or more of the child controllers 216B and/or parent controllers 216A may be implemented, at least in part, with a PCIe function (e.g., a parent controller 216A as a physical function and a child controller 216B as a virtual function associated with the physical function as may be implemented, for example, with single root IO virtualization (SR-IOV)). In such an embodiment, a controller identifier 217B may be implemented with a function identifier (function ID). Examples of function identifiers may include a universally unique identifier (UUID) and/or other number assigned, for example by a host, an enumeration of a function assigned, for example, by a storage device, and/or the like.

As another example, the host 202 and device 204 may communicate using a network fabric, and one or more of the child controllers 216B and/or parent controllers 216A may be implemented, at least in part with a network endpoint. Although the one or more child controllers 216B, parent controllers 216A, namespaces 212, and/or the like, may be illustrated in FIG. 2 as being within a device 204, in other embodiments, one or more of these components may be located in one or more other devices, chassis, systems, racks, servers, datacenters, and/or the like.

The virtual machine manager 208 may access Namespace 1, for example, for the purpose of migrating user data stored in Namespace 1 to a different namespace, subsystem (e.g., VM subsystem), device, and/or the like, as part of a process (e.g., controlled by the virtual machine manager 208) to migrate the virtual machine 206 to a different virtual machine, hypervisor, host, and/or the like. For example, the virtual machine manager 208 may read user data stored in Namespace 1 and transfer the user data to a different namespace that may be used by the virtual machine 206 once the virtual machine 206 is migrated to a different location (e.g., the user data stored in Namespace 1 may be transferred to a different namespace in the same, or a different, subsystem (e.g., NVM subsystem), device, port, chassis, server, rack, datacenter, and/or the like). (in the context of a migration, the virtual machine manager 208 may alternatively be referred to as a migration server, and/or the controller 216A may alternatively be referred to as a migration controller.)

Figure 3:
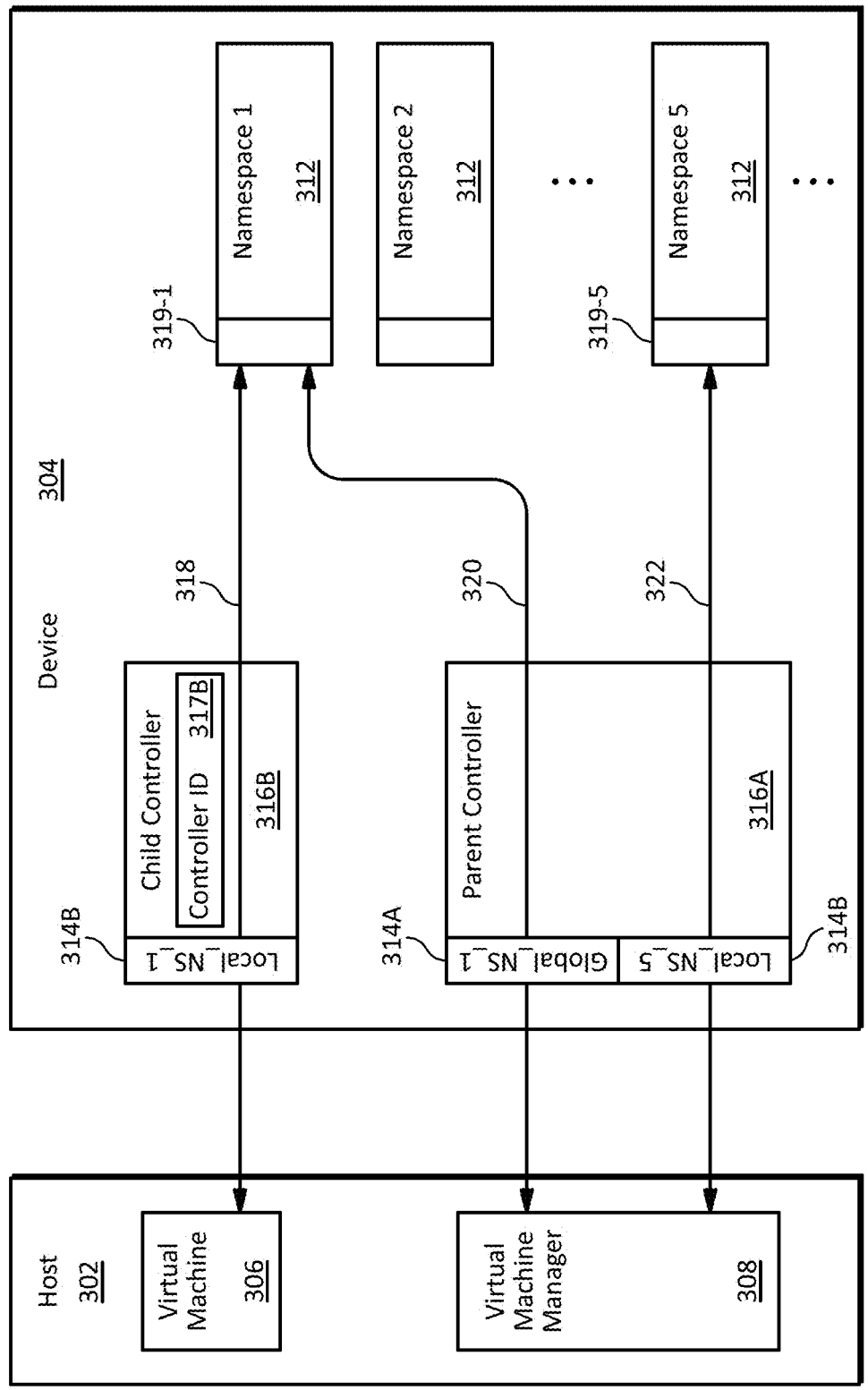
FIG. 3 illustrates an embodiment of a second namespace access scheme using namespace identifiers in accordance with example embodiments of the disclosure.

FIG. 3 illustrates an embodiment of a second namespace access scheme using namespace identifiers in accordance with example embodiments of the disclosure. The embodiment illustrated in FIG. 3 may include one or more elements (e.g., components, operations, and/or the like) similar to those in the embodiments illustrated in FIG. 1 and/or FIG. 2 in which similar elements may be indicated by reference numbers ending in, and/or containing, the same digits, letters, and/or the like. The embodiment illustrated in FIG. 3 may include a host 302 and/or a device 304 that may communicate using a communication fabric and/or communication framework such as those illustrated in FIG. 1.

In some aspects, the embodiment illustrated in FIG. 3 may operate in a manner similar to the embodiment illustrated in FIG. 2. For example, in the embodiment illustrated in FIG. 3, a virtual machine manager 308 and a parent controller 316A may be configured to access a first namespace 312 (identified as Namespace 1 and attached to child controller 316B) using a global namespace identifier 314A (identified as Global_NS_1) as shown by arrow 320 in a manner similar to that described above with respect to FIG. 2.

However, in the embodiment illustrated in FIG. 3, the virtual machine manager 308 and parent controller 316A may also be configured to access another namespace 312 (identified as Namespace 5 and attached to parent controller 316A) using another local namespace identifier 314B (identified as Local_NS_5) as shown by arrow 322.

In some embodiments, the child controller 316B and parent controller 316A may convert the local namespace identifiers Local_NS_1 and Local_NS_5, respectively, to internal namespace identifiers 319-1 and 319-5, respectively, as described above with respect to FIG. 2. If the internal namespace identifier 319-1 is implemented with a global namespace identifier, the parent controller 316A may use the global namespace identifier Global_NS_1 as the internal namespace identifier 319-1. Alternatively, or additionally, the parent controller 316A may convert the global namespace identifier Global_NS_1 to another format used for the internal namespace identifier 319-1.

The virtual machine manager 308 may access Namespace 5, for example, for the purpose of migrating user data stored in Namespace 1 to Namespace 5 as part of a process (e.g., controlled by the virtual machine manager 308) to migrate the virtual machine 306 to a different virtual machine, hypervisor, host, and/or the like.

In some embodiments (e.g., embodiments that use an NVMe protocol), the parent controller 316A may access Namespace 1 using one or more administrative queues (e.g., an administrative submission and completion queue pair), whereas the parent controller 316A may access Namespace 5 using one or more IO queues (e.g., an IO submission and completion queue pair). In some embodiments, an input and/or output queue may also be referred to as a data queue.

In an embodiment in which device 304 may be implemented with a storage device, one or more child controllers 316B, one or more namespaces 312, and/or one or more parent controller 316A may be configured, at least in part, as one or more NVM subsystems. For example, the child controller 316B and Namespace 1 may be implemented with a first NVM subsystem, and the parent controller 316A and Namespace 5 may be implemented with a second NVM subsystem. As another example, the child controller 316B, the parent controller 316A, Namespace 1, and Namespace 5 may be implemented with an NVM subsystem.

Figure 4:
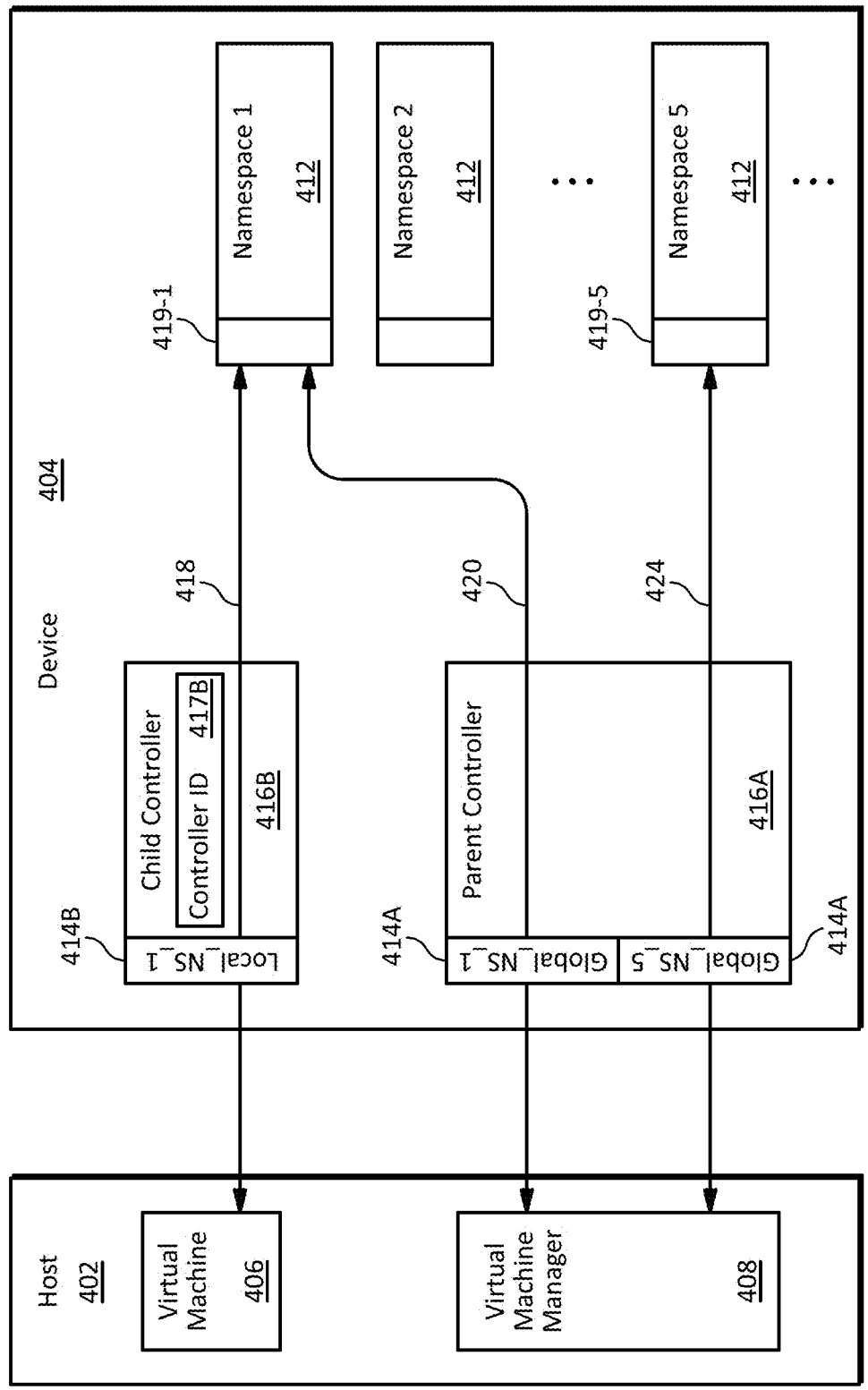
FIG. 4 illustrates an embodiment of a third namespace access scheme using namespace identifiers in accordance with example embodiments of the disclosure.

FIG. 4 illustrates an embodiment of a third namespace access scheme using namespace identifiers in accordance with example embodiments of the disclosure. The embodiment illustrated in FIG. 4 may include one or more elements (e.g., components, operations, and/or the like) similar to those in the embodiments illustrated in FIG. 1, FIG. 2, and/or FIG. 3 in which similar elements may be indicated by reference numbers ending in, and/or containing, the same digits, letters, and/or the like. The embodiment illustrated in FIG. 4 may include a host 402 and/or a device 404 which may communicate using a communication fabric and/or communication framework such as those illustrated in FIG. 1.

In some aspects, the embodiment illustrated in FIG. 4 may operate in a manner similar to the embodiment illustrated in FIG. 3. For example, in the embodiment illustrated in FIG. 4, a virtual machine manager 408 and a parent controller 416A may be configured to access a first namespace 412 (identified as Namespace 1 and attached to child controller 416B) using a global namespace identifier 414A (identified as Global_NS_1) in a manner similar to that described above with respect to FIG. 3.

However, in the embodiment illustrated in FIG. 4, the virtual machine manager 408 and parent controller 416A may be configured to access Namespace 5 (attached to parent controller 416A) using another global namespace identifier 414A (identified as Global_NS_5) as shown by arrow 424. Depending on the implementation details, using global namespace identifiers for both Namespace 1 (attached to the child controller 416B) and Namespace 5 (attached to the parent controller 416A) may enable the parent controller 416A to use an at least partial hardware path (e.g., the same hardware acceleration path) to perform both types of accesses. Depending on the implementation details, using the same hardware path may increase IO speeds (e.g., read and/or write speeds), reduce latency, reduce power consumption, and/or the like.

In an embodiment in which the internal namespace identifiers 419-1 and 419-5 are implemented with global namespace identifiers, the parent controller 416A may use the global namespace identifiers Global_NS_1 and Global_NS_5 as the internal namespace identifiers 419-1 and 419-5, respectively. Alternatively, or additionally, the parent controller 416A may convert the global namespace identifiers Global_NS_1 and Global_NS_5 to another format used for the internal namespace identifiers 419-1 and 419-5.

The virtual machine manager 408 may access Namespace 5, for example, for the purpose of migrating user data stored in Namespace 1 to Namespace 5 as part of a process (e.g., controlled by the virtual machine manager 408) to migrate the virtual machine 406 to a different virtual machine, hypervisor, host, and/or the like.

In some embodiments (e.g., embodiments that use an NVMe protocol), the parent controller 416A may access Namespace 1 and/or Namespace 5 using one or more administrative queues (e.g., an administrative submission and completion queue pair). Alternatively, or additionally, the parent controller 416A may access Namespace 1 and/or Namespace 5 using one or more IO queues (e.g., an IO submission and completion queue pair). In embodiments in which a namespace 412 may be accessed using an administrative queue, the namespace 412 may be processed, at least partially, outside of a hardware accelerated path.

In some embodiments, a type of namespace identifier to use may be based on the use of one or more types of queues (e.g., the type of namespace identifier to use may be based on whether a request is submitted using an administrate queue or an IO queue). For example, in some embodiments, a controller may use a global namespace identifier for a transaction using an administrative queue, whereas the controller may use a local namespace identifier for a transaction using an IO queue. Some such embodiments may implement one or more checks. For example, in some embodiments, an IO queue may allow (e.g., only allow) access to a specific namespace (e.g., Namespace 5) using a local namespace identifier 414B (e.g., Local_NS_5). Depending on the implementation details, this may provide an extra layer of protection. For example, a virtual machine manager 408 may not be able to inadvertently (e.g., accidentally) initiate a transaction to a namespace (e.g., Namespace 1) of a child controller 416B. Additionally, or alternatively, a read request for a namespace (e.g., Namespace 1) of the child controller 416B may be submitted to an administrative queue (e.g., as a submission queue entry (SQE)) using the global namespace identifier Global_NS_1. Such a read request to the submission queue may use a different opcode and/or a different command structure from existing read command SQE. The different opcode and/or a different command structure may be implemented, for example, with a new Get Log Page command.

In an embodiment in which device 404 may be implemented with a storage device, one or more child controllers 416B, one or more namespaces 412, and/or one or more parent controller 416A may be configured, at least in part, as one or more NVM subsystems. For example, the child controller 416B and Namespace 1 may be implemented with a first NVM subsystem, and the parent controller 416A and Namespace 5 may be implemented with a second NVM subsystem. As another example, the child controller 416B, the parent controller 416A, Namespace 1, and Namespace 5 may be implemented with an NVM subsystem.

In the embodiments illustrated in FIG. 2, FIG. 3, and/or FIG. 4, Namespace 1 may be implemented as a read-only, quasi-private, and/or pseudo-private namespace. For example, Namespace 1 may appear to be, or may effectively be, a private namespace to a child controller in the sense that only the child controller may be able to write data to Namespace 1. However, during a migration operation (e.g., a live migration (LM) in which the child controller may continue to operate and perform IO operations on Namespace 1 during at least a portion of the migration operation), a parent controller may be able to read the child controller's user data from Namespace 1 to copy the user data to a different namespace that may be used by a virtual machine to which the child controller may be attached once the virtual machine is migrated to a different location and the user data is copied to a different namespace. In an embodiment implemented at least in part with NVMe, namespace sharing may be enabled for Namespace 1, for example, if Namespace 1 is attached to a parent controller to enable the parent controller to copy user data from Namespace 1 to a different namespace, for example, as part of a migration operation.

Figure 5:
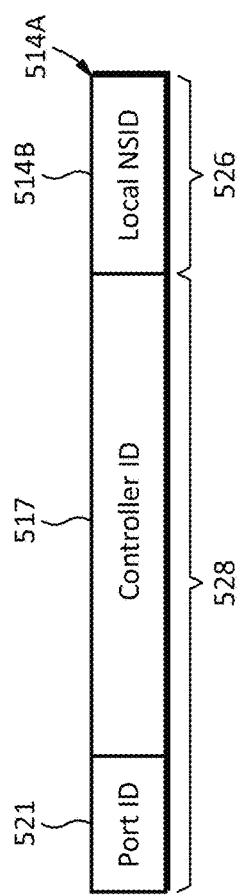
FIG. 5 illustrates an example embodiment of a global namespace identifier in accordance with example embodiments of the disclosure.

FIG. 5 illustrates an example embodiment of a global namespace identifier in accordance with example embodiments of the disclosure. The global namespace identifier 514A may include first information 526 that may identify a namespace and second information 528 that may identify a context for the namespace. In the example embodiment illustrated in FIG. 5, the first information 526 may include a local namespace identifier 514B, and the second information 528 may include a controller identifier 517 and a port identifier 521.

In some embodiments, one or more of the local namespace identifier 514B, controller identifier 517, and/or port identifier 521 may be implemented with one or more binary bits. For example, the namespace identifier 514B may be implemented with three bits, the controller identifier 517 (which may be implemented, for example, with a PCIe function identifier) may be implemented with eight bits, and the port identifier 521 may be implemented with two bits. In other embodiments, however, different numbers of bits may be used, some identifiers may be omitted, more identifiers may be included (e.g., to identify a subsystem such as an NVM subsystem, device, and/or the like), empty spaces may be included between any of the identifiers, and/or the like. In some embodiments, one or more of the namespace identifier 514B, controller identifier 517, and/or port identifier 521 may not be distinct components but may be combined and/or encoded, for example, to compress the global namespace identifier 514A.

Figure 6:
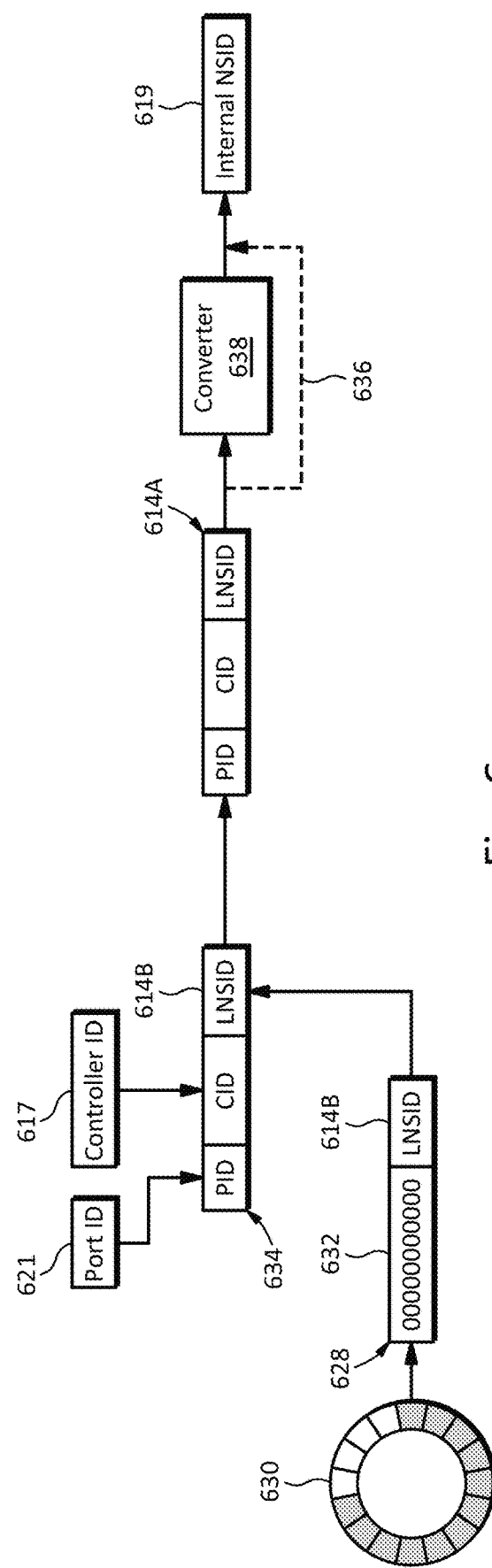
FIG. 6 illustrates a first embodiment of a path for processing a namespace identifier in accordance with example embodiments of the disclosure.

FIG. 6 illustrates a first embodiment of a path for processing a namespace identifier in accordance with example embodiments of the disclosure. The namespace processing path illustrated in FIG. 6 may be used, for example, by any controller that may receive a local namespace identifier. For example, the namespace processing path illustrated in FIG. 6 may be used by the child controller 216B that may receive the local namespace identifier 214B in FIG. 2 or any other child controller disclosed herein.

Referring to FIG. 6, the namespace processing path may receive a namespace identifier 628 (which may be referred to as an external namespace identifier), for example, from a queue 630 which may be implemented, for example, with an IO submission queue. In the example illustrated in FIG. 6, the input namespace identifier may include a first portion that may hold a local namespace identifier 614B and a second portion that may include unused data (e.g., padding data such as zeros) 632, for example, so the namespace identifier 628 may have the same length as a global namespace identifier.

The local namespace identifier 614B may be transferred to a construction register 634 (e.g., a reconstruction register) where it may be combined (e.g., concatenated) with a controller identifier (CID) 617 and/or a port identifier (PID) 621 to construct (e.g., reconstruct) a global namespace identifier. For example, the namespace processing path illustrated in FIG. 6 may be used in a child controller that may be aware of its controller identifier 617 (e.g., function identifier) and/or path identifier 621 which it may load into the corresponding portions of the construction register 634. In some embodiments, the namespace processing path illustrated in FIG. 6 may perform a check to confirm that the unused data (e.g., padding data such as zeros) 632 has an expected data pattern. In other embodiments, the unused data 632 may be discarded, for example, by masking the unused data 632 when the local namespace identifier 614B is loaded into the construction register 634.

In some embodiments, the constructed global namespace identifier 614A may be used directly as shown by dashed line 636 as an internal namespace identifier 619 (e.g., as the internal namespace identifier 219-1 illustrated in FIG. 2). In some embodiments, the constructed global namespace identifier 614A may be further processed by a converter 638 (e.g., a converter circuit) to convert it to a different format (e.g., a compressed format) that may be used for the internal namespace identifier 619. In some embodiments, the converter 638 and/or a conversion operation may be combined with the construction register 634 and/or a construction operation.

The namespace processing path illustrated in FIG. 6 may be implemented with hardware, software, or a combination thereof. In some embodiments, implementing the namespace processing path at least partially with hardware may provide relatively high-speed and/or unimpeded processing of a namespace identifier by a controller. For example, some or all of the namespace processing path may be implemented with combinational logic, sequential logic, one or more timers, counters, registers, and/or state machines, one or more complex programmable logic devices (CPLDs), field programmable gate arrays (FPGAs), application specific integrated circuits (ASICs), one or more processors and/or processing units executing instructions stored in any type of memory, or any combination thereof.

FIG. 7A illustrates a first operation of a second embodiment of a path for processing a namespace identifier in accordance with example embodiments of the disclosure. FIG. 7B illustrates a second operation of a second embodiment of a path for processing a namespace identifier in accordance with example embodiments of the disclosure. FIG. 7A and FIG. 7B may be referred to individually and/or collectively as FIG. 7.

The namespace processing path illustrated in FIG. 7 may be used, for example, by any controller that may receive a local namespace identifier and/or a global namespace identifier. For example, the namespace processing path illustrated in FIG. 7 may be used by any of the child and/or parent controllers illustrated in FIG. 2, FIG. 3, and/or FIG. 4 or any other child and/or parent controllers disclosed herein. The namespace processing path illustrated in FIG. 7 may include one or more elements (e.g., components, operations, and/or the like) similar to those in the embodiment illustrated in FIG. 6 in which similar elements may be indicated by reference numbers ending in, and/or containing, the same digits, letters, and/or the like.

Referring to FIG. 7A, the namespace processing path may receive a namespace identifier 728 (which may be referred to as an external namespace identifier), for example, from a queue 730 which may be implemented, for example, with an IO submission queue. In the example illustrated in FIG. 7, the input namespace identifier may include a first portion that may hold a local namespace identifier 714B and a second portion that may include unused data (e.g., padding data such as zeros) 732, for example, so the namespace identifier 728 may have the same length as a global namespace identifier.

The local namespace identifier 714B may be transferred to a construction register 734 (e.g., a reconstruction register) where it may be combined (e.g., concatenated) with a controller identifier 717 and/or a port identifier 721 to construct (e.g., reconstruct) a global namespace identifier. For example, the namespace processing path may be used in a child controller that may be aware of its controller identifier 717 and/or path identifier 721 which it may load into the corresponding portions of the construction register 734. In some embodiments, the namespace processing path may perform a check to confirm that the unused data (e.g., padding data such as zeros) 732 has an expected data pattern. In other embodiments, the unused data 732 may be discarded, for example, by masking the unused data 732 when the local namespace identifier 714B is loaded into the construction register 734.

The namespace processing path illustrated in FIG. 7 may include a multiplexer 740 that may select an output of the construction register 734 to use as a global namespace identifier 714A as shown by arrow 742, for example, when the namespace processing path is configured to receive a local namespace identifier 714B as an input.

Referring to FIG. 7B, one or more operations of the namespace processing path may be similar to those illustrated in FIG. 7A, however, the namespace processing path may receive a global namespace identifier 714A from a queue 730. Thus, the multiplexer 740 may select the input global namespace identifier 714A to use (e.g., directly) as an internal namespace identifier (e.g., internal namespace identifier 319-1 or 319-5 illustrated in FIG. 3) as shown by arrow 744 or as an input to a converter 738 that may convert the global namespace identifier 714A to a different format that may be used for an internal namespace identifier.

Depending on the implementation details, the namespace processing path illustrated in FIG. 7A and FIG. 7B may provide relatively high-speed and/or unimpeded processing of a local and/or global namespace identifier by a controller.

Figure 8:
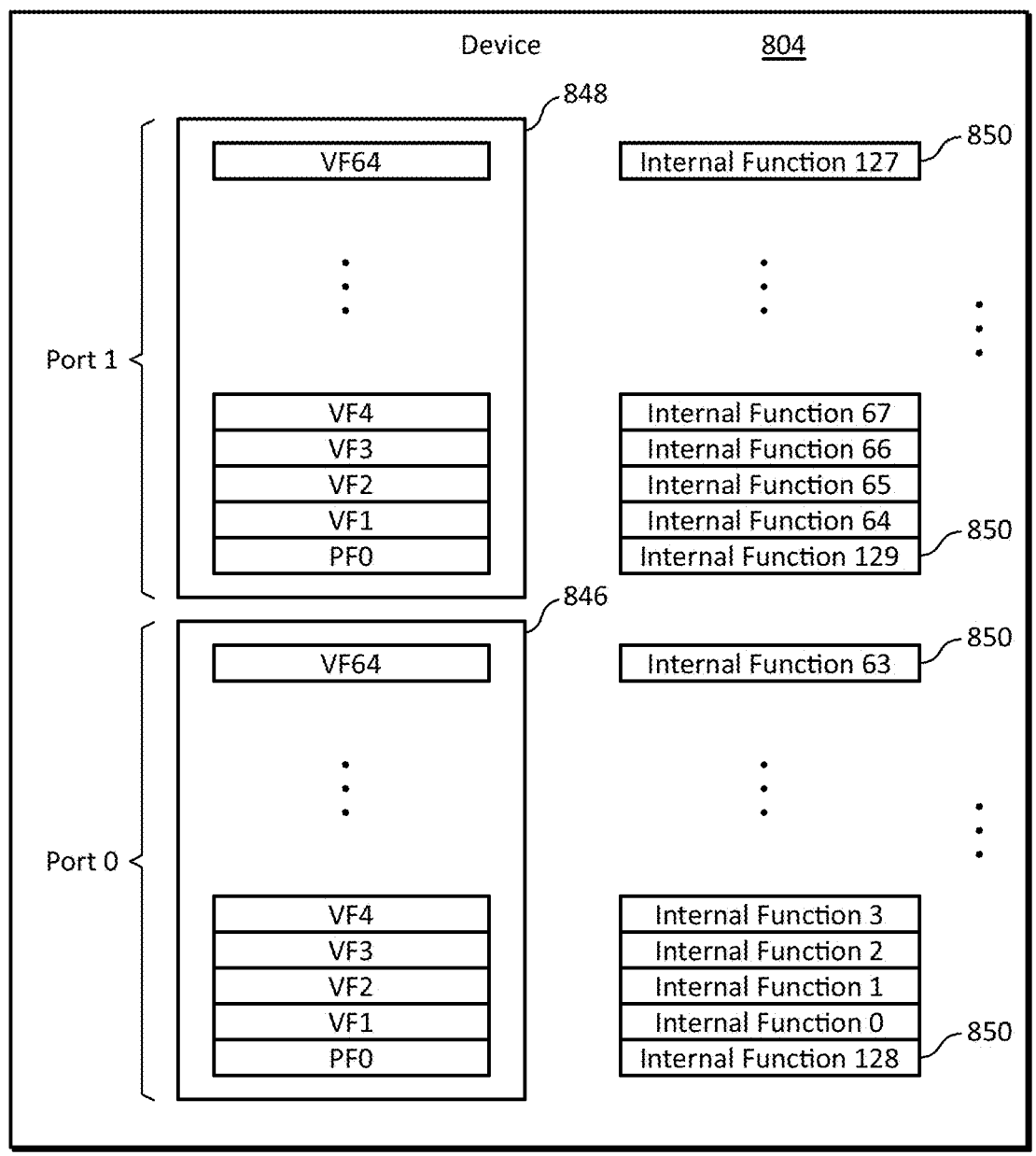
FIG. 8 illustrates an embodiment of a function identifier scheme for a device in accordance with example embodiments of the disclosure.

FIG. 8 illustrates an embodiment of a function identifier scheme for a device in accordance with example embodiments of the disclosure. The embodiment illustrated in FIG. 8 may be used, for example, with any namespace identifier disclosed herein that may include a function identifier, including the global namespace identifiers described with respect to FIG. 2, FIG. 3, FIG. 4, FIG. 5, FIG. 6, and/or FIG. 7. For purposes of illustration, the embodiment illustrated in FIG. 8 may be described in the context of a device implemented with a PCIe protocol (e.g., using SR-IOV), but aspects of the disclosure may be applied to any other type of communication protocol.

Referring to FIG. 8, a device 804 may include a first group of functions 846 configured to communicate using a first port identified as Port 0 and a second group of functions 848 configured to communicate using a second port identified as Port 1. The first group 846 may include a first physical function identified by physical function identifier PF0 and any number of virtual functions (that may include, for example, resources transferred from the first physical function) identified by virtual function identifiers VF0-VF64. The second group 848 may include a second physical function identified by physical function identifier PF0 and any number of virtual functions (that may include, for example, resources transferred from the second physical function) identified by virtual function identifiers VF0-VF64.

To distinguish between functions associated with Port 0 and Port 1, one or more (e.g., each) of the physical and/or virtual function identifiers may be mapped to a corresponding internal function identifier 850 as shown in FIG. 8. Thus, PF0 in group 846 (associated with Port 0) may be mapped to Internal Function 128, any of VF0-VF64 in group 846 (associated with Port 0) may be mapped to Internal Function 0-63, respectively, PF0 in group 848 (associated with Port 1) may be mapped to Internal Function 129, any of VF0-VF64 in group 848 (associated with Port 1) may be mapped to Internal Function 64-127, respectively.

The internal function identifiers 850 may be used, for example, as one or more of the function identifiers, including the global namespace identifiers described with respect to FIG. 2, FIG. 3, FIG. 4, FIG. 5, FIG. 6, and/or FIG. 7. For example, any of the internal function identifiers Internal Function 0-129 may be used as one of the controller identifiers 617 and/or 717 in the embodiments illustrated in FIG. 6 and/or FIG. 7, respectively.

In some embodiments, one or more physical functions may be included in one or more of the groups 846 and/or 848. In some embodiments that may be implemented, at least in part, with NVMe, a primary controller and/or secondary controller may be implemented with more or less than one function (e.g., physical function and/or virtual function). In some embodiments in which a storage device 804 may be implemented with two or more ports (e.g., Port 0 and Port 1) one port may be designated as a primary port and another port may be designated as a secondary port.

In some embodiments, a child controller may operate in a mode in which it may perform one or more operations of a parent controller. In such a mode, the child controller may be referred to as a promoted (e.g., a privileged) controller. In some embodiments, a child controller may operate as a promoted controller temporarily, for example, to perform a migration such as a live migration. A promoted controller may operate with one or more privileges (e.g., any number of privileges of a parent controller described herein) such as the ability to see and/or access one or more namespaces using a global namespace identifier (e.g., being able to use a mapping of a local namespace identifier to a controller identifier across a device). In some embodiments, a controller may operate in a first mode (e.g., a reduced privilege mode) in which it may identify a namespace using a local namespace identifier, and/or a second mode (e.g., an increased privilege mode) in which it may identify a namespace using a global namespace identifier.

Thus, for example, a child controller operating as a promoted controller may perform any number of the operations of any parent controller described herein such as the parent controllers 216A, 316A, and/or 416A, illustrated in FIG. 2, FIG. 3, and/or FIG. 4, respectively. In some embodiments, a child controller may be promoted by an associated parent controller, for example, based on one or more administrative commands received (e.g., from a host, virtual machine manager, and/or the like) by the associated parent controller.

Figure 9:
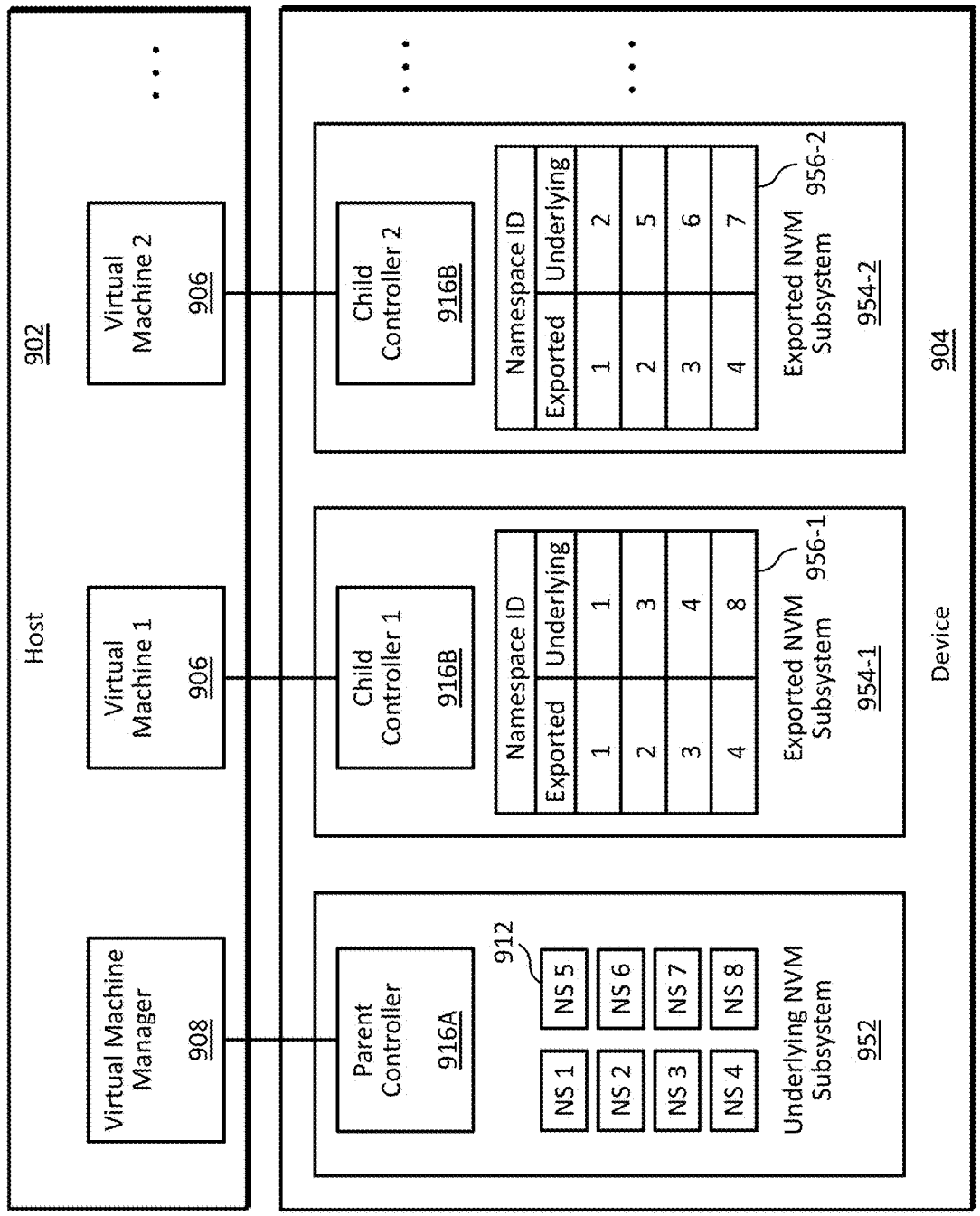
FIG. 9 illustrates an embodiment of a namespace identifier mapping scheme in accordance with example embodiments of the disclosure.

FIG. 9 illustrates an embodiment of a namespace identifier mapping scheme in accordance with example embodiments of the disclosure. The embodiment illustrated in FIG. 9 may be implemented, for example, using the embodiments illustrated in FIG. 1, FIG. 2, FIG. 3, and/or FIG. 4 in which similar elements may be indicated by reference numbers ending in, and/or containing, the same digits, letters, and/or the like. The embodiment illustrated in FIG. 9 may include a host 902 and/or a device 904 which may communicate using a communication fabric and/or communication framework such as those illustrated in FIG. 1.

The embodiment illustrated in FIG. 9 may include a host 902 and a device 904. One or more virtual machines 906 (identified as Virtual Machine 1, Virtual Machine 2, . . . ) may run on the host 902. One or more virtual machine managers (e.g., hypervisors) 908 may run on the host 902 and manage the one or more virtual machines 906.

The device 904 may include one or more parent controllers 916A and one or more child controllers 916B (some examples of which are identified as Child Controller 1 and Child Controller 2). The device 904 may include one or more namespaces 912 (identified as NS 1 through NS 8 that may be configured as part of an underlying subsystem (e.g., NVM subsystem) 952 that may be used, for example, as a source of physical resources that may be exported to one or more exported subsystems (e.g., exported NVM subsystems) 954. For example, the underlying namespaces 912 identified as NS 1, NS 3, NS 4, and/or NS 8 may be exported to the exported subsystem 954-1 identified as Exported Subsystem 1 which may include Child Controller 1 to which the exported namespaces NS 1, NS 3, NS 4, and/or NS 8 may be attached. As a further example, the underlying namespaces 912 identified as NS 2, NS 5, NS 6, and/or NS 7 may be exported to the exported subsystem 954-2 identified as Exported Subsystem 2 which may include Child Controller 2 to which the exported namespaces NS 2, NS 5, NS 6, and/or NS 7 may be attached. The parent controller 916A may be assigned to the virtual machine manager 908, Child Controller 1 may be assigned to Virtual Machine 1, and Child Controller 2 may be assigned to Virtual Machine 2.

The host 902 and device 904 may communicate using a communication fabric, framework, and or the like, as described with respect to the embodiment illustrated in FIG. 1. For example, in some embodiments, the host 902 and device 904 may communicate using a PCIe fabric, and one or more of the child controllers 916B and/or parent controllers 916A may be implemented, at least in part, with a PCIe function (e.g., the parent controller 916A may be implemented as a physical function and one or more of the child controllers 916B may be implemented as one or more virtual functions associated with the physical function. In an embodiment implemented at least in part with NVMe, one or more of the underlying NVM subsystems 952 and/or exported subsystems 954 may be implemented as NVM subsystems.

In some embodiments, one or more of the exported namespaces 912 may use an internal namespace identifier (e.g., a physical namespace identifier which may be implemented and/or referred to as an underlying namespace identifier). To enable one or more of the exported namespaces 912 to be accessed by a virtual machine 906 using a local namespace identifier, the embodiment illustrated in FIG. 9 may map one or more local namespace identifiers to one or more underlying namespace identifiers. In some embodiments, the mapping may be implemented, at least in part using one or more mapping data structures such as the mapping tables 956 illustrated in FIG. 9.

For example, the mapping table 956-1 in Exported subsystem 954-1 may indicate that the underlying namespaces NS 1, NS 3, NS 4, and/or NS 8 may be mapped to local namespace identifiers (which may also be referred to as exported namespace identifiers) 1, 2, 3, and/or 4, respectively. The mapping table 956-2 in Exported subsystem 954-2 may indicate that the underlying namespaces NS 2, NS 5, NS 6, and/or NS 7 may be mapped to local (exported) namespace identifiers 1, 2, 3, and/or 4, respectively.

In some embodiments, and depending on the implementation details, a namespace identifier mapping scheme in accordance with example embodiments of the disclosure may implement any number of the following features and/or provide any number of the following benefits. From the point of view of a virtual machine, one or more (e.g., each) child controller 916B may be implemented as an exported NVM subsystem with the corresponding child controller 916B. Depending on the implementation details, a 1:1 mapping of a child controller 916B to an exported NVM subsystem may be implemented without an identifier being set by the host 902.

Through the parent controller 916A, the host 902 may be able to create namespaces (i.e., underlying namespaces) and/or map one or more exported namespaces to one or more underlying namespaces in an exported NVM subsystem 954. In some embodiments, a controller may essentially implement a virtual NVM subsystem, for example, with a controller specifying one or more identifiers with the possible exception of one or more exported namespaces. In some embodiments, a parent controller 916A may implement: (1) reporting an exported NVM subsystem for one or more child controllers (e.g., using a controller identifier); (2) managing an exported NVM subsystem command (e.g., host to controller data transfer), for example, for new operations, to initiate a controller migration, to pause a migrating controller, to resume a migrated controller, and/or the like; and/or (3) managing an exported namespace command, for example, for a new operation with a controller identifier and/or to add and/or delete host specified exported NSIDs.

Figure 10:
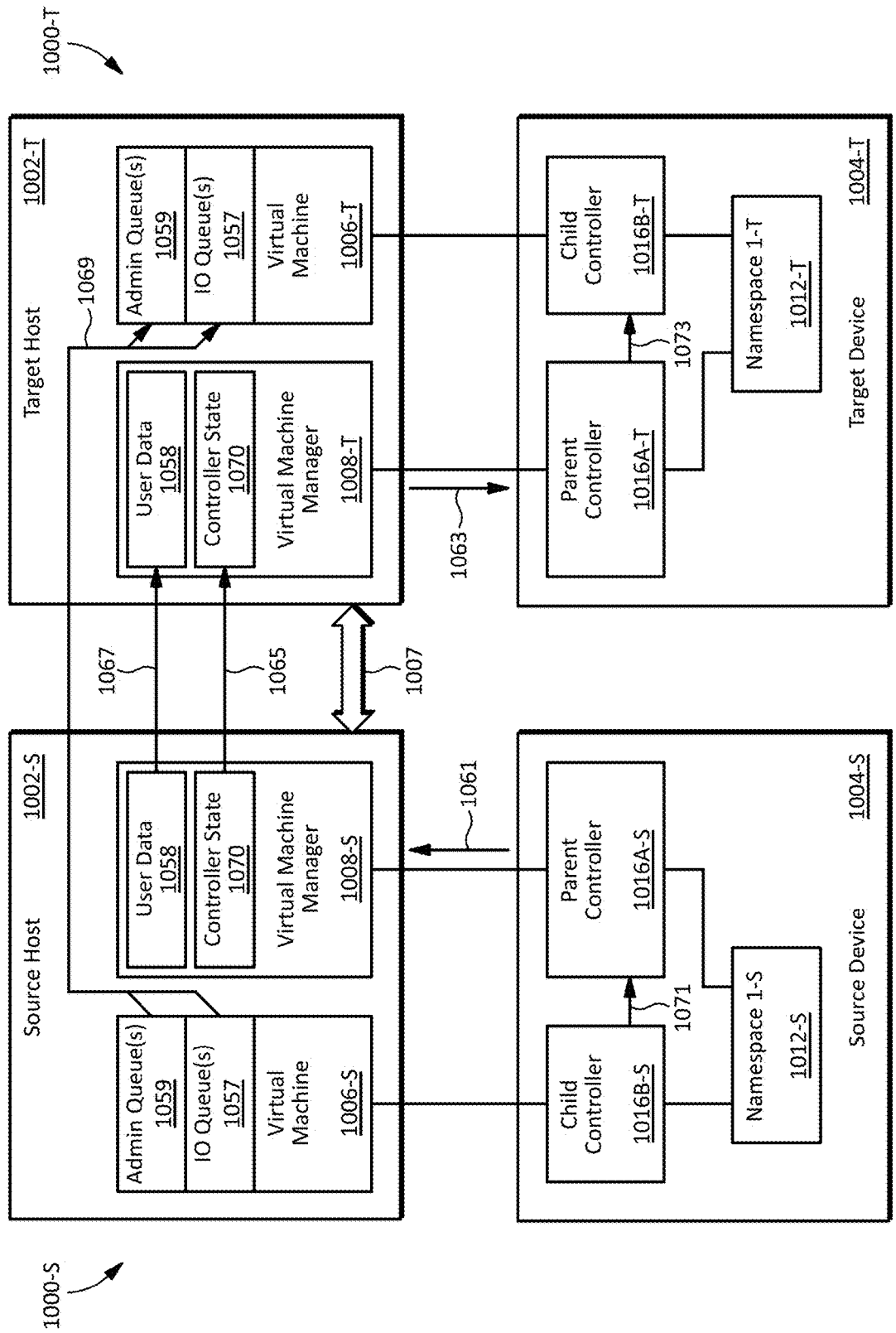
FIG. 10 illustrates an embodiment of a migration scheme in accordance with example embodiments of the disclosure.

FIG. 10 illustrates an embodiment of a migration scheme in accordance with example embodiments of the disclosure. The embodiment illustrated in FIG. 10 may include one or more elements that may be similar to elements in one or more other embodiments illustrated herein in which similar elements may be indicated by reference numbers ending in, and/or containing, the same digits, letters, and/or the like.

The embodiment illustrated in FIG. 10 may include a source host 1002-S and a source device 1004-S which may be referred to individually and/or collectively as the source system and/or the source 1000-S and which may communicate using a communication fabric and/or communication framework such as those illustrated in FIG. 1.

The source device 1004-S may include one or more resources referred to as a namespace 1012-S (identified as Namespace 1-S) and/or a child controller 1016B-S that may be assigned to a virtual machine 1006-S running on the source host 1002-S. Namespace 1-S, which may be configured as a private namespace, may be attached to the child controller 10162-S. Depending on the implementation details, the virtual machine 1006-S, child controller 1016B-S, and/or Namespace 1-S may be configured to operate as a logically separate (e.g., isolated) system, for example, using a local namespace identifier to access Namespace 1-S. Thus, depending on the implementation details, the virtual machine 1006-S, child controller 1016B-S, and/or Namespace 1-S may be unaware of, and/or unable to interact with, any other virtual machines, controllers, namespaces, and/or the like.

The source host 1002-S may also include a virtual machine manager 1008-S that may manage one or more virtual machines such as virtual machine 1006-S. In some embodiments, the virtual machine manager 1008-S may control, at least in part, a migration of the virtual machine 1006-S, child controller 1016B-S, and/or Namespace 1-S from the source system 1000-S to the target system 1000-T.

The embodiment illustrated in FIG. 10 may also include a target host 1002-T and a target device 1004-T which may be referred to individually and/or collectively as the target system and/or the target 1000-T. The target host 1002-T and/or target device 1004-T may be provisioned with one or more resources to accommodate migrating the virtual machine 1006-S to the target system 1000-T. For example, the target host 1002-7 may include one or more compute resources, memory resources, and/or the like, that may be configured to run a target virtual machine 1006-T to which the source virtual machine 1006-S may be migrated (e.g., copied). As another example, the target device 1004-T may include one or more resources (e.g., storage resources, compute resources, memory resources, network resources, and/or the like) referred to as a namespace 1012-T (identified as Namespace 1-T) to which user data for the virtual machine 1006-S may be migrated. As a further example, the target device 1004-T may include one or more controllers 1016B to which a controller state for the child controller 1016B-S may be migrated.

The target host 1002-7 may also include a virtual machine manager 1008-T that may manage one or more virtual machines such as virtual machine 1006-T. In some embodiments, the virtual machine manager 1008-T may control, at least in part, a migration of the virtual machine 1006-S, child controller 1016B-S, and/or Namespace 1-S from the source system 1000-S to the target system 1000-T.

The source host 1002-S may communicate with the source device 1004-S, and the target host 1002-T may communicate with the target device 1000-T, using one or more communication fabrics, frameworks, and/or the like, as described above, for example, with respect to FIG. 1, FIG. 2, FIG. 3, FIG. 4, and/or FIG. 9. For example, the hosts 1002-S and 1002-T may communicate with the devices 1004-S and 1004-T, respectively, at least in part, with PCIe interconnects in which the parent controllers 1016A-S and 1016A-T may be implemented with physical functions, and the child controllers 1016B-S and 1016B-T may be implemented with virtual functions associated with corresponding physical functions, respectively.

The source host 1002-S may communicate with the target host 1002-T using a communication path 1007 that may be implemented with one or more communication fabrics, frameworks, and/or the like, as described above, including interconnects, interfaces, protocols, networks, networks of networks, (e.g., an internet) and/or the like. For example, in some embodiments in which the source system 1000-S and the target system 1000-T may be located in the same datacenter or different datacenters that are relatively close, the communication path 1007 may be implemented with a network technology such as Ethernet, FibreChannel, Infini-Band, and/or the like. As another example, in some embodiments in which the source system 1000-S and the target system 1000-T may be located in datacenters that are relatively far apart (e.g., different cities, states, continents, and/or the like), the communication path 1007 may be implemented, at least in part with the public internet, a private internet, a dedicated private network, and/or the like.

In some embodiments, to facilitate the migration of the source virtual machine 1006-S to the target virtual machine 1006-T, the source device 1004-S may include a source parent controller 1016A-S, and/or the target device 1004-T S may include a target parent controller 1016A-T. The source parent controller 1016A-S may be assigned to the source virtual machine manager 1008-S, and/or the target virtual machine manager 1016A-T may be assigned to the target virtual machine manager 1008-T. Depending on the implementation details, Namespace 1-S may be attached to source parent controller 1016A-S and/or may otherwise be configured to enable the source parent controller 1016A-S to access (e.g., read) Namespace 1-S. Depending on the implementation details, Namespace 1-T may be attached to target parent controller 1016A-T and/or may otherwise be configured to enable the source parent controller 1016A-T to access (e.g., write) Namespace 1-T.

A first example embodiment of a migration operation of the scheme illustrated in FIG. 10 may proceed as follows. The source virtual machine 1006-S may initially be running on the source host 1002-S using the source child controller to access Namespace 1-S. The source host 1002-S may issue a command to pause the source virtual machine 1006-S. While the virtual machine 1006-S is paused, a state of the virtual machine 1006-S may be transferred to the target virtual machine 1006-T including, for example, program memory, data memory, one or more administrative queues 1059, one or more IO queues 1057, and/or the like. Also while the virtual machine 1006-S is paused, the source virtual machine manager 1008-S may read, using the source parent controller 1016A-S, user data 1058 from Namespace 1-S and/or controller state information 1070 from source child controller 1016B-S as shown by arrow 1061. In some embodiments, the source parent controller 1016A-S may read the controller state information 1070 from the source child controller 1016B-S as shown by arrow 1071. The source virtual machine manager 1008-S may transfer the user data 1058 and/or controller state information 1070 to the target virtual machine manager 1008-T as shown by arrows 1065 and/or 1067, respectively, for example, using the communication path 1007. The target virtual machine manager 1008-T may transfer the user data 1058 and/or controller state information 1070 to Namespace 1-T and/or target child controller 1016B-T, respectively, as shown by arrow 1063. In some embodiments, the target parent controller 1016A-T may write the controller state information 1070 to the target child controller 1016B-T as shown by arrow 1073. The target virtual machine 1006-T may be restarted (e.g., after some or all of the data has been transferred from the source system 1000-S to the target system 1000-T) and continue operating using the resources at the target system 1000-T.

A second example embodiment of a migration operation, which may be referred to as a live migration, of the scheme illustrated in FIG. 10 may proceed as follows. While the source virtual machine 1006-S is running, the source virtual machine manager 1008-S may begin reading user data of the source virtual machine 1006-S from memory and/or Namespace 1-S and transferring it to memory and/or Namespace 1-T at the target system 1000-T using the target virtual machine manager 1008-T. However, because the source virtual machine 1006-S may still be running, it may change values in its memory space on the source host 1002-S and/or Namespace 1-S. Thus, the source host 1002-S may maintain one or more migration queues for memory and/or namespace data that has become dirty during the migration process. The source virtual machine manager 1008-S may migrate memory and/or namespace data from the one or more migration queues to the target system 1000-T. The virtual machine manager 1008-S may select a point at which to pause the source virtual machine and transfer any remaining virtual machine memory and/or controller state data and/or namespace user data and/or any data remaining in the one or more migration queues to the target system 1000-T. The target virtual machine 1006-T may be restarted (e.g., after some or all of the data has been transferred from the source system 1000-S to the target system 1000-T) and continue operating using the resources at the target system 1000-T.

Figure 11:
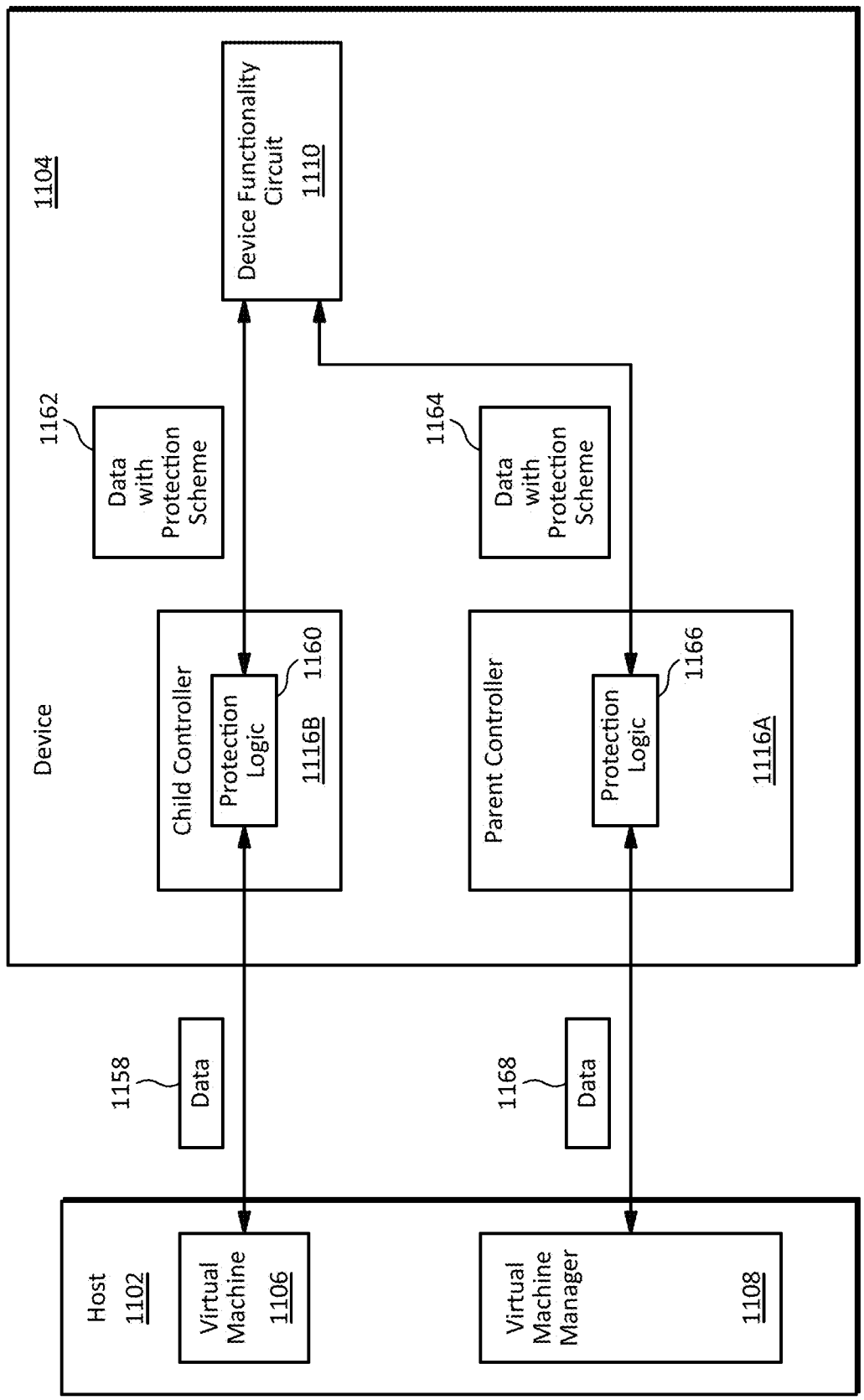
FIG. 11 illustrates a first embodiment of a data protection scheme for a data transfer operation in accordance with example embodiments of the disclosure.

FIG. 11 illustrates a first embodiment of a data protection scheme for a data transfer operation in accordance with example embodiments of the disclosure. The embodiment illustrated in FIG. 11 may include one or more elements that may be similar to elements in one or more other embodiments illustrated herein in which similar elements may be indicated by reference numbers ending in, and/or containing, the same digits, letters, and/or the like.

The embodiment illustrated in FIG. 11 may include a host 1102 and a device 1104 that may communicate using a communication fabric and/or communication framework such as those illustrated in FIG. 1. The host 1102 may include a virtual machine 1106 and/or a virtual machine manager 1108, both of which may run using compute resources, memory resources, and/or the like, at the host 1102. The device 1104 may include a child controller 1116B that may be assigned to the virtual machine 1106 and a device functionality circuit 1110 that may be attached to the child controller 1116B.

The virtual machine 1106 may send data 1158 to the child controller 1116B which may use protection logic 1160 to apply a protection scheme (e.g., encoding, encrypting, and/or the like) to the data 1158 to generate data 1162 that may be protected with the protection scheme (which may be referred to as data with the protection scheme). The child controller 1116B may send the data with the protection scheme 1162 to the device functionality circuit 1110 (or portion thereof), for example, as write data to store in storage resources, for processing by compute resources, for transmission by communication resources, and/or the like, based on one or more write commands received from the virtual machine 1106. In some embodiments, the data 1158 received by the child controller 1116B may already have one or more types of protection. For example, the data 1158 may be protected by one or more protection schemes (e.g., encoding, encrypting, a checksum for error detection, and/or the like) in addition to a protection scheme that may be applied by the child controller 1116B.

The child controller 1116B may receive the data with the protection scheme 1162 from the device functionality circuit 1110, for example, as read data retrieved from storage resources, as results of processing by compute resources, as received data from communication resources, and/or the like, based on one or more read commands received from the virtual machine 1106. The child controller 1116B may use protection logic 1160 to modify (e.g., remove, replace, alter, and/or the like) the protection scheme applied to the data 1162 (e.g., decoding, decrypting, and/or the like the data 1162) to generate data 1158 which the child controller 1116B may send to the virtual machine 1106.

In some embodiments, the child controller 1116B may include error correction functionality such as an error correction code (ECC) circuit that may correct errors in data exchanged between the child controller 1116B and the device functionality circuit 1110.

Depending on the implementation details, the child controller 1116B and/or device functionality circuit 1110 may be configured to appear as a separate logical device (e.g., a logical storage device). For example, the child controller 1116B and/or device functionality circuit 1110 may be configured as an NVM subsystem. The virtual machine 1106 may therefore be configured to run one or more operating systems, applications, services, processes, and/or the like, and send user data to device functionality circuit 1110 (or portion thereof) which, at least from the perspective of the virtual machine 1106, may appear to be a separate logical device that may be isolated from one or more other resources of the device 1104. Thus, depending on the implementation details, the virtual machine 1106 may not be aware of one or more other controllers, device functionality circuits (or portion thereof), and/or the like, at device 1104.

The device 1104 may also include a parent controller 1116A that may be assigned to the virtual machine manager 1108 and may be configured to provide the virtual machine manager 1108 with access to the device functionality circuit 1110. The parent controller 1116A may read data 1164 that may be protected with the protection scheme from the device functionality circuit 1110, for example, based on one or more read commands received from the virtual machine manager 1108. The parent controller 1116A may include protection logic 1166 that may modify (e.g., remove, replace, alter, and/or the like) the protection scheme applied to the data 1164 (e.g., by decoding, decrypting, and/or the like, the data 1164) to generate data 1168 which the parent controller 1116A may send to the virtual machine manager 1108. The parent controller 1116A may send the data 1168 to the virtual machine manager 1108, for example, based on one or more read commands received from the virtual machine manager 1108.

In some embodiments, the data 1162 may be generated by the child controller 1116B, for example, if the device functionality circuit 1110 is implemented at least in part with storage media, and thus, the data 1164 read by the parent controller 1116A may be the same data 1162 generated by the child controller 1116B and stored in the device functionality circuit 1110. In some other embodiments, the data 1164 may be generated by the device functionality circuit 1110 or external apparatus, for example, if the device functionality circuit 1110 is implemented at least in part with compute resources, communication resources, and/or the like, and thus, the data 1164 may include computational results (e.g., based on the data 1162), data received from an external apparatus, and/or the like.

In some embodiments, the parent controller 1116A may receive the data 1168 from the virtual machine manager 1108, for example, based on one or more write commands received from the virtual machine manager 1108. The parent controller 1116A may use protection logic 1166 to generate, from the data 1168, the data 1164 that may be protected with the protection scheme. The parent controller 1116A may send the protected data 1164 to the device functionality circuit 1110 (or portion thereof), for example, based on one or more write commands received from the virtual machine manager 1108.

In some embodiments, the parent controller 1116A may include error correction functionality such as an error correction code (ECC) circuit that may correct errors in data exchanged between the parent controller 1116A and the device functionality circuit 1110.

In the embodiment illustrated in FIG. 11, the host 1102 and device 1104 may communicate using a communication fabric, framework, and/or the like, as described with respect to the embodiment illustrated in FIG. 1. For example, in some embodiments, the host 1102 and device 1104 may communicate using a PCIe fabric, and one or more of the child controllers 1116B and/or parent controllers 1116A may be implemented, at least in part, with a PCIe function (e.g., a parent controller 1116A as a physical function and a child controller 1116B as a virtual function associated with the physical function). As another example, the host 1102 and device 1104 may communicate using a network fabric, and one or more of the child controllers 1116B and/or parent controllers 1116A may be implemented, at least in part with a network endpoint.

Although it is not limited to any specific application, the embodiment illustrated in FIG. 11 may be used as part of a migration scheme, for example, to implement one or more of the source systems 1000-S and/or target systems 1000-T illustrated in FIG. 10. For example, if the embodiment illustrated in FIG. 11 is used to implement the source system 1000-S illustrated in FIG. 10, the parent controller 1116A and the child controller 1116B may be used to implement the source parent controller 1016A-S and source child controller 1016B-S, respectively, the device functionality circuit 1110 may be used to implement Namespace 1-S, and/or the virtual machine manager 1108 may be used to implement the virtual machine manager 1008-S. Thus, the parent controller 1116A may read protected migration data (e.g., user data) 1164 from the device functionality circuit 1110, generate data 1168 as migration data using protection logic 1166 (e.g., by modifying a protection scheme applied by the child controller 1116B), and send the migration data 1168 to the virtual machine manager 1108 as part of a migration operation to migrate the virtual machine 1106, the child controller 1116B, and/or the device functionality circuit 1110 to a different location.

Similarly, if the embodiment illustrated in FIG. 11 is used to implement the target system 1000-T illustrated in FIG. 10, the parent controller 1116A and the child controller 1116B may be used to implement the target parent controller 1016A-T and the target child controller 1016B-T, respectively, the device functionality circuit 1110 may be used to implement Namespace 1-T, and/or the virtual machine manager 1108 may be used to implement the virtual machine manager 1008-T. Thus, the parent controller 1116A may receive migration data (e.g., user data) 1168 from the virtual machine manager 1108, generate protected data 1164 using protection logic 1166 to apply a protection scheme (e.g., encoding, encrypting, and/or the like) to the data 1168, and write the protected data 1164 to the device functionality circuit 1110 as part of a migration operation to migrate a virtual machine, child controller, and/or device functionality circuit (or data stored therein) from a different location to the virtual machine 1106, the child controller 1116B, and/or the device functionality circuit 1110 illustrated in FIG. 11.

However, sending data 1168 (which may be, for example, clear data) from the device 1104 may create one or more security risks. For example, the data 1168 may be intercepted and/or used for unauthorized purposes at any point in the data migration path illustrated in FIG. 10 including, for example, anywhere in a communication fabric between the source device 1004-S and the source host 1002-S, anywhere at the source host 1002-S (including the source virtual machine manager 1008-S), anywhere in the communication path 1007 between the source host 1002-S and the target host 1002-T, anywhere at the target host 1002-T (including the target virtual machine manager 1008-T), and/or anywhere in a communication fabric between the target host 1002-T and the target device 1004-T (e.g.,).

Figure 12:
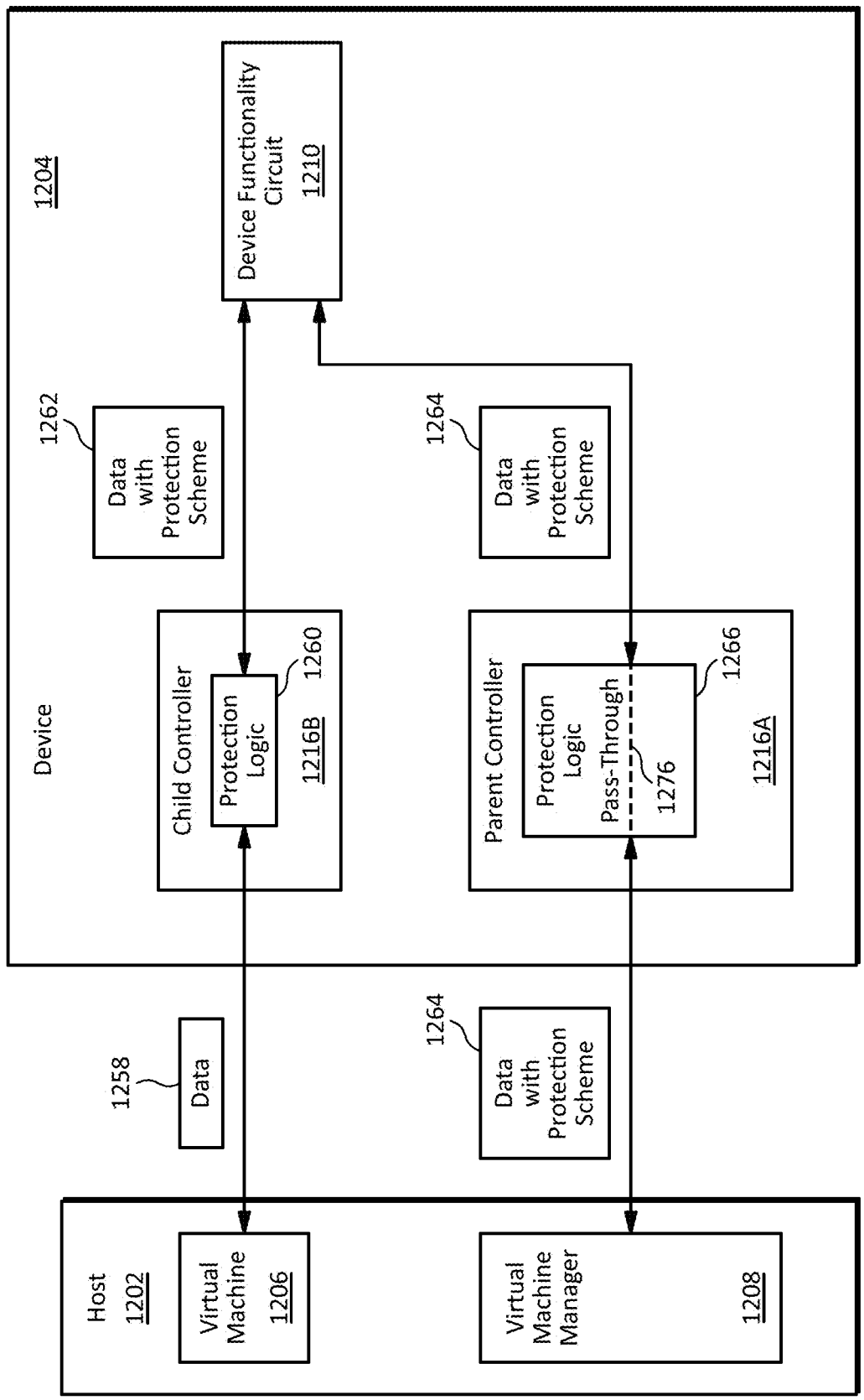
FIG. 12 illustrates a second embodiment of a data protection scheme for a data transfer operation in accordance with example embodiments of the disclosure.

FIG. 12 illustrates a second embodiment of a data protection scheme for a data transfer operation in accordance with example embodiments of the disclosure. The embodiment illustrated in FIG. 12 may include one or more elements that may be similar to elements illustrated in FIG. 11 in which similar elements may be indicated by reference numbers ending in, and/or containing, the same digits, letters, and/or the like. In the embodiment illustrated in FIG. 12, a host 1202 and device 1204 may communicate using a communication fabric, framework, and/or the like, as described with respect to the embodiment illustrated in FIG. 1.

In some aspects, the embodiment illustrated in FIG. 12 may operate in a manner similar to the embodiment illustrated in FIG. 11. However, in the embodiment illustrated in FIG. 12, the parent controller 1216A may bypass or omit an operation to modify (e.g., remove, replace, alter, and/or the like) the protection scheme applied to the data 1264, for example, by using a pass-through path 1276 (e.g., in protection logic 1266) to send the protected data 1264 having the protection scheme applied by the protection logic 1260 at the child controller 1216B to the virtual machine manager 1208. The parent controller 1216A may send the protected data 1264 to the virtual machine manager 1208, for example, based on a read command received from the virtual machine manager 1208. Depending on the implementation details, this may reduce or eliminate one or more security risks associated with sending data (e.g., clear data) from the device 1204.

For example, if the device 1204 is used to implement the source device 1004-S and/or target device illustrated in FIG. 10, the protected data 1264 may be protected through some or all of a migration path between the source device 1004-S the target device 1004-T. Moreover, depending on the implementation details, the data 1264 sent from the device 1204 by the parent controller 1216A may be protected using processing (e.g., one or more computations) performed by the protection logic 1260 at the child controller 1216B, and thus, sending the data 1264 with a protection scheme may involve little or no additional processing (e.g., computations) by the parent controller 1216A and/or protection logic 1266.

Although the protection logic 1260 and 1266 may be illustrated as being implemented as part of child controller 1216B and parent controller 1216A, respectively, in some embodiments, any of the protection logic 1260 and/or 1266 illustrated in FIG. 12, and/or in any other embodiments disclosed herein, may be implemented separately from one or more controllers.

Figure 13:
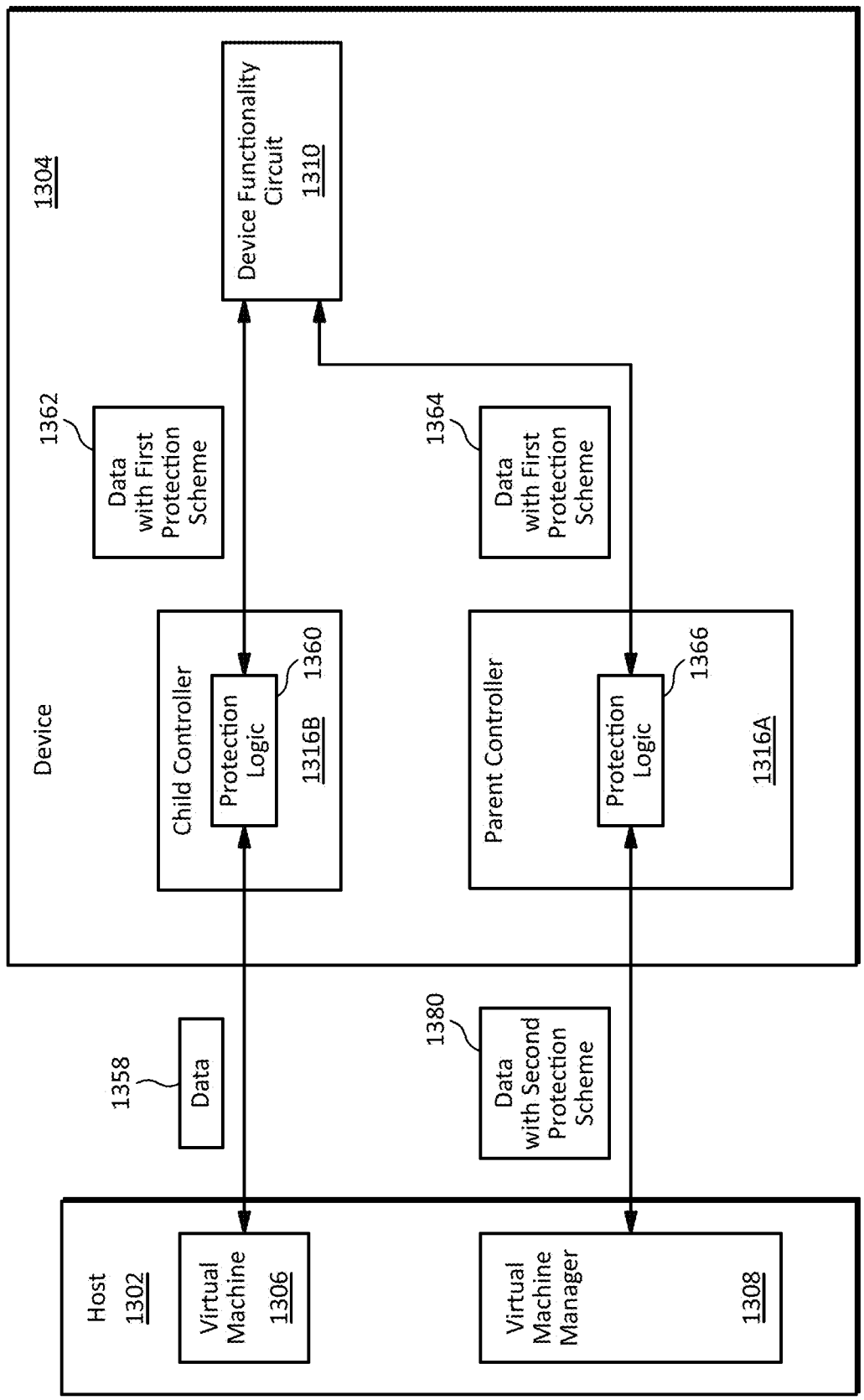
FIG. 13 illustrates a third embodiment of a data protection scheme for a data transfer operation in accordance with example embodiments of the disclosure.

FIG. 13 illustrates a third embodiment of a data protection scheme for a data transfer operation in accordance with example embodiments of the disclosure. The embodiment illustrated in FIG. 13 may include one or more elements that may be similar to elements illustrated in FIG. 11 and/or FIG. 12 in which similar elements may be indicated by reference numbers ending in, and/or containing, the same digits, letters, and/or the like. In the embodiment illustrated in FIG. 13, a host 1302 and device 1304 may communicate using a communication fabric, framework, and/or the like, as described with respect to the embodiment illustrated in FIG. 1.

In some aspects, the embodiment illustrated in FIG. 13 may operate in a manner similar to the embodiment illustrated in FIG. 12. However, in the embodiment illustrated in FIG. 13, the protection logic 1360 at the child controller 1316B may be configured to apply a first protection scheme (e.g., encoding, encryption, and/or the like) to data 1358 to generate the data 1362 with the first protection scheme, whereas the protection logic 1366 at the parent controller 1316A may be configured to apply a second protection scheme (e.g., encoding, encryption, and/or the like) to generate, based on the data 1364, the data 1380 protected with a second protection scheme. For example, in some embodiments, the protection logic 1366 may decrypt, using a first encryption scheme applied by the protection logic 1360 at the child controller 1316B, the data 1364 to generate clear data and apply a second encryption scheme to the clear data to generate the data 1380 protected with a second encryption scheme.

In some embodiments, and depending on the implementation details, the embodiment illustrated in FIG. 13 may enable a first protection scheme to be used internally for data within the device 1304 and a second protection scheme to be used for data sent from, and/or received at, the device 1304 using the parent controller 1316A. For example, in some embodiments, in some embodiments, a first encryption scheme with a first number of bits (e.g., a relatively small number of bits) may be used internally for data within the device 1304 (which, depending on the implementation details, may be implemented as a relatively secure environment), and a second encryption scheme with a second number of bits (e.g., a relatively large number of bits) may be used for data sent to, and/or received from, an external environment.

Although not limited to any specific applications, the embodiments illustrated in FIG. 12 and/or FIG. 13 may be used as part of a migration scheme, for example, to implement one or more of the source systems 1000-S and/or target systems 1000-T illustrated in FIG. 10.

Figure 14:
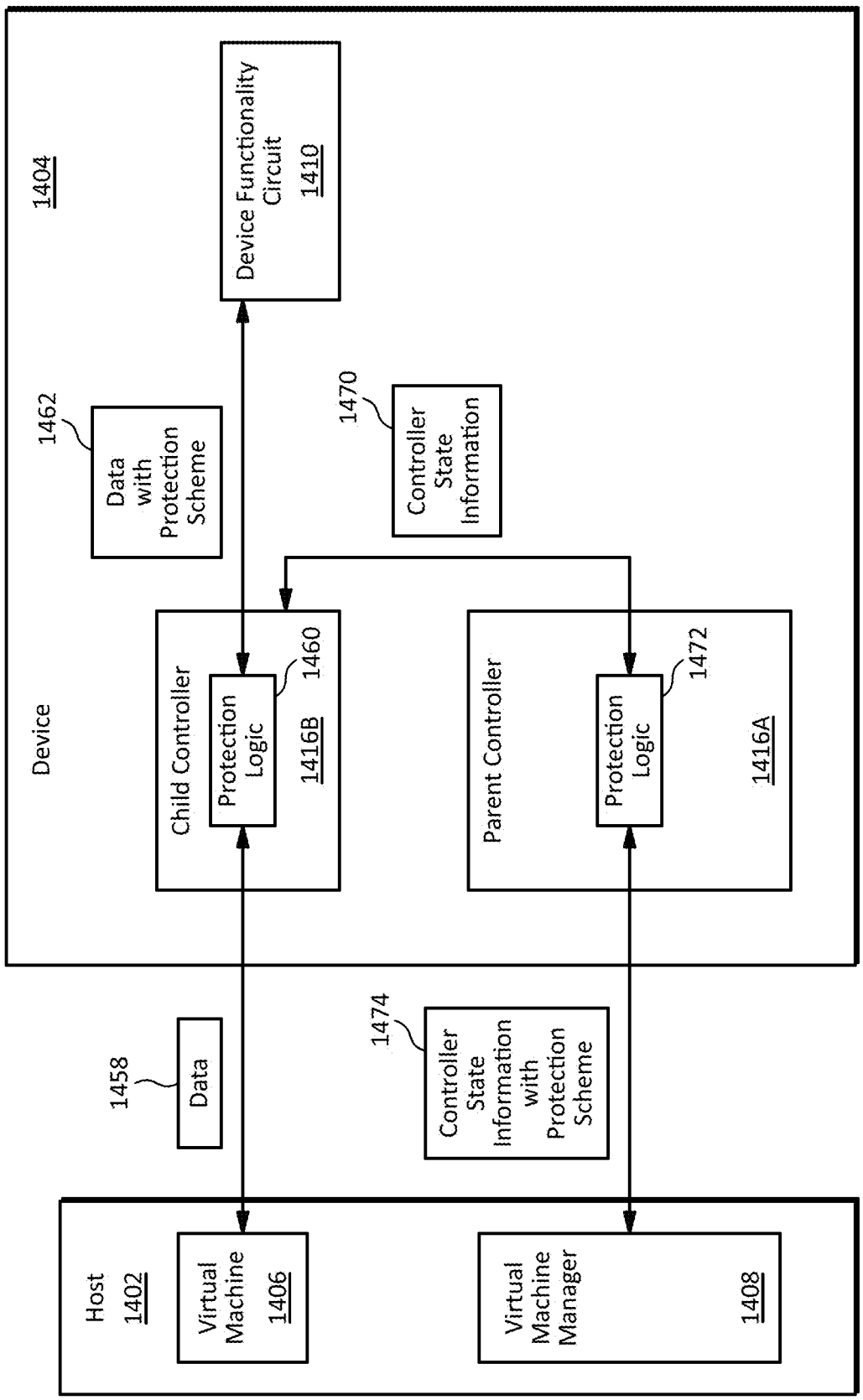
FIG. 14 illustrates a fourth embodiment of a data protection scheme for a data transfer operation in accordance with example embodiments of the disclosure.

FIG. 14 illustrates a fourth embodiment of a data protection scheme for a data transfer operation in accordance with example embodiments of the disclosure. The embodiment illustrated in FIG. 14 may include one or more elements that may be similar to elements illustrated in FIG. 11, FIG. 12, and/or FIG. 13 in which similar elements may be indicated by reference numbers ending in, and/or containing, the same digits, letters, and/or the like. In the embodiment illustrated in FIG. 14, a host 1402 and device 1404 may communicate using a communication fabric, framework, and/or the like, as described with respect to the embodiment illustrated in FIG. 1.

In some aspects, the embodiment illustrated in FIG. 14 may operate in a manner similar to the embodiments illustrated in FIG. 11, FIG. 12, and/or FIG. 13. However, in the embodiment illustrated in FIG. 14, the parent controller 1416A may be configured to receive controller state information 1470 (which may also be referred to controller metadata) from child controller 1416B, for example, in a form that may be at least partially clear (e.g., unencoded, unencrypted, and/or the like which). The parent controller 1416A may include protection logic 1472 that may generate controller state information 1474 (which may be referred to as protected controller state information 1474) that may be protected using a protection scheme (e.g., encoding, encrypting, and/or the like). The parent controller 1416A may send the protected controller state information 1474 to the virtual machine manager 1408, for example, based on a command (e.g., a read controller state command) received from the virtual machine manager 1408.

Examples of controller state information 1470 may include any number of the following: (1) one or more submission queue and/or completion queue pointer states; (2) contents of one or more submission queues and/or completion queues; (3) one or more settings for an underlying transport physical layer, protocol, and/or the like such as one or more PCIe settings and/or identifying information for a child function (e.g., a virtual function or a physical function that may be configured as a child function such as PF1, PF2, etc.); (4) one or more protocol settings such as NVMe settings and/or identifying information for a child controller; and/or the like.

In some embodiments, the parent controller 1416A may receive protected (e.g., encoded, encrypted, and/or the like) controller state information 1474 from the virtual machine manager 1408, for example, based on a command (e.g., a write controller state command) received from the virtual machine manager 1408. The parent controller 1416A may use protection logic 1472 to modify (e.g., remove, replace, alter, and/or the like) the protection scheme applied to the protected controller state information 1474 (e.g., decoding, decrypting, and/or the like the data 1474) to generate controller state information 1470 which the parent controller 1416A may send to the child controller 1416B. In some embodiments, the parent controller 1416A may write the controller state information 1470 to the child controller 1416B, for example, based on a command (e.g., a write controller state command) received from the virtual machine manager 1408. In some embodiments, writing the controller state information 1470 to the child controller 1416B may configure the child controller 1416B, for example, to place the child controller 14116B in a state that may be similar or identical to the state of a child controller 1416B from another location as part of a migration operation.

Although it is not limited to any specific application, the embodiment illustrated in FIG. 14 may be used as part of a migration scheme, for example, to implement one or more of the source systems 1000-S and/or target systems 1000-T illustrated in FIG. 10. For example, if the embodiment illustrated in FIG. 14 is used to implement the source system 1000-S illustrated in FIG. 10, the parent controller 1416A and the child controller 1416B may be used to implement the source parent controller 1016A-S and source child controller 1016B-S, respectively, the device functionality circuit 1410 may be used to implement Namespace 1-S, and/or the virtual machine manager 1408 may be used to implement the virtual machine manager 1008-S. Thus, the parent controller 1416A may read state information 1470 from the child controller 1416B, generate protected controller state information 1474 from the state information 1470 using protection logic 1472, and send the protected controller state information 1474 to the virtual machine manager 1408, for example, to enable the state of the child controller 1416B to be migrated to the target child controller 1016B-T as part of migrating the virtual machine 1006-S to the virtual machine 1006-T. The embodiment illustrated in FIG. 14 may be used as part of a migration scheme, for example, in embodiments in which the device functionality circuit 1410 may or may not include data that may be migrated, for example, if the device functionality circuit 1410 is implemented with one or more storage resources, compute resources, communication (e.g., network) resources, and/or the like.

Similarly, if the embodiment illustrated in FIG. 14 is used to implement the target system 1000-T illustrated in FIG. 10, the parent controller 1416A and the child controller 1416B may be used to implement the target parent controller 1016A-T and the target child controller 1016B-T, respectively, the device functionality circuit 1410 may be used to implement Namespace 1-T, and/or the virtual machine manager 1408 may be used to implement the virtual machine manager 1008-T. Thus, the parent controller 1416A may receive protected controller state information 1474 from the virtual machine manager 1408, generate controller state information 1470 using protection logic 1472, and write the controller state information 1470 to the child controller 1416B, for example, to configure the target child controller 1016B-T to operate in the same manner as the source child controller 1016-S after the virtual machine 1006-S is migrated to the virtual machine 1006-T and restarted.

Figure 15:
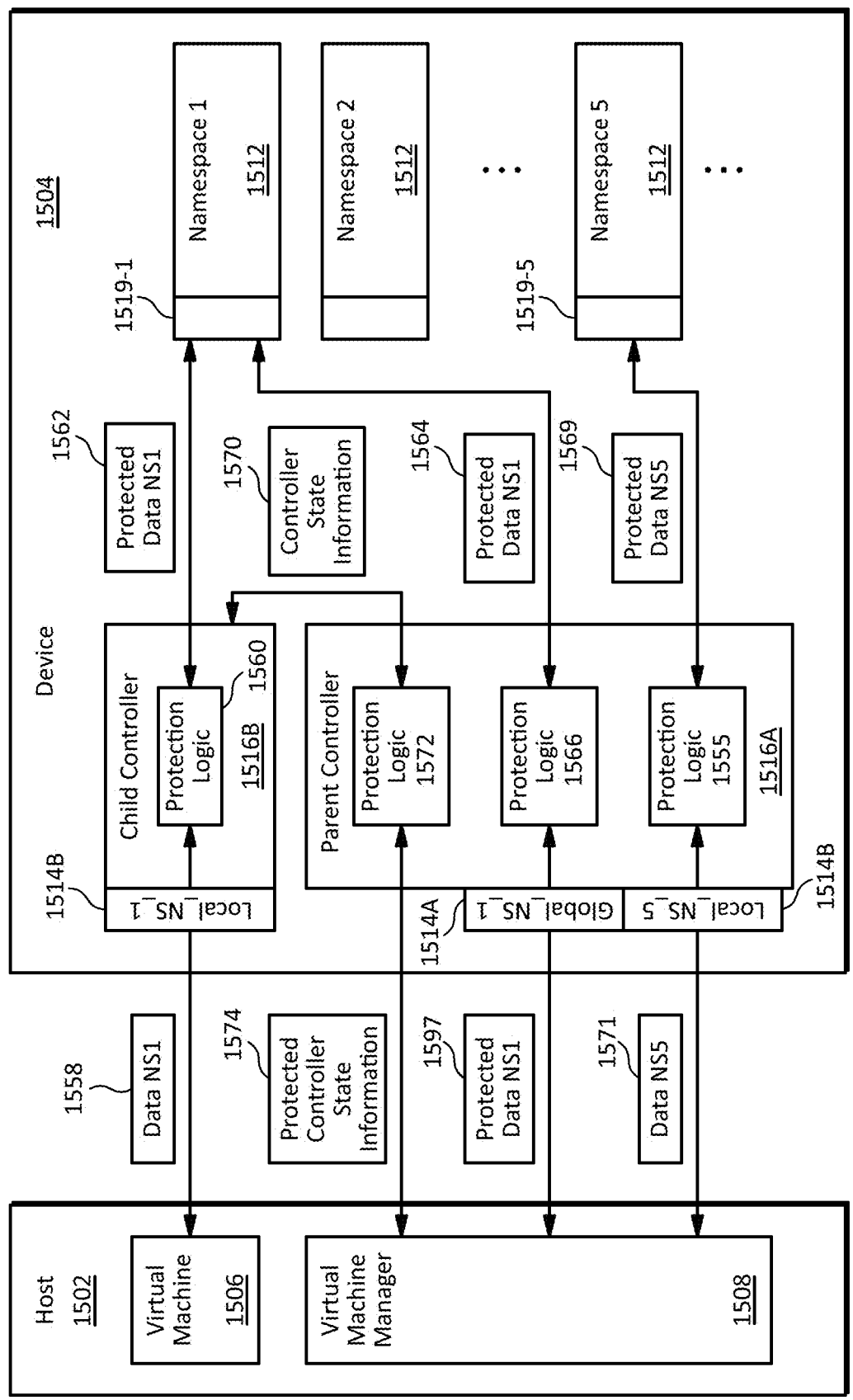
FIG. 15 illustrates a fifth embodiment of a data protection scheme for a data transfer operation in accordance with example embodiments of the disclosure.

FIG. 15 illustrates a fifth embodiment of a data protection scheme for a data transfer operation in accordance with example embodiments of the disclosure. The embodiment illustrated in FIG. 15 may include one or more elements that may be similar to elements illustrated in FIG. 2, FIG. 3, FIG. 4, FIG. 11, FIG. 12, FIG. 13, and/or FIG. 14 in which similar elements may be indicated by reference numbers ending in, and/or containing, the same digits, letters, and/or the like. In the embodiment illustrated in FIG. 15, a host 1502 and device 1504 may communicate using a communication fabric, framework, and/or the like, as described with respect to the embodiment illustrated in FIG. 1. The embodiment illustrated in FIG. 15 may also include one or more resources (e.g., as part of a device functionality circuit) that may be configured as one or more namespaces 1512.

In some aspects, the embodiment illustrated in FIG. 15 may operate in a manner similar to the embodiments illustrated in FIG. 12, FIG. 13, and/or FIG. 14. For example, in the embodiment illustrated in FIG. 15, the child controller 1516B may include protection logic 1560 that may apply a protection scheme to data associated with Namespace 1 (Data NS1) 1558 received from a virtual machine 1506 to generate protected data (Protected Data NS1) 1562. As another example, the parent controller 1516A may include protection logic 1572 to generate protected controller state information 1574 from controller state information 1570. As a further example, the parent controller 1516A may include protection logic 1566 that may generate protected data (Protected Data NS1) 1597 based on protected first data (Protected Data NS1) 1564 read from Namespace 1. The protection logic 1566 may generate the protected data 1597, for example, by passing through the protected first data 1564, by applying a second protection scheme to the protected data 1564 (e.g., by decrypting the data 1564 using a first encryption algorithm and re-encrypting it using a second encryption algorithm), and/or the like.

The embodiment illustrated in FIG. 15 may use one or more local namespace identifiers 1514A and/or one or more global namespace identifiers 1514B to identify one or more of the namespaces 1512. In some embodiments, the child controller 1516B and/or parent controller 1516A may convert the local namespace identifiers Local_NS_1 and/or Local_NS_5, respectively, to internal namespace identifiers 1519-1 and/or 1519-5, respectively, as described above with respect to FIG. 2. If the internal namespace identifier 1519-1 is implemented with a global namespace identifier, the parent controller 1516A may use the global namespace identifier Global_NS_1 as the internal namespace identifier 1519-1. Alternatively, or additionally, the parent controller 1516A may convert the global namespace identifier Global_NS_1 to another format used for the internal namespace identifier 1519-1.

Thus, the embodiment illustrated in FIG. 15 may combine one or more features relating to a namespace identification scheme in accordance with example embodiments of the disclosure with one or more features relating to a data protection in accordance with example embodiments of the disclosure which, depending on the implementation details, may produce a synergistic result. For example, in the embodiment illustrated in FIG. 15, the parent controller 1516A may use the protection logic 1555 to generate data (Data NS5) 1572 from protected data (Protected Data NS5) 1569 when accessing Namespace 5 using a local namespace identifier 1514B to access Namespace 5, for example, during a normal operation in which the parent controller 1516A may access its own data in Namespace 5. However, when accessing data using a global namespace identifier 1514A (e.g., when migrating user data from Namespace 1 using Global_NS_1) for example, when migrating user data from Namespace 1 as part of a migration operation, the protection logic 1566 in the parent controller 1516A may pass through the user data from Namespace 1 to the virtual machine manager 1508 in a protected form 1564 (e.g., as protected data 1597).

Additionally, or alternatively, the protection logic 1566 in parent controller 1516A may pass through the user data to the virtual machine manager 1508 in a protected form 1564 (e.g., as protected data 1597) when the parent controller 1516A accesses a namespace that is not shared with the parent controller 1516A.

Although the protection logic 1555, 1566, and/or 1572 may be illustrated as separate components, in some embodiments, one or more portions of the protection logic 1555, 1566, and/or 1572 may be implemented, at least partially, with a common component (e.g., hardware).

Figure 16:
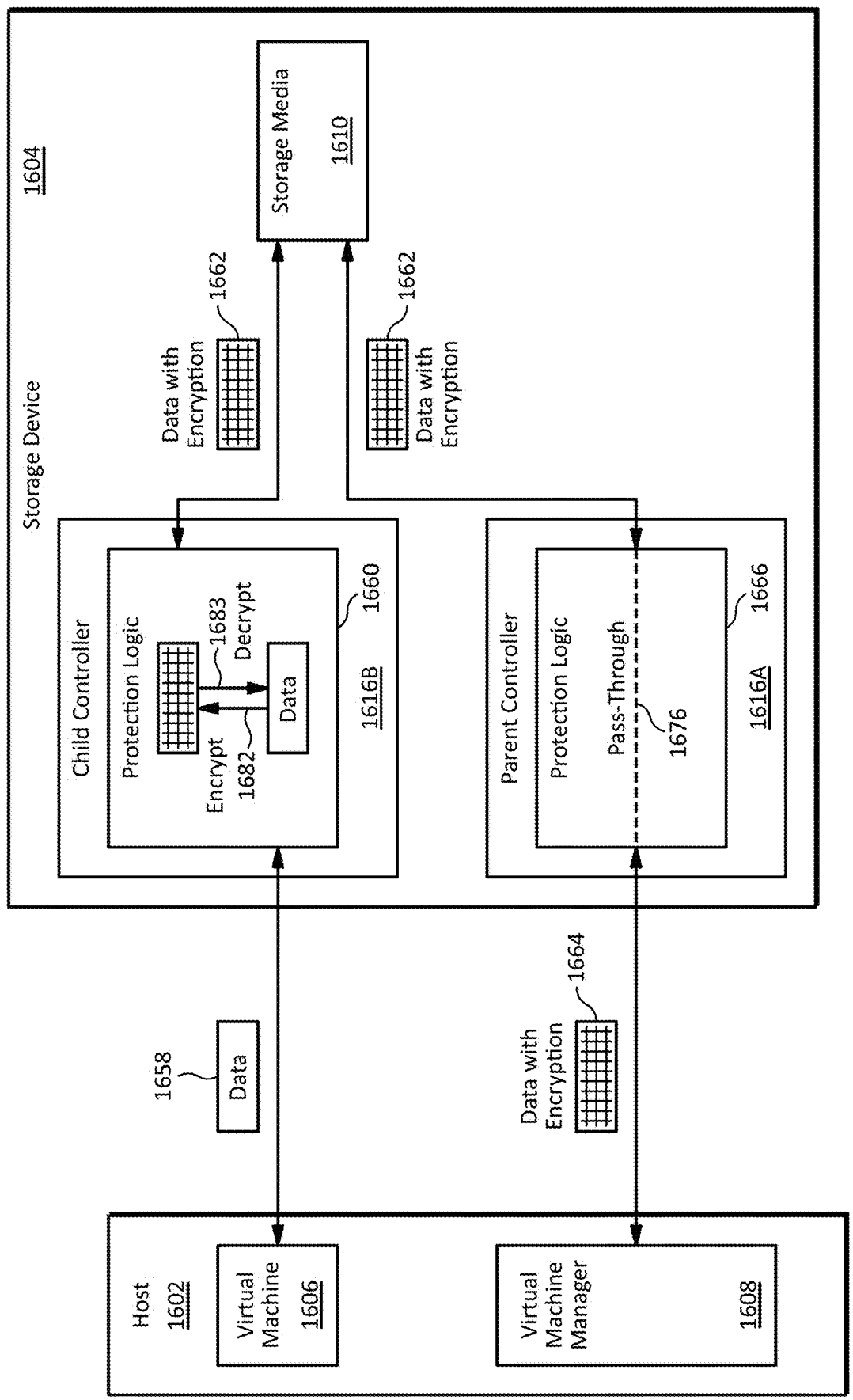
FIG. 16 illustrates a sixth embodiment of a data protection scheme for a data transfer operation illustrating some example implementation details in accordance with example embodiments of the disclosure.

For purposes of illustration, some example embodiments (e.g., in FIGS. 16-25) may be described in the context of one or more device functionality circuits that may be implemented with, at least in part, one or more storage resources, and/or in the context of one or more protection schemes that may be implemented with encryption, salt, and/or the like, and/or in the context of a data migration operation. However, embodiments having similar features may also be implemented with device functionality circuits that may be implemented with one or more compute resources, communication resources, memory resources, or combinations thereof, including in combination with storage resources, and/or with one or more protection schemes that may be implemented with one or more other protection techniques, and/or in other contexts.

FIG. 16 illustrates a sixth embodiment of a data protection scheme for a data transfer operation illustrating some example implementation details in accordance with example embodiments of the disclosure. The embodiment illustrated in FIG. 16 may be used, for example, to implement the embodiment illustrated in FIG. 12. The embodiment illustrated in FIG. 16 may include one or more elements that may be similar to elements illustrated in FIGS. 10-25 in which similar elements may be indicated by reference numbers ending in, and/or containing, the same digits, letters, and/or the like. The embodiment illustrated in FIG. 16 may include one or more hosts 1602 and/or one or more storage devices 1604 that may communicate using a communication fabric, framework, and/or the like, as described with respect to the embodiment illustrated in FIG. 1.

Referring to FIG. 16, the storage device 1604 may include a child controller 1616B that may receive data 1658 (e.g., clear data and/or data that may be protected by an additional protection scheme that may be applied by a virtual machine 1606) from the virtual machine 1606 for a user data write operation. The child controller 1616B may include protection logic 1660 that may encrypt the data 1658 using an encryption scheme at operation 1682 to generate data with encryption 1662 (e.g., that may be protected with the encryption scheme) which may be written to storage media 1610. For a user data read operation, the data with encryption 1662 may be read from the storage media 1610 and decrypted by the protection logic 1660 using the encryption scheme at operation 1683 to restore the data 1658 to a decrypted from 1658 which the child controller 16168 may send to the virtual machine 1606.

The storage device 1604 may also include a parent controller 1616A that may read the data with encryption 1662 from the storage media 1610. Protection logic 1666 at the parent controller 1616A may pass the data with encryption 1662 through (as data with encryption 1664) to a virtual machine manager 1608 (e.g., using a pass-through path 1676). Additionally, or alternatively, the parent controller 1616A may receive the data with encryption 1664 from the virtual machine manager 1608 which the protection logic 1666 may pass through (as data with encryption 1662) to the storage media 1610 (e.g., using the pass-through path 1676).

Although not limited to any specific applications, the embodiment illustrated in FIG. 16 may be used as part of a migration scheme, for example, to implement a source device 1004-S and/or target device 1004-T illustrated in FIG. 10. For example, two storage devices 1604 used to implement a source device 1004-S and a target device 1004-T may be provided with one or more common encryption algorithms, encryption keys, and/or the like (e.g., by one or more hosts, virtual machine managers, migration servers, and/or the like), to enable one of the storage devices 1604 to decrypt data encrypted by another of the storage devices 1604.

Figure 17:
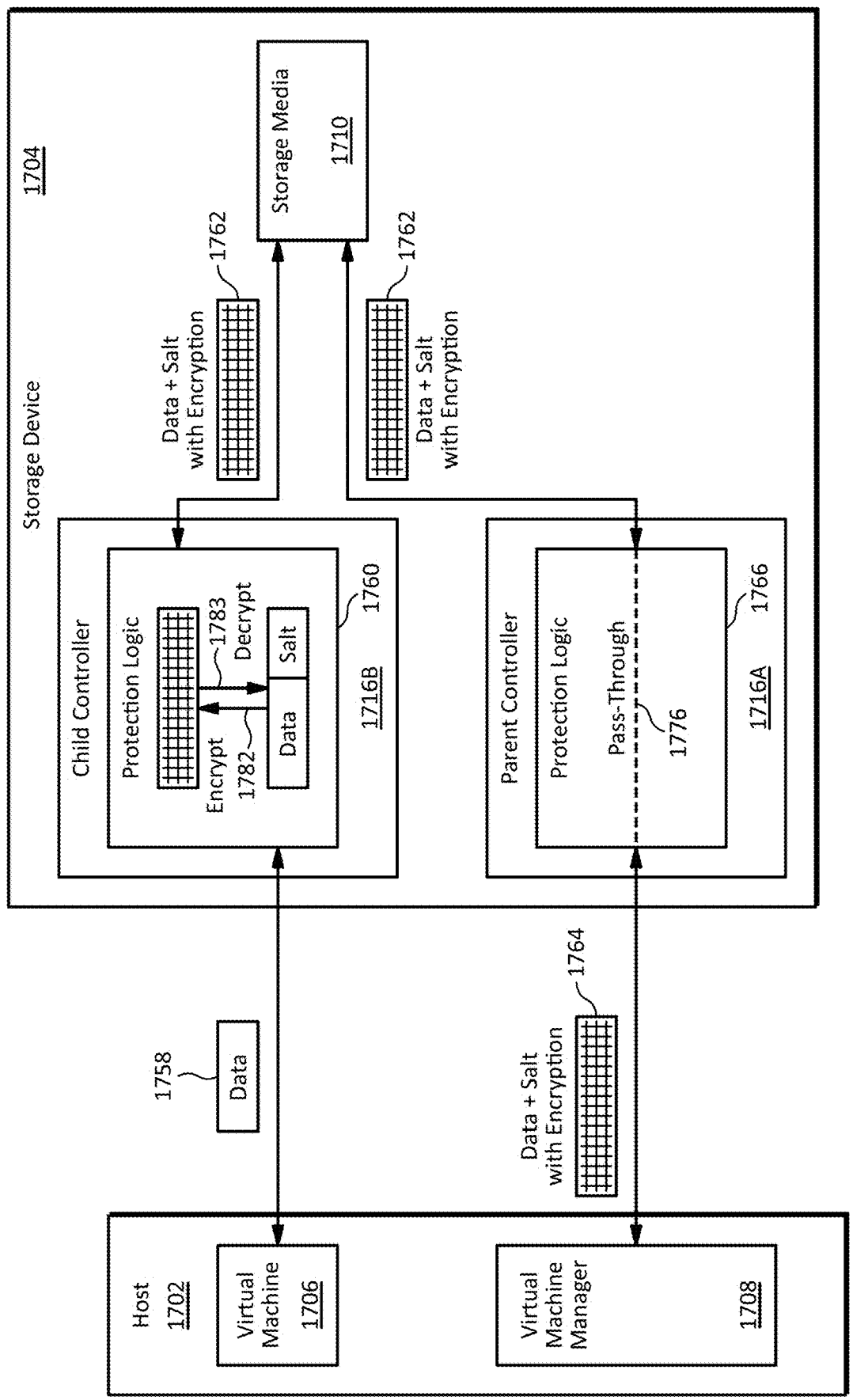
FIG. 17 illustrates a seventh embodiment of a data protection scheme for a data transfer operation illustrating some example implementation details in accordance with example embodiments of the disclosure.

FIG. 17 illustrates a seventh embodiment of a data protection scheme for a data transfer operation illustrating some example implementation details in accordance with example embodiments of the disclosure. The embodiment illustrated in FIG. 17 may be used, for example, to implement the embodiment illustrated in FIG. 12. The embodiment illustrated in FIG. 17 may include one or more elements that may be similar to elements illustrated in FIGS. 10-25 in which similar elements may be indicated by reference numbers ending in, and/or containing, the same digits, letters, and/or the like.

In some aspects, the embodiment illustrated in FIG. 17 may operate in a manner similar to the embodiment illustrated in FIG. 16. However, in the embodiment illustrated in FIG. 17, the protection logic 1760 may include a salt (which may also be referred to as a tweak) with the data 1758 for a write operation. The encryption operation 1782 may encrypt the combined data 1758 and salt to generate encrypted data and salt 1762 which the child controller 1716B may store in the storage media 1710. For a write operation, the child controller 17168 may read the encrypted data and salt 1762 from the storage media 1710. The protection logic 1760 may decrypt the combined data and salt in decryption operation 1783 to recover the original data 1758 which the child controller 17168 may send to the virtual machine 1706.

In some embodiments, the protection logic 1766 at parent controller 1716A may read the encrypted data and salt 1762 from the storage media 1710 and pass the encrypted data and salt 1762 through to the virtual machine manager 1708 (as encrypted data and salt 1764), for example, using a pass-through path 1776. The protection logic 1766 may also pass encrypted data and salt 1764 received from the virtual machine manager 1708 through to the storage media 1710 (as encrypted data and salt 1762).

In some embodiments, for example, if the storage device 1704 is used to implement a data migration scheme, the salt used by a source storage device may be made available to (e.g., shared with) a target storage device, for example, to enable the target storage device to decrypt the encrypted data and salt 1762. A salt may be shared across one or more devices 1704, for example, using an I/O command, a dedicated message, an administrative command, a salt data structure (e.g., table) that may be exchanged between one or more components, storage in a commonly accessible location, and/or the like.

The salt used to create the combined encrypted data and salt 1762 may be selected, created, provided, and/or the like, by the storage device 1704, the host 1702, and/or the like. Examples of information that may be used as salt may include a random or pseudo-random number, a logical block address (LBA) for the data 1758, a physical storage media (e.g., NAND memory) address for the data 1758, a namespace for the data 1758, and/or the like, or a combination thereof. In some example embodiments, the salt may be implemented with a concatenation, multiplex, multiplication, addition, and/or the like, of an LBA and namespace ID for the data 1758. In some embodiments, the salt may be implemented with an offset value, a seed value, and/or the like that may be determined by a host, a device, or a combination thereof. In some embodiments, a salt may be implemented with an initial value and incremented and/or decrement, for example, for one or more access commands (e.g., for each read and/or write command). In some embodiments, a salt may be implemented with a host and/or device selected rule (e.g., an LBA, an LBA+(offset seed provided by a host and/or device), a concatenation of a namespace and/or LBA for upper and/or lower bits of a salt, a different salt provided with one or more (e.g., each read and/or write command), and/or the like.

Figure 18:
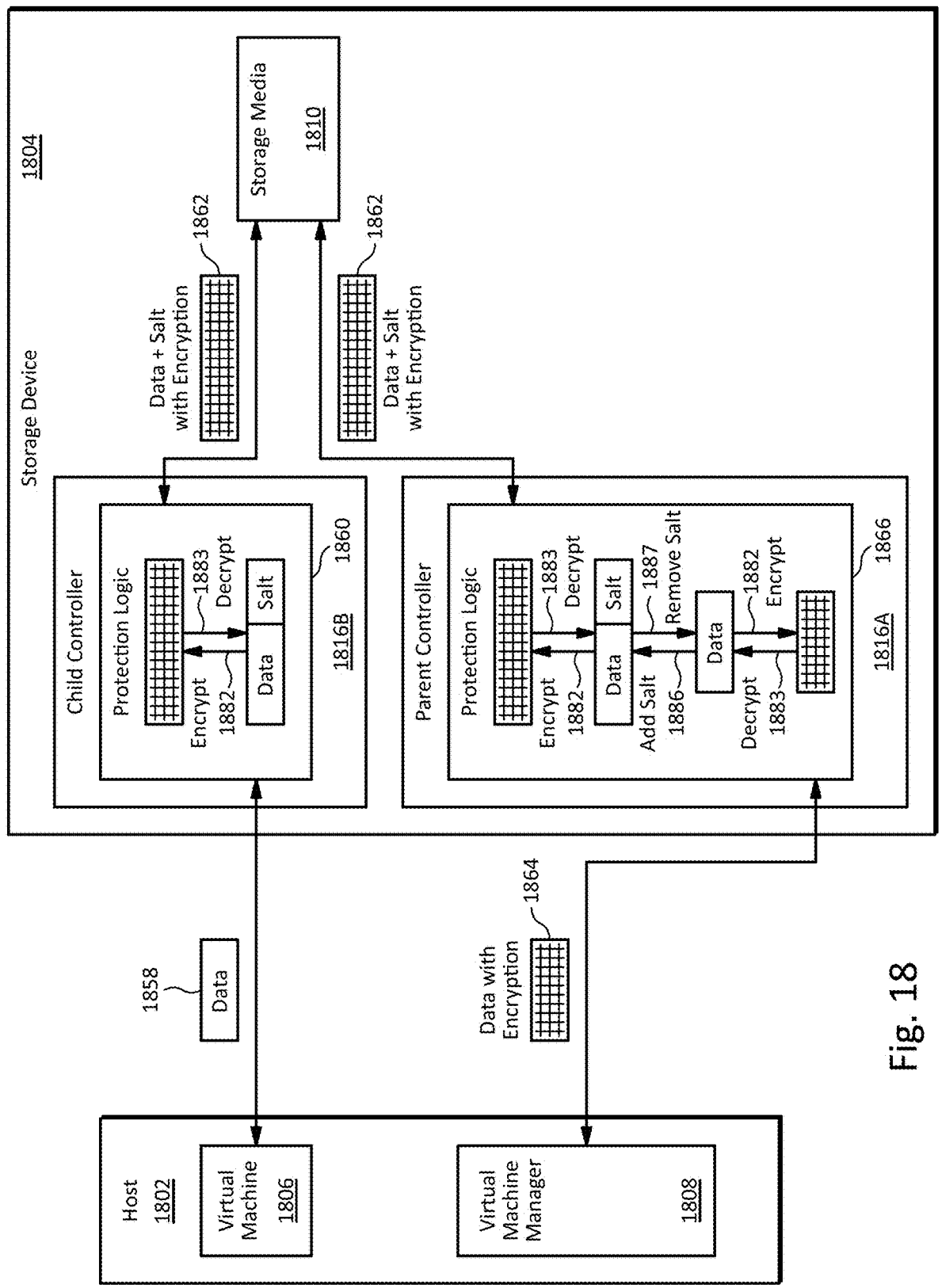
FIG. 18 illustrates a eighth embodiment of a data protection scheme for a data transfer operation illustrating some example implementation details in accordance with example embodiments of the disclosure.

FIG. 18 illustrates a eighth embodiment of a data protection scheme for a data transfer operation illustrating some example implementation details in accordance with example embodiments of the disclosure. The embodiment illustrated in FIG. 18 may be used, for example, to implement the embodiment illustrated in FIG. 13. The embodiment illustrated in FIG. 18 may include one or more elements that may be similar to elements illustrated in FIGS. 10-25 in which similar elements may be indicated by reference numbers ending in, and/or containing, the same digits, letters, and/or the like.

In some aspects, the embodiment illustrated in FIG. 18 may operate in a manner similar to the embodiment illustrated in FIG. 17. Specifically, for a write operation, protection logic 1860 at child controller 1816B may encrypt data 1858 received from a virtual machine 1806 with a salt at operation 1882 to generate encrypted data and salt 1862 which the child controller 1816B may store in the storage media 1710. For a read operation, the protection logic 1860 may decrypt the encrypted data and salt 1862 and send the data 1858 to the virtual machine 1806

However, in the embodiment illustrated in FIG. 18, for a read operation, the protection logic 1866 at the parent controller 1816A may remove the salt and re-encrypt the data 1858 to send encrypted data 1864 to the virtual machine manager 1864. Specifically, the protection logic 1866 may decrypt the encrypted data and salt 1862 at operation 1883 (e.g., using the same encryption algorithm(s), key(s), and/or the like used by the protection logic 1860 at child controller 1816B for operation 1882), remove the salt at operation 1887, and re-encrypt the data 1858 at operation 1882 to generate encrypted data 1864 which the parent controller 1816A may send to the virtual machine manager 1808. For a write operation, the protection logic 1866 may receive encrypted data 1864 from the virtual machine manager 1808, decrypt the encrypted data 1864 at operation 1883 (e.g., using the same encryption algorithm(s), key(s), and/or the like used by the protection logic 1860 at child controller 1816B for operation 1882), add the salt at operation 1886, and re-encrypt the data 1858 at operation 1882. The parent controller 1816A may store the encrypted data and salt 1862 in the storage media 1810.

Thus, in the embodiment illustrated in FIG. 18, a first data protection scheme (e.g., encryption using a salt) may be used internally within the storage device 1804, whereas a second data protection scheme (e.g., encryption) may be used for data exchanged (e.g., externally) with the storage device.

In some embodiments, and depending on the implementation details, the embodiment illustrated in FIG. 18 may enable the storage device 1804 to provide enhanced protection inside the device 1804 while still protecting the data 1858 by sending it in encrypted form 1864, for example, as part of a data migration operation. Moreover, depending on the implementation details, the embodiment illustrated in FIG. 18 may reduce or eliminate the sharing of one or more salts across storage devices 1804.

Figure 19:
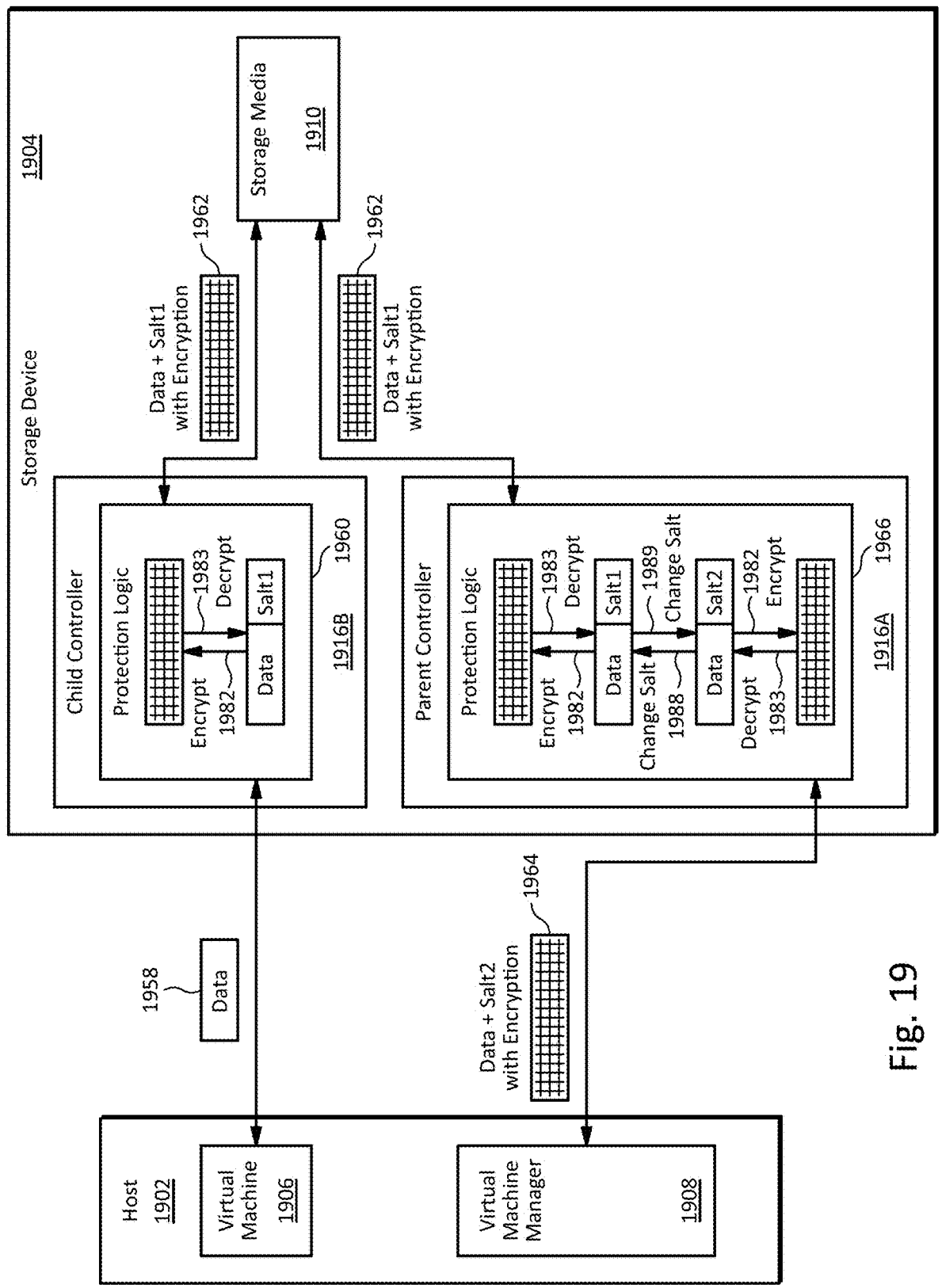
FIG. 19 illustrates a ninth embodiment of a data protection scheme for a data transfer operation illustrating some example implementation details in accordance with example embodiments of the disclosure.

FIG. 19 illustrates a ninth embodiment of a data protection scheme for a data transfer operation illustrating some example implementation details in accordance with example embodiments of the disclosure. The embodiment illustrated in FIG. 19 may be used, for example, to implement the embodiment illustrated in FIG. 13. The embodiment illustrated in FIG. 19 may include one or more elements that may be similar to elements illustrated in FIGS. 10-25 in which similar elements may be indicated by reference numbers ending in, and/or containing, the same digits, letters, and/or the like.

In some aspects, the embodiment illustrated in FIG. 19 may operate in a manner similar to the embodiment illustrated in FIG. 18. However, in the embodiment illustrated in FIG. 19, rather than adding and/or removing the salt, the protection logic 1966 at the parent controller 1916A may change (e.g., exchange) the salt. For example, for a write operation the protection logic 1960 at child controller 1916B may encrypt data 1958 at operation 1982 using a first salt (Salt1) to generate encrypted data and first salt 1962. For a read operation (e.g., as part of a data migration operation, the protection logic 1966 at parent controller 1916A may decrypt the encrypted data and first salt 1962 at operation 1983 to recover the data 1958 and first salt. The protection logic 1966 may change the first salt (e.g., exchange the first salt (Salt1) for a second salt (Salt2) at operation 1989. The protection logic 1966 may re-encrypt the combined data 1958 and second salt at operation 1982 to generate encrypted data and second salt 1964 which the parent controller 1916A may send to the virtual machine manager 1908.

Any of the operations disclosed herein to change a salt may be implemented with any suitable technique. For example, in some embodiments, protection logic 1966 may translate (e.g., directly translate) a first salt to a second salt, for example using an inline operation. As another example, in some embodiments, protection logic 1966 may change the salt incrementally, for example, by first removing one salt, then adding (e.g., appending, concatenating, and/or the like) another salt. In some embodiments, the protection logic 1966 may perform a salt changing operation (e.g., any of the example embodiments of salt changing operations described above) using an isolated security core to protect the user data from unauthorized access during the salt changing operation.

Although not limited to any specific implementation details, in some embodiments, Salt1 may be determined by a storage device 1904, whereas Salt2 may be determined by a host 1902. Depending on the implementation details, this may enable relatively strong protection schemes (e.g., encryption schemes) to be used for data internally within the storage device 1904 and for data exchanged externally while reducing or eliminating the exchange of one or more salts between storage devices. For example, in some embodiments, the first salt (Salt1) used internally within the storage device 1904 may be selected by protection logic 1960 at the child controller 1916B based on a physical storage media location ID, an LBA concatenated with a namespace ID, and/or the like, whereas the second salt (Salt2) used to send and/or receive data externally may be selected by a host 1902 based on an LBA, an LBA plus an offset seed provided by the host 1902, a concatenation of an LBA and a namespace, a salt provided for one or more (e.g., each) read and/or write commands, and/or the like.

Figure 20:
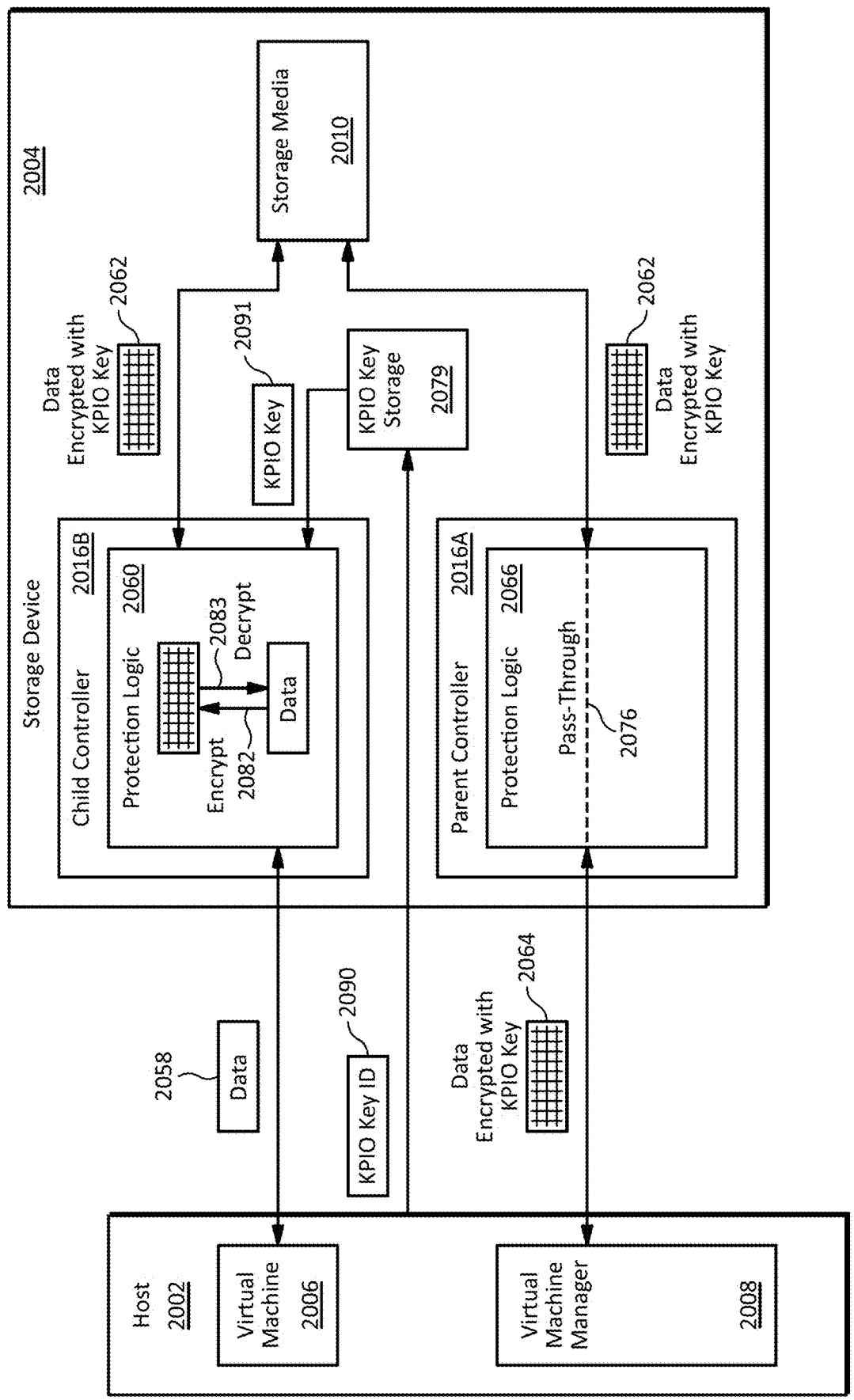
FIG. 20 illustrates a tenth embodiment of a data protection scheme for a data transfer operation illustrating some example implementation details in accordance with example embodiments of the disclosure.

FIG. 20 illustrates a tenth embodiment of a data protection scheme for a data transfer operation illustrating some example implementation details in accordance with example embodiments of the disclosure. The embodiment illustrated in FIG. 20 may be used, for example, to implement the embodiment illustrated in FIG. 12. The embodiment illustrated in FIG. 20 may include one or more elements that may be similar to elements illustrated in FIGS. 10-25 in which similar elements may be indicated by reference numbers ending in, and/or containing, the same digits, letters, and/or the like.

In some aspects, the embodiment illustrated in FIG. 20 may operate in a manner similar to the embodiment illustrated in FIG. 16. However, the embodiment illustrated in FIG. 20 may implement a key per IO (KPIO) scheme in which a host 2002 (e.g., a virtual machine 2006, a virtual machine manager 2008, and/or the like), may specify an encryption key that may be used for one or more (e.g., each) IO request (e.g., read command, write command, and/or the like) for data 2058. The KPIO scheme may be implemented, for example, using KPIO key storage 2079 which may receive a KPIO key identifier (KPIO Key ID) 2090 as an input and provide a KPIO encryption key 2091 as an output. As another example, a KPIO encryption key 2091 may be provided (e.g., directly) by a host 2002. Alternatively, or additionally, the virtual machine manager 2008 may set up the KPIO Key ID 2090 for the VM. In such an implementation, a particular key may be assigned (e.g., always assigned) to a particular virtual machine, child controller, namespace, other identifier, and/or the like. Depending on the implementation details, this may enable a virtual machine that is not configured for KPIO operation to use the KPIO infrastructure that may be set up by the virtual machine manager 2008.

For example, for a write operation, the child controller 2016B may receive write data 2058, and the storage device 2004 may receive a corresponding KPIO Key ID 2090 which may be used to retrieve a KPIO encryption key 2091 using the KPIO key storage 2079. The protection logic 2060 in the child controller 2016B may use the KPIO encryption key 2091 to encrypt the data 2058 in operation 2082 to generate encrypted data 2062 which the child controller 2016B may store in the storage media 2010. For a read operation, of the protection logic 2060 may use the KPIO encryption key 2091 associated with the encrypted data 2062 to decrypt the data 2058 at operation 2083.

In some embodiments, an IO may be referred to as a request, and a key per IO may be referred to as a key per request. In some embodiments, a key per IO may refer to a key that may be used for one or more IOs. For example, the virtual machine 2006 or other user may send a first IO to the storage device 2004 along with a first KPIO key (or a first KPIO key ID to indicate a first KPIO key) that may be used to protect first data sent with the first IO. The virtual machine 2006 or other user may send a second IO to the storage device 2004 along with a second KPIO key (or a second KPIO key ID to indicate a second KPIO key) that may be used to protect data sent with the second IO.

In some embodiments, the protection logic 2066 at the parent controller 2016A may pass the data with KPIO encryption 2062 through (as data with KPIO encryption 2064) to a virtual machine manager 2008 (e.g., using a pass-through path 2076). Additionally, or alternatively, the parent controller 2016A may receive the data with encryption 2064 from the virtual machine manager 2008 which the protection logic 2066 may pass through (as data with encryption 2062) to the storage media 2010 (e.g., using the pass-through path 2076).

In some embodiments, KPIO storage 2079 may be implemented, for example, with a data structure such as a table, a list, a database, key-value store, and/or the like, and the KPIO Key ID 2090 may be implemented with a pointer, index, and/or the like, into the data structure. In some embodiments, the KPIO storage 2079 may be initialized (e.g., populated with one or more KPIO keys), for example, by a host 2002 at start up, and accessed subsequent IO requests using one or more KPIO Key IDs 2090.

Figure 21:
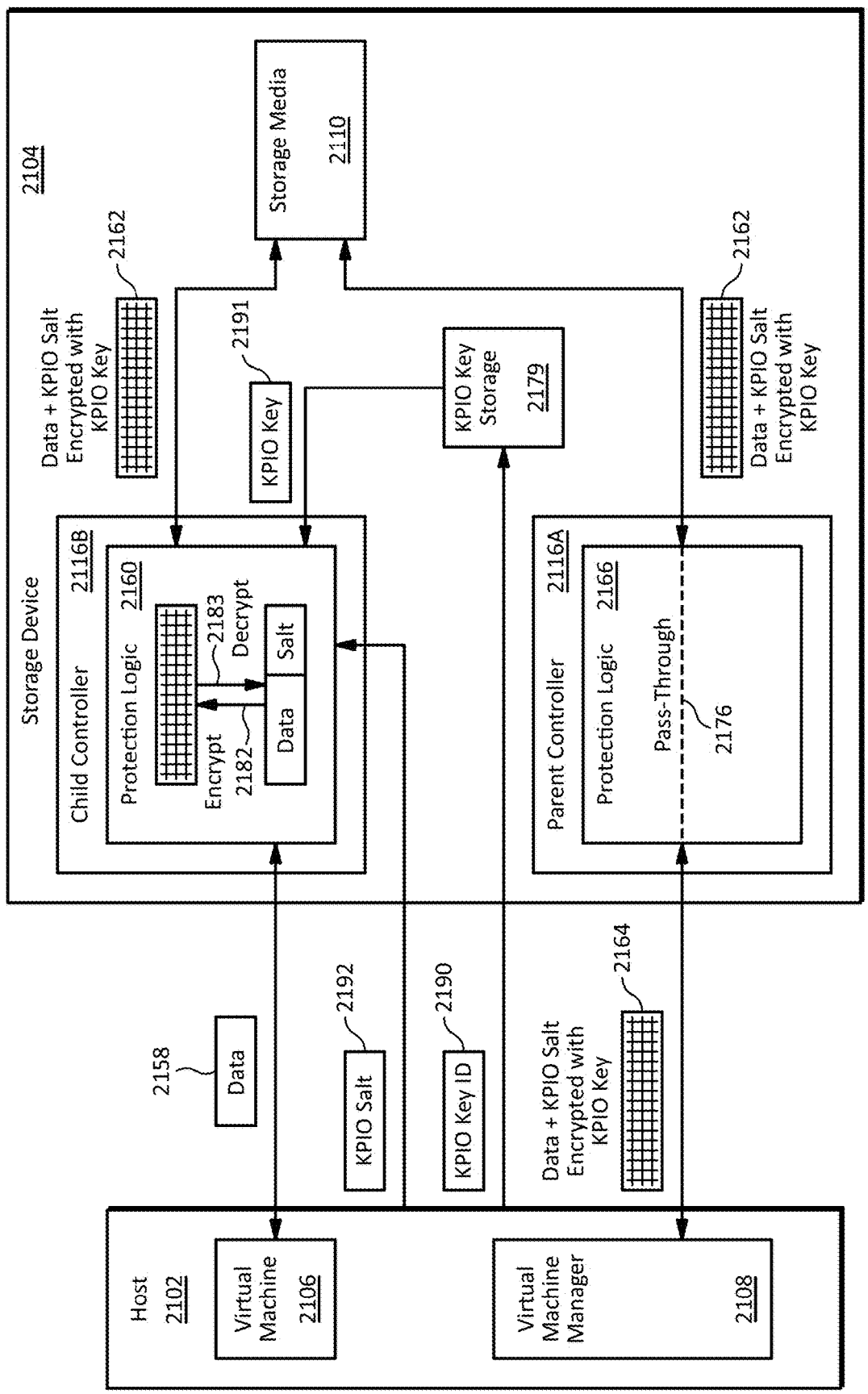
FIG. 21 illustrates a eleventh embodiment of a data protection scheme for a data transfer operation illustrating some example implementation details in accordance with example embodiments of the disclosure.

FIG. 21 illustrates a eleventh embodiment of a data protection scheme for a data transfer operation illustrating some example implementation details in accordance with example embodiments of the disclosure. The embodiment illustrated in FIG. 21 may be used, for example, to implement the embodiment illustrated in FIG. 12. The embodiment illustrated in FIG. 21 may include one or more elements that may be similar to elements illustrated in FIGS. 10-25 in which similar elements may be indicated by reference numbers ending in, and/or containing, the same digits, letters, and/or the like.

In some aspects, the embodiment illustrated in FIG. 21 may operate in a manner similar to the embodiment illustrated in FIG. 20. However, in the embodiment illustrated in FIG. 21, for a write operation, the protection logic 2160 at the child controller 2116B may receive a KPIO salt 2192 (e.g., a determined by a host 2102 as described above) which the protection logic 2160 may combine with the data 2158 and encrypt using the KPIO key 2191 at operation 2182 to generate encrypted data and KPIO salt 2162 which the child controller 2116B may store in the storage media 2110. For a read operation, of the protection logic 2160 may use the KPIO encryption key 2191 associated with the encrypted data 2162 to decrypt the combined data 2158 and KPIO salt 2192 at operation 2183 and send the data 2158 to the virtual machine 2106.

In some embodiments, the protection logic 2166 at the parent controller 2116A may pass the data and KPIO salt with KPIO encryption 2162 through (as data and KPIO salt with KPIO encryption 2164) to a virtual machine manager 2108 (e.g., using a pass-through path 2176). Additionally, or alternatively, the parent controller 2116A may receive the data and KPIO salt 2192 with encryption 2164 from the virtual machine manager 2108 which the protection logic 2166 may pass through (as data and KPIO salt with encryption 2162) to the storage media 2110 (e.g., using the pass-through path 2176).

Although the KPIO salt 2192 may be illustrated in FIG. 21 as being provided (e.g., directly) by a host 2102, in some embodiments, the KPIO salt 2192 may be provided to the protection logic 2160 using any other technique. For example, one or more KPIO salts 2192 may be stored in KPIO salt storage, and the host 2102 may provide a KPIO salt ID to the storage device 2104 which may be used to retrieve a KPIO salt 2192 from the KPIO salt storage.

Figure 22:
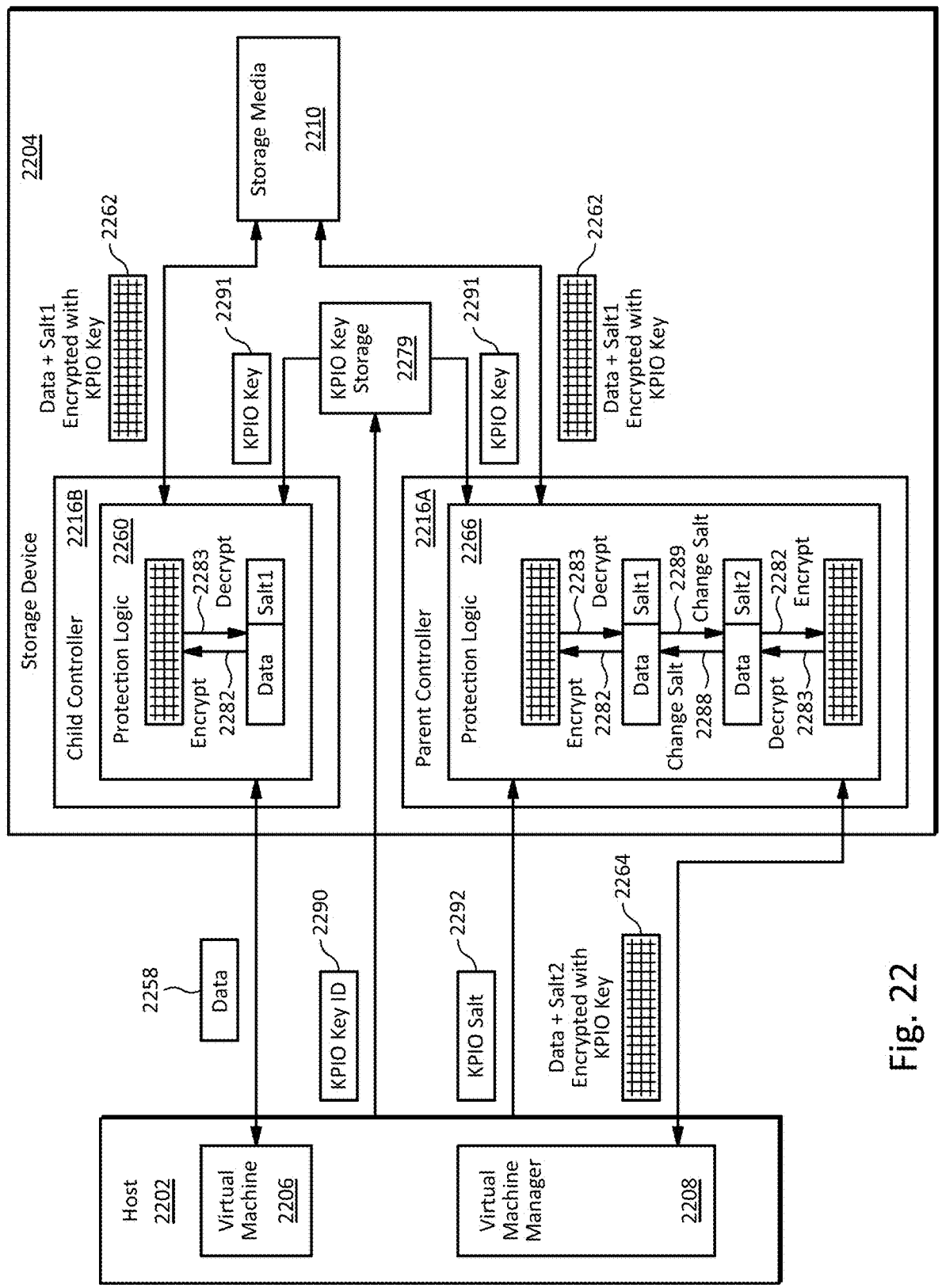
FIG. 22 illustrates a twelfth embodiment of a data protection scheme for a data transfer operation illustrating some example implementation details in accordance with example embodiments of the disclosure.

FIG. 22 illustrates a twelfth embodiment of a data protection scheme for a data transfer operation illustrating some example implementation details in accordance with example embodiments of the disclosure. The embodiment illustrated in FIG. 22 may be used, for example, to implement the embodiment illustrated in FIG. 13. The embodiment illustrated in FIG. 22 may include one or more elements that may be similar to elements illustrated in FIGS. 10-25 in which similar elements may be indicated by reference numbers ending in, and/or containing, the same digits, letters, and/or the like.

In some aspects, the embodiment illustrated in FIG. 22 may operate in a manner similar to, and/or combine one or more features of, the embodiments illustrated in FIG. 19 and/or FIG. 21. However, the embodiment illustrated in FIG. 22 may use a first salt for KPIO encryption for data that may be used (e.g., stored) within the storage device 2204 and a second salt for KPIO encryption for data that may be transferred externally (e.g., as part of a data migration operation).

For example, for a write operation, the protection logic 2260 at the child controller 2216B may combine a first salt (Salt1) with data 2258 and encrypt the combined data 2258 and first salt using a KPIO encryption key 2291 selected by a host using a KPIO key ID 2290 to generate encrypted data and first salt 2262 which the child controller 2216B may store in the storage media 2210. For a read operation, the child controller 2216B may read the encrypted data and first salt 2262 from the storage media 2210. The protection logic 2260 may decrypt the encrypted data and first salt 2262 at operation 2283 to recover the data 2258 which the child controller 2216B may send to the virtual machine 2206.

The protection logic 2266 at the parent controller 2216A, however, may change the first salt (Salt1) to a second salt (Salt2). For example, for a read operation (e.g., to migrate the data 2258 to a target storage device), the parent controller 2216A may read the encrypted data and first salt 2262 from the storage media 2210. The protection logic 2266 may decrypt the encrypted data and first salt 2262 at operation 2283 to recover the data 2258 and first salt. The protection logic 2266 may exchange the first salt (Salt1) for a second salt (Salt2) at operation 2289 and re-encrypt the combined data 2258 and second salt at operation 2282 to generate the encrypted data and second salt 2264 which the parent controller 2216A may send to the virtual machine manager 2208. For a write operation (e.g., to migrate the data 2258 from a source storage device), the protection logic 2266 may perform a reversed sequence in which the encrypted data and second salt 2264 received from the virtual machine manager 2208 may be decrypted at operation 2283. The protection logic 2266 may exchange the second salt (Salt2) for the first salt (Salt1) at operation 2288 and re-encrypt the combined data 2258 and first salt at operation 2282 to generate the encrypted data and first salt 2262 which the parent controller 2216A may store in the storage media 2210.

Although not limited to any specific implementation details, in some embodiments, Salt1 may be determined by a storage device 2204, whereas Salt2 may be determined by a host 2202. Depending on the implementation details, this may enable relatively strong protection schemes (e.g., encryption schemes) to be used for data internally within the storage device 2204 and for data exchanged externally while reducing or eliminating the exchange of one or more salts between storage devices.

Figure 23:
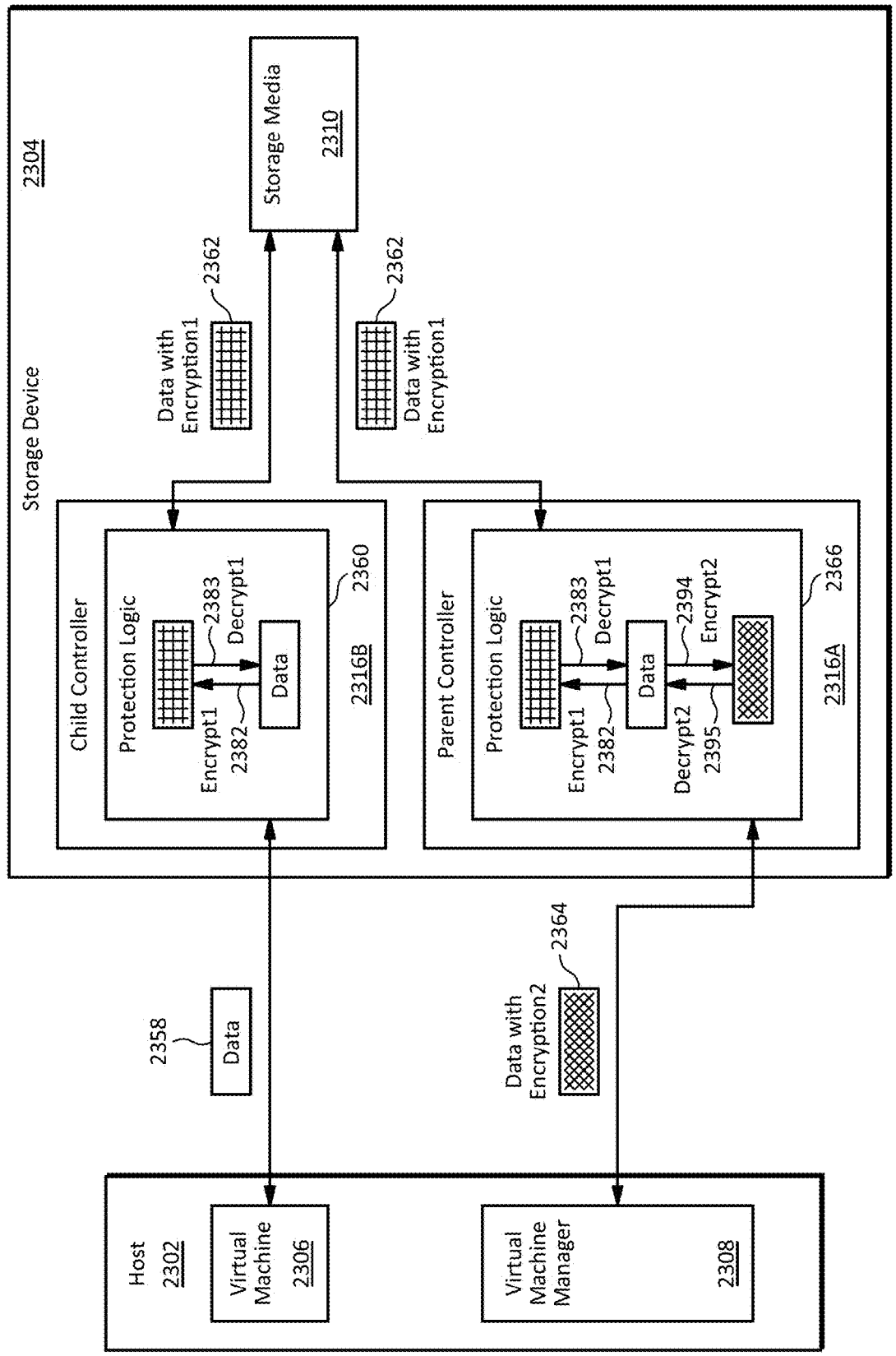
FIG. 23 illustrates an thirteenth embodiment of a data protection scheme for a data transfer operation illustrating some example implementation details in accordance with example embodiments of the disclosure.

FIG. 23 illustrates an thirteenth embodiment of a data protection scheme for a data transfer operation illustrating some example implementation details in accordance with example embodiments of the disclosure. The embodiment illustrated in FIG. 23 may be used, for example, to implement the embodiment illustrated in FIG. 13. The embodiment illustrated in FIG. 23 may include one or more elements that may be similar to elements illustrated in FIGS. 10-25 in which similar elements may be indicated by reference numbers ending in, and/or containing, the same digits, letters, and/or the like.

In some aspects, the embodiment illustrated in FIG. 23 may operate in a manner similar to the embodiment illustrated in FIG. 16. However, the embodiment illustrated in FIG. 23, the protection logic 2366 at the parent controller 2216A may use a second encryption scheme to protect data sent from, and/or received at, the parent controller 2216A. For example, in some aspects, the protection logic 2260 at the child controller 2316B may use a first encryption scheme (e.g., encryption algorithm, settings, and/or the like, which may be referred to as Encryp1 or Encryption1) to operate in a manner similar to the protection logic 1660 at the child controller 1616B illustrated in FIG. 16.

However, for a read operation (e.g., to migrate data 2358 to a target device), the protection logic 2366 at the parent controller 2216A may replace the first encryption scheme with a second encryption scheme (e.g., encryption algorithm, settings, and/or the like, which may be referred to as (Encryp2 or Encryption2). Specifically, the parent controller 2216A may read the data with the first encryption scheme 2362 from the storage media 2310. The protection logic 2366 may decrypt the encrypted data 2362 using the first encryption scheme at operation 2383 to recover the data 2358. The protection logic 2366 may re-encrypt the data 2358 using the second encryption scheme at operation 2394 to generate the data with the second encryption 2364 which the parent controller 2216A may send to the virtual machine manager 2308. For a write operation (e.g., to migrate data 2358 from a source device), the protection logic 2366 may decrypt the data with the second encryption 2364 received by the parent controller 2216A using the second encryption scheme at operation 2395 to recover the data 2358. The protection logic 2366 may re-encrypt the data 2358 using the first encryption scheme at operation 2382 to generate the data with the first encryption scheme 2362 which the parent controller 2216A may write to the storage media 2310.

Any of the encryption schemes disclosed herein, including the first and second encryption schemes described in the context of FIG. 23 may be implemented with any type of encryption settings, algorithms, modes, and/or the like. Examples may include Advanced Encryption Standard (AES) 128, 256, and/or the like, with any mode (e.g., a mode that may use an exclusive OR (XOR) such as XOR Encrypt XOR (XEX), XEX Tweakable Block Cipher with Ciphertext Stealing (XTS), Galois/Counter Mode (GCM), cipher-block chaining (CBC), and/or the like). Additionally, or alternatively, an encryption key (and/or any other potential encryption options, settings, modes, and/or the like) used during an encryption process may vary. For example, a first key implemented with AES 128 XTS may be used for internal encryption (e.g., Encryption 1) whereas a second key implemented with AES 256 XEX may be used for external encryption (e.g., Encryption 2).

Although not limited to any specific implementation details, in some embodiments, the first encryption scheme described in the context of FIG. 23 may be implemented with one or more algorithms, settings, keys, and/or the like, that may involve relatively fewer resources (e.g., processing time, power consumption, memory usage, and/or the like) which may provide an amount of protection that may be acceptable for use within the storage device 2304 which may represent a relatively secure environment. In contrast, the second encryption scheme may be implemented with one or more algorithms, settings, keys, and/or the like, that may involve relatively more resources which may provide an amount of protection that may be acceptable for use with data that may be subjected to a relatively insecure environment outside of the storage device 2304.

As a further example, the first encryption scheme may be implemented with a homomorphic encryption scheme, whereas the second encryption scheme may be implemented with a post-quantum cryptography (PQC) scheme. Depending on the implementation details, in such an embodiment, the use of homomorphic encryption for the first encryption scheme internally within the relatively secure environment of storage device 2304 may enable one or more operations (e.g., computations) to be performed on data stored within the storage device while it is still encrypted. However, changing the homomorphic encryption to a PQC encryption scheme before the data is sent outside of the storage device 2304 may enable provide a greater amount of protection for the relatively insecure environment outside of the storage device 2304.

Figure 24:
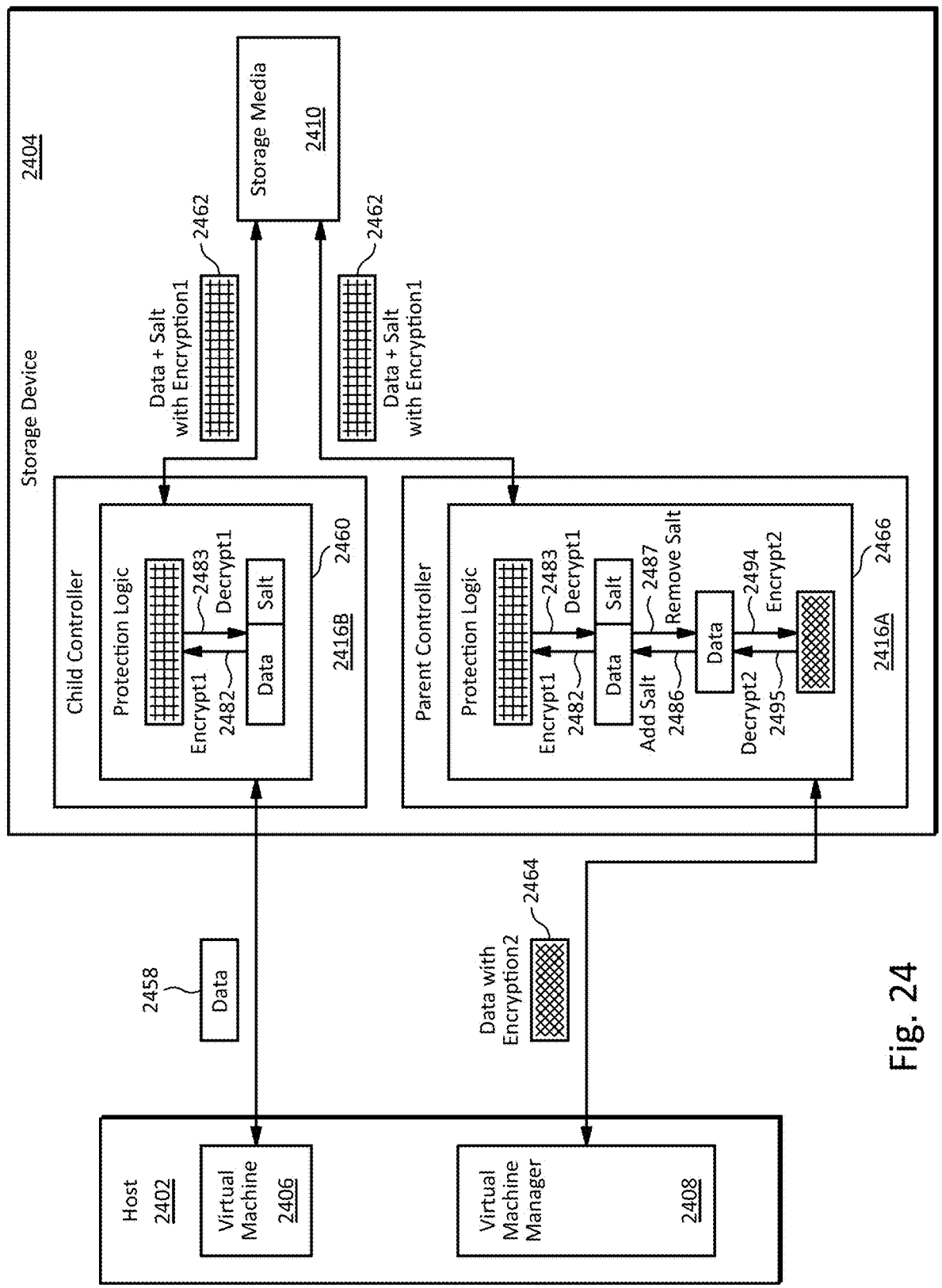
FIG. 24 illustrates a fourteenth embodiment of a data protection scheme for a data transfer operation illustrating some example implementation details in accordance with example embodiments of the disclosure.

FIG. 24 illustrates a fourteenth embodiment of a data protection scheme for a data transfer operation illustrating some example implementation details in accordance with example embodiments of the disclosure. The embodiment illustrated in FIG. 24 may be used, for example, to implement the embodiment illustrated in FIG. 13. The embodiment illustrated in FIG. 24 may include one or more elements that may be similar to elements illustrated in FIGS. 10-23 and 25 in which similar elements may be indicated by reference numbers ending in, and/or containing, the same digits, letters, and/or the like.

In some aspects, the embodiment illustrated in FIG. 24 may operate in a manner similar to, and/or combine one or more features of, the embodiments illustrated in FIG. 18 and/or FIG. 23. For example, in the embodiment illustrated in FIG. 24, the protection logic 2466 at the parent controller 2416A may add or remove a salt in a manner similar to the protection logic 1866 in the embodiment illustrated in FIG. 18. However, the protection logic 2466 illustrated in FIG. 24 may use a first encryption scheme (Encrypt1 or Encryption1) for data that is to be used (e.g., stored) internally within the storage device 2404 and a second encryption scheme (Encrypt2 or Encryption2) for data that is to be sent from, or received at, the parent controller 2416A.

Figure 25:
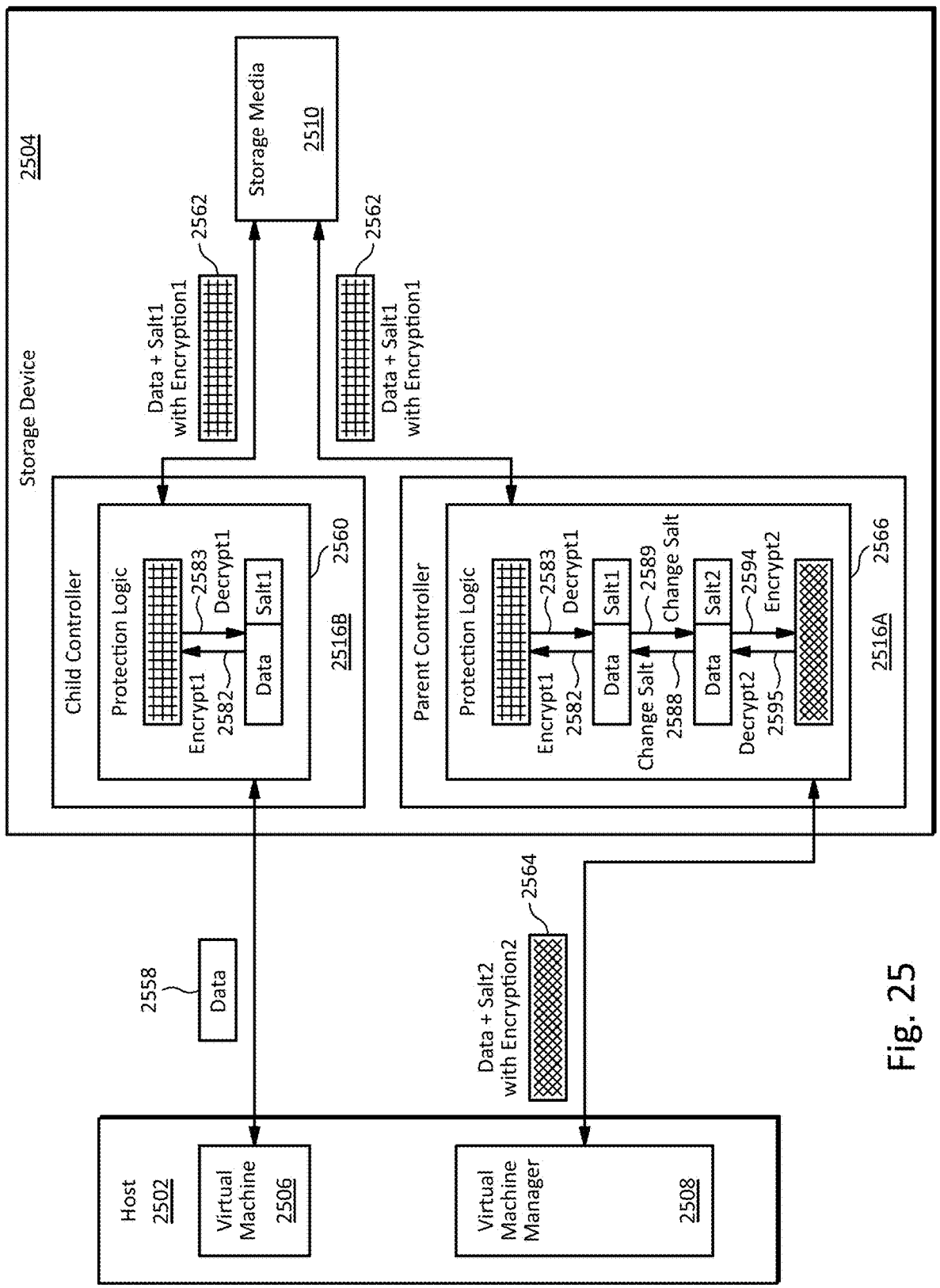
FIG. 25 illustrates a fifteenth embodiment of a data protection scheme for a data transfer operation illustrating some example implementation details in accordance with example embodiments of the disclosure.

FIG. 25 illustrates a fifteenth embodiment of a data protection scheme for a data transfer operation illustrating some example implementation details in accordance with example embodiments of the disclosure. The embodiment illustrated in FIG. 25 may be used, for example, to implement the embodiment illustrated in FIG. 13. The embodiment illustrated in FIG. 25 may include one or more elements that may be similar to elements illustrated in FIGS. 10-25 in which similar elements may be indicated by reference numbers ending in, and/or containing, the same digits, letters, and/or the like.

In some aspects, the embodiment illustrated in FIG. 25 may operate in a manner similar to, and/or combine one or more features of, the embodiments illustrated in FIG. 19 and/or FIG. 24. For example, the protection logic 2566 at the parent controller 2516A may use a first encryption scheme (Encrypt1 or Encryption1) for data that is to be used (e.g., stored) internally within the storage device 2504 and a second encryption scheme (Encrypt2 or Encryption2) for data that is to be sent from, or received at, the parent controller 2516A. However, rather than adding and/or removing the salt as described with respect to the embodiment illustrated in FIG. 24, the protection logic 2566 illustrated in FIG. 25 may exchange a first salt (Salt1) and a second salt (Salt2) in a manner similar to the embodiment illustrated in FIG. 19.

Although not limited to any specific implementation details, in some embodiments, the first salt (Salt1) may be determined by a storage device 2504, whereas the second salt (Salt2) may be determined by a host 2502. For example, in some embodiments, the host 2502 may specify that an LBA and/or a namespace ID (e.g., an LBA combined, for example, by concatenation, with a namespace ID for the data 2558) may be used for the first salt. As another example, in some embodiments, the host 2502 may specify that the first salt may be incremented for one or more (e.g., each) IO request to read and/or write the data 2558.

Figure 26:
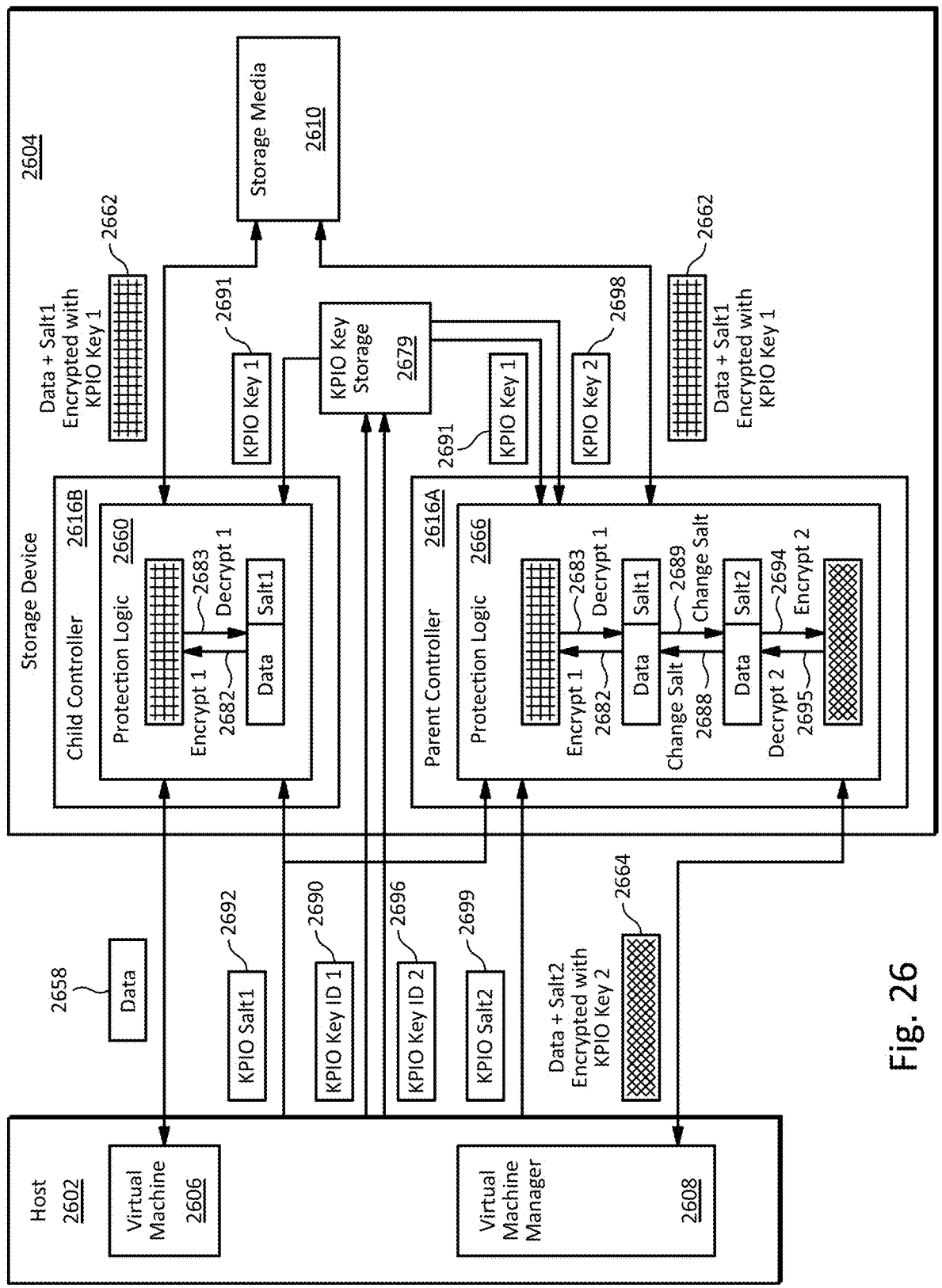
FIG. 26 illustrates a sixteenth embodiment of a data protection scheme for a data transfer operation illustrating some example implementation details in accordance with example embodiments of the disclosure.

FIG. 26 illustrates a sixteenth embodiment of a data protection scheme for a data transfer operation illustrating some example implementation details in accordance with example embodiments of the disclosure. The embodiment illustrated in FIG. 26 may be used, for example, to implement the embodiment illustrated in FIG. 13. The embodiment illustrated in FIG. 26 may include one or more elements that may be similar to elements illustrated in FIGS. 10-25 in which similar elements may be indicated by reference numbers ending in, and/or containing, the same digits, letters, and/or the like. In some aspects, the embodiment illustrated in FIG. 26 may operate in a manner similar to, and/or combine one or more features of, the embodiments illustrated in FIG. 22 and/or FIG. 25.

In the embodiment illustrated in FIG. 26, the protection logic 2660 at child controller 2616B and the protection logic 2666 at parent controller 2616A may use a first protection scheme (e.g., a first KPIO key 2691 and/or a first KPIO salt (Salt1) 2692) to protect data 2658 internally within the storage device 2604. The protection logic 2666 at parent controller 2616A may use a second protection scheme (e.g., a second KPIO key 2698 and/or a second KPIO salt (Salt2) 2699) to protect data sent from, and/or received at, the parent controller 2616A, for example, as part of a data migration operation.

The embodiment illustrated in FIG. 26 is not limited to any specific technique(s) for selecting, providing, and/or the like, first and second KPIO keys 2691 and 2698 and/or the first and second salts Salt1 and Salt2.

In some example embodiments, the first KPIO key 2691 and/or the second KPIO key 2698 may be selected by the virtual machine manager 2608 using the first KPIO key identifier 2690 and/or the second KPIO key identifier 2696, respectively. For example, the virtual machine manager 2608 may transmit the first KPIO key identifier 2690 and/or the second KPIO key identifier 2696 with a command (e.g., a data read or write command), with state information for the child controller 2616B and/or the parent controller 2616A, and/or the like. In some embodiments, a technique for selecting, providing, and/or the like, one or more encryption keys may additionally or alternatively include selecting, providing, and/or the like, one or more encryption settings.

In some example embodiments, the first KPIO salt 2692 may be provided by the host 2602 as illustrated in FIG. 26. Alternatively, or additionally, the first KPIO salt 2692 may be determined by the child controller 2616B, for example, as part of state information, as part of a configuration operation, and/or the like. In some example embodiments, the second KPIO salt 2699 may be provided by the host 2602 as illustrated in FIG. 26. Alternatively, or additionally, the second KPIO salt 2699 may be determined by the parent controller 2616A, for example, as part of state information, as part of a configuration operation, and/or the like.

Some example embodiments of the first protection scheme (e.g., used by the child controller 2616B and parent controller 2616A to protect data internally within the storage device 2604) may be implemented follows. In some embodiments, the virtual machine 2606 may use a different key for one or more IO requests (e.g., a different key for each request). In some embodiments, the virtual machine 2606 may use one or more keys on a namespace basis (e.g., a different key for each namespace with the same key being used for each IO request for a specific namespace). In some embodiments, the virtual machine 2606 may use one or more keys on a controller basis (e.g., using the same key for all IO requests for its associated child controller 2616B). In some embodiments, the virtual machine manager 2608 may set one or more keys (e.g., a single key) for one or more (e.g., each) of a virtual machine's associated namespaces. In some embodiments, the virtual machine manager 2608 may set one or more keys (e.g., a single key) for one or more (e.g., each) of a virtual machine's associated child controllers.

Some example embodiments of the second protection scheme (e.g., used by the parent controller 2616A to protect data sent to and/or from the parent controller 2616A) may be implemented follows. In some embodiments, the virtual machine manager 2608 may set one or more keys (e.g., a single key) for one or more (e.g., each) IO request. In some embodiments, the virtual machine manager 2608 may set one or more keys on a namespace basis, for example, one or more keys (e.g., a single key) for one or more (e.g., each) global namespace identifier. In some embodiments, the virtual machine manager 2608 may set one or more keys (e.g., a single key) for a child controller 2616B that may be involved with a migration operation.

For a write operation by the child controller 2616B, the protection logic 2660 may append the first KPIO Salt1 2692, which may be provided, for example, by the host 2602 (e.g., by the virtual machine 2606, the virtual machine manager 2608, and/or the like) to the received data 2658 and encrypt, at operation 2682, the combination of the data 2658 and Salt1 using the first KPIO key 2691 to generate the data protected with the first protection scheme 2662 (e.g., combined data 2658 and Salt1 encrypted with the first KPIO key 2691) which the child controller 2616B may write to storage media 2610.

For a read operation by the child controller 2616B, the child controller 2616B may read the data protected with the first protection scheme 2662 (e.g., combined data 2658 and Salt1 encrypted with the first KPIO key 2691) from storage media 2610. The protection logic 2660 may decrypt the combined data 2658 and Salt1 at operation 2683 using the first KPIO key 2691 to recover the data 2658 which the child controller 2616B may send to the host 2602.

For a write operation by the parent controller 2616A, the parent controller 2616A may receive data protected with the second protection scheme 2664 (e.g., combined data 2658 and Salt2 encrypted with the second KPIO key 2698). The second salt (Salt2) 2699 may be provided, for example, by the host 2602 (e.g., by the virtual machine manager 2608). The second KPIO key 2698 may be selected, provided, and/or the like, by the host 2602 (e.g., by the virtual machine manager 2608), for example, using the second KPIO key identifier 2696. The protection logic 2666 may decrypt the combined data 2658 and Salt2 at operation 2695 using the second KPIO key 2698 to recover the data 2658 and Salt2. At operation 2688, the protection logic 2666 may change the second salt Salt2 to the first salt Salt1. At operation 2682, the protection logic 2666 may encrypt the combined data 2658 and Salt1 using the first KPIO key 2691 to generate the data protected with the first protection scheme 2662 (e.g., combined data 2658 and Salt1 encrypted with the first KPIO key 2691) which the parent controller 2616A may write to storage media 2610.

For a read operation by the parent controller 2616A, the parent controller 2616A may read the data protected with the first protection scheme 2662 (e.g., combined data 2658 and Salt1 encrypted with the first KPIO key 2691) from storage media 2610. The protection logic 2666 may decrypt the combined data 2658 and Salt1 at operation 2683 using the first KPIO key 2691 to recover the combined data 2658 and Salt1. At operation 2689, the protection logic 2666 may change the first salt Salt1 to the second salt Salt2. At operation 2694, the protection logic 2666 may encrypt the combined data 2658 and Salt2 using the second KPIO key 2698 to generate the data protected with the second protection scheme 2664 which the parent controller 2616A may send to the host 2602.

Figure 27:
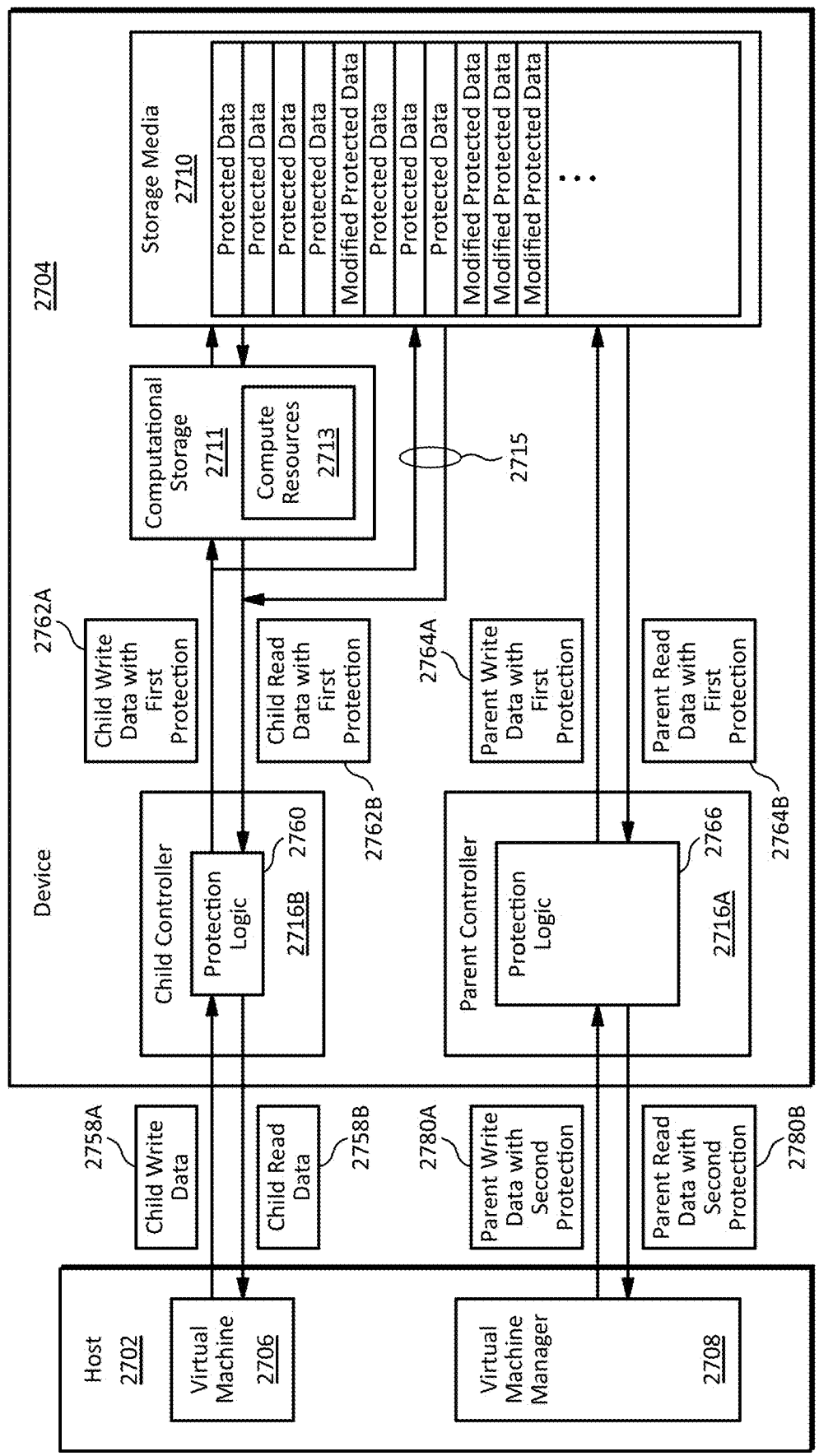
FIG. 27 illustrates an embodiment of a data protection scheme for a data transfer operation in which a device functionality circuit may modify data in accordance with example embodiments of the disclosure.

FIG. 27 illustrates an embodiment of a data protection scheme for a data transfer operation in which a device functionality circuit may modify data in accordance with example embodiments of the disclosure. The embodiment illustrated in FIG. 27 may include one or more elements that may be similar to elements illustrated in FIG. 12 and/or FIG. 13 in which similar elements may be indicated by reference numbers ending in, and/or containing, the same digits, letters, and/or the like.

In the embodiment illustrated in FIG. 27, however, a device functionality circuit may be implemented with storage media 2710 and/or computational storage apparatus 2711 which may modify data written to the storage media 2710, for example, using one or more compute resources 2713. Thus, depending on the implementation details, data read from the storage media 2710 may be different from data written to the storage media 2710. Additionally, or alternatively, the computational storage apparatus 2711 may include one or more controllers (e.g., an additional or alternative child controller such as child controller 2716B).

For example, protection logic 2760 at child controller 2716B may receive child write data 2758A from virtual machine 2706 at host 2702. The protection logic 2760 may apply a first protection scheme (e.g., encoding, encrypting, and/or the like) to the child write data 2758A to generate child write data with the first protection scheme 2762A which the child controller 2716B may write, using data path 2715 to an address in storage media 2710. However, the computational storage apparatus 2711 may perform one or more operations (e.g., computations) on the protected data stored at the address in storage media 2710. Thus, when the child controller 2716B reads the child read data with the first protection scheme 2762B from the same address in storage media 2710, it may be different from the child write data with the first protection scheme 2762A that was written to that address. The protection logic 2760 may modify (e.g., remove, replace, alter, and/or the like) the first protection scheme applied to the child read data 2762B (e.g., decoding, decrypting, and/or the like) to generate child read data 2758B, which, depending on the implementation details, may be different from the child write data 2758A. The child controller 2716B may send the child read data 2758B to the virtual machine 2706.

In some embodiments, protection logic 2766 at parent controller 2716A may exchange, convert, replace, translate, and/or the like, between a first protection scheme and a second protection scheme in a manner that, in some aspects, may be similar to embodiment illustrated in FIG. 13. For example, the parent controller 2716A may receive parent write data with a second protection scheme 2780A from virtual machine manager 2708 at host 2702, remove the second protection scheme and apply the first protection scheme to the parent write data to generate the parent write data with the first protection scheme 2764A which the parent controller 2716A may write to a storage address in the storage media 2710.

However, in the embodiment illustrated in FIG. 27, the computational storage apparatus 2711 may perform one or more operations (e.g., computations) on the protected data stored at that address in storage media 2710. Thus, when the parent controller 2716A reads parent read data with the first protection scheme 2764B from an address in storage media 2710, it may be different from the parent write data with the first protection scheme 2764A and/or child write data with the first protection scheme 2762A that may have been written to that address.

The protection logic 2766 may remove the first protection scheme and apply the second protection scheme to generate that parent read data with the second protection scheme 2780B which the parent controller 2716A may send to the virtual machine manager 2708 at host 2702.

In some embodiments, the first protection scheme and the second protection scheme may be the same. For example, in such an embodiment, the protection logic 2766 may use one or more pass-through paths (which may be similar, for example, to the pass-through path 1276 illustrated in FIG. 12) to pass the parent read data with the first protection scheme 2764B to the virtual machine manager 2708 (e.g., directly to the virtual machine manager 2708) as the parent read data with the second protection scheme 2780B. Similarly, in such an embodiment, the protection logic 2766 may use a pass-through path to pass the parent write data with the second protection scheme 2780A from virtual machine manager 2708 to the storage media 2710 (e.g., directly to the storage media 2710) as the parent write data with the first protection scheme 2764A.

Although not limited to any specific applications, the embodiment illustrated in FIG. 27 may be used, for example, to implement a computational storage scheme that may enable homomorphic computation (e.g., computation that may be performed on data in an encrypted state). In some example embodiments, the first protection scheme may be implemented with homomorphic encryption, whereas the second protection scheme may be implemented with another type of encryption that may be more suitable for transferring data across a communication fabric between the host 2702 and the device 2704. In some embodiments, the homomorphic encryption may enable the compute resources 2713 to perform one or more operations (e.g., computations) on encrypted data stored in storage media 2710 without decrypting the data. For example, the compute resources 2713 may read protected (e.g., encrypted) data from one or more storage addresses in storage media 2710, perform one or more operations (e.g., calculations) on the protected data, and store modified protected data (e.g., an encrypted result) at one or more of the same and/or different addresses in storage media 2710.

In some embodiments, the second protection scheme may be implemented, for example, with a relatively stronger type of protection such as a post-quantum cryptography (PQC) scheme. In some embodiments, a PQC scheme may be implemented with a type of encryption that may be strong enough to withstand an attack by a quantum computer. Thus, in some embodiments, the first protection scheme may be implemented with homomorphic encryption within a relatively secure environment inside the device 2704, whereas the second protection scheme may be implemented with PQC to provide relatively stronger protection for data transferred using a relatively less secure communication fabric between the host 2702 and the device 2704. In some embodiments, a PQC encryption scheme may be implemented with an encryption engine that may be different, separate, and/or the like, from one or more forms of protection logic described herein.

One or more of the aspects of the disclosure described with respect to FIG. 27 may be combined with any of the other aspects disclosed herein. For example, in some embodiments, the first and/or second protection scheme used in the embodiment illustrated in FIG. 27 may be implemented with one or more encryption schemes, salt schemes, KPIO schemes, and/or the like, or a combination thereof, described above with respect to the embodiments illustrated in FIGS. 16 through 25.

Figure 28:
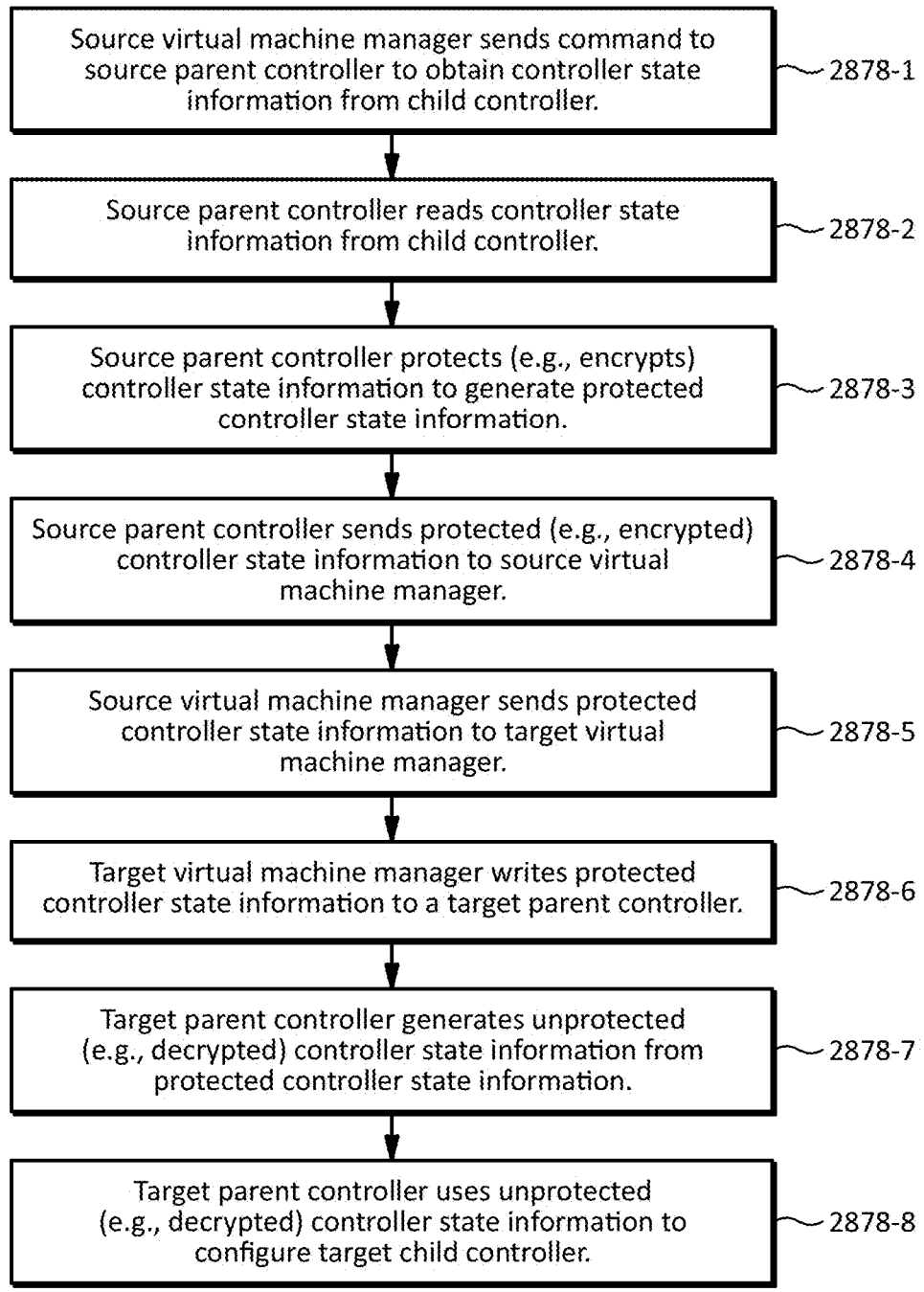
FIG. 28 illustrates an embodiment of a method for data protection for a controller state migration operation in accordance with example embodiments of the disclosure.

FIG. 28 illustrates an embodiment of a method for data protection for a controller state migration operation in accordance with example embodiments of the disclosure. For purposes of illustration, the embodiment illustrated in FIG. 28 may be described in the context of an embodiment in which the host 1402 illustrated in FIG. 14 may be used to implement the source host 1000-S and/or target host 1002-T illustrated in FIG. 10, and/or the device 1404 illustrated in FIG. 14 may be used to implement the source device 1004-S and/or target device 1004-T illustrated in FIG. 10. However, the embodiment illustrated in FIG. 28 is not limited to the implementation details illustrated in FIG. 10 and/or FIG. 14.

The method may begin at operation 2878-1 where a source virtual machine manager 1008-S (which may be referred to as a live migration server) may send a command to the source parent controller 1016A (which may be referred to as a live migration controller) instructing the source parent controller 1016A to obtain controller state information (which may be referred to as metadata) from the child controller 1016B-S. At operation 2878-2, the source parent controller 1016A may read the controller state information 1470 from the child controller 1016B-S. At operation 2878-3, the source parent controller 1016A may protect (e.g., encrypt) the controller state information 1470 using protection logic 1472 to generate protected controller state information 1474. At operation 2878-4, the source parent controller 1016A may send the protected (e.g., encrypted) controller state information 1474 to the source virtual machine manager 1008-S.

At operation 2878-5, the source virtual machine manager 1008-S may send the protected controller state information 1474 to a target virtual machine manager 1008-T which may be located, for example, at a different location in a data center, in a different data center, and/or the like. At operation 2878-6, the target virtual machine manager 1008-T may write the protected controller state information 1474 to a target parent controller 1016A-T. At operation 2878-7, the target parent controller 1016A-T may generate unprotected (e.g., decrypted) controller state information 1470 from the protected controller state information 1474 using protection logic 1472. At operation 2878-8, the target parent controller 1016A-T may use the unprotected (e.g., decrypted) controller state information 1470 to configure the target child controller 1016B-T (e.g., by populating the target child controller 1016B-T with the unprotected (e.g., decrypted) controller state information 1470.

Depending on the implementation details, the method illustrated in FIG. 28 may enable the state of a child controller to be transferred from a source system to a target system while reducing or eliminating security exposure of the controller state information. In some embodiments, a header (e.g., for an encrypted controller state information packet) may be used to describe the version, the general contents, and/or the like of the controller state information.

Figure 29:
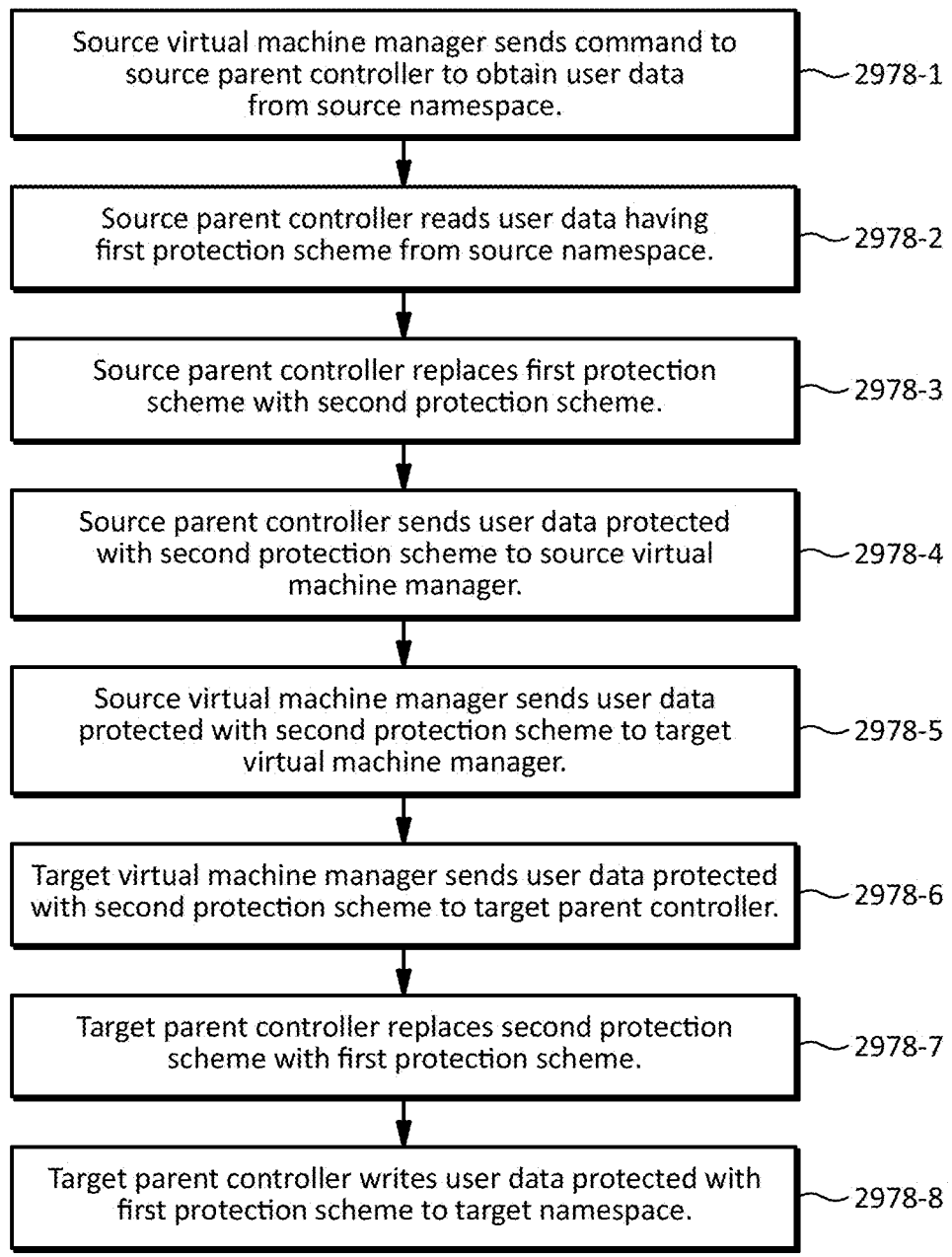
FIG. 29 illustrates an embodiment of a method for data protection for a data migration operation in accordance with example embodiments of the disclosure.

FIG. 29 illustrates an embodiment of a method for data protection for a data migration operation in accordance with example embodiments of the disclosure. For purposes of illustration, the embodiment illustrated in FIG. 29 may be described in the context of an embodiment in which the host 1302 illustrated in FIG. 13 may be used to implement the source host 1000-S and/or target host 1002-T illustrated in FIG. 10, and/or the device 1304 illustrated in FIG. 13 may be used to implement the source device 1004-S and/or target device 1004-T illustrated in FIG. 10. However, the embodiment illustrated in FIG. 29 is not limited to the implementation details illustrated in FIG. 10 and/or FIG. 13.

The method may begin at operation 2978-1 where a source virtual machine manager 1008-S (which may be referred to as a live migration server) may send a command to the source parent controller 1016A (which may be referred to as a live migration controller) instructing the source parent controller 1016A to obtain user data from the source namespace (e.g., Namespace 1-S). At operation 2978-2, the source parent controller 1016A may read user data (e.g., user data having a first protection scheme 1364 as illustrated in FIG. 13) from the source namespace. At operation 2978-3, the source parent controller 1016A may replace the first protection scheme with a second protection scheme (e.g., using protection logic 1372) to generate user data 1058 having a second protection scheme (e.g., user data having a second protection scheme 1380 in FIG. 13).

At operation 2978-4, the source parent controller 1016A may send the user data protected with the second protection scheme to the source virtual machine manager 1008-S. At operation 2978-5, the source virtual machine manager 1008-S may send the user data 1058 protected with the second protection scheme to a target virtual machine manager 1008-T which may be located, for example, at a different location in a data center, in a different data center, and/or the like. At operation 2978-6, the target virtual machine manager 1008-T may send the user data protected with the second protection scheme (e.g., 1380 in FIG. 13) to a target parent controller 1016A-T. At operation 2978-7, the target parent controller 1016A-T may replace the second protection scheme with the first protection scheme (e.g., using protection logic 1366 in FIG. 13) to generate user data protected with the first protection scheme (e.g., 1364 in FIG. 13). At operation 2978-8, the target parent controller 1016A-T may write the user data protected with the first protection scheme (e.g., 1364 in FIG. 13) to the target namespace (e.g., Namespace 1-T).

For purposes of illustration, the method illustrated in FIG. 29 may be described in the context of an embodiment in which the host 1302 illustrated in FIG. 13 may be used to implement the source host 1000-S and/or target host 1002-T illustrated in FIG. 10, and/or the device 1304 illustrated in FIG. 13 may be used to implement the source device 1004-S and/or target device 1004-T illustrated in FIG. 10. In some other embodiments, the host 1202 illustrated in FIG. 12 may be used to implement the source host 1000-S and/or target host 1002-T illustrated in FIG. 10, and/or the device 1204 illustrated in FIG. 12 may be used to implement the source device 1004-S and/or target device 1004-T illustrated in FIG. 10. In such an embodiment, one or more of the parent controllers 1016A-S and/or 1016A-T (e.g., 1216A in FIG. 12) may include protection logic (e.g., 1266 in FIG. 12) that may pass protected data using a pass-through path (e.g., 1276 in FIG. 12).

Some data migration schemes in accordance with example embodiments of the disclosure may use one or more techniques to implement compatible protection (e.g., encryption and/or decryption) at source and/or target systems. For example, some embodiments may implement a common encryption engine type (e.g., Advanced Encryption Standard (AES) 128, 256, and/or the like) with a mode (e.g., a mode that may use an exclusive OR (XOR) such as XOR Encrypt XOR (XEX), XEX Tweakable Block Cipher with Ciphertext Stealing (XTS), Galois/Counter Mode (GCM), cipher-block chaining (CBC), and/or the like), tweak, salt (e.g., using an LBA appended to data being encrypted), key per I/O, and/or the like, throughout some or all of an implementation. Such an embodiment may be implemented, for example, by assuming, requiring, and/or the like, one or more systems to use the same or compatible encryption technique. Additionally, or alternatively, an embodiment may be implemented with a description (e.g., a standardized description) that may specify, for one or more devices, one or more encryption capabilities, one or more options for one or more of the encryption capabilities, and/or one or more capabilities for the one or more devices (e.g., an encryption engine type, capability, mode (e.g., key per I/O), options, and/or the like). In some embodiments, a user (e.g., a host) may perform a check for encryption compatibility of a device that may communicate with the user, accept operations with compatible devices, and/or deny operations with incompatible devices.

As another example, in some embodiments, one or more protection (e.g., encryption) techniques may be implemented with hardware (e.g., an FPGA, ASIC, and/or the like), software, firmware, and/or the like, or a combination thereof, for example, to enable a protection technique used by a device to be changed, reconfigured, and/or the like. Depending on the implementation details, such an embodiment may provide increased compatibility between different devices (e.g., from different vendors). As a further example, different protection (e.g., encryption) techniques may be used for user data and/or controller state information. Thus, for example, referring to FIG. 14, a first encryption technique may be used by the protection logic 1460 for user data 1462 sent to Namespace 1, whereas a second different encryption technique may be used by the protection logic 1472 for controller state information 1474. In some example embodiments, one or more of the protection logic 1160, 1260, 1360, 1460, 1166, 1266, 1466, 1372, and/or 1472 may be implemented with an encryption and/or decryption engine (e.g., a commercially available encryption and/or decryption engine) that may be controlled, configured (e.g., for a specific type and/or mode of encryption and/or decryption), and/or the like, by a supervisory circuit (e.g., a processor, logic circuit, and/or the like), for example, under the control of software, firmware, and/or the like.

Any of the functionality disclosed herein, including, for example, any of the controllers, processing paths, protection logic, or any other logic and/or functionality implemented at a host, a device, and/or the like, may be implemented with hardware, software, firmware, or any combination thereof including combinational logic, sequential logic, one or more timers, counters, registers, and/or state machines, one or more complex programmable logic devices CPLDs, FPGAs, ASICs, central processing units (CPUs) such as complex instruction set computer (CISC) processors (e.g., x86 processors) and/or reduced instruction set computer (RISC) processors such as ARM processors, graphics processing units (CPUs), neural processing units (NPUs), tensor processing units (TPUs), data processing units (DPUs), and/or a combination thereof. In some embodiments, one or more components may be implemented as a system-on-chip (SOC). In some embodiments, and depending on the context, the terms logic, circuit, device, and/or the like, may be used interchangeably.

In some embodiments, and depending on the implementation details, a namespace identification scheme in accordance with example embodiments of the disclosure may implement any number of the following features and/or provide any number of the following benefits. A local namespace identifier may be used by one or more child controllers (e.g., secondary controllers) for normal input and/or output (I/O) operations. For example, one or more submission queue entries (SQEs) may use a local namespace identifier (e.g., at all times). A global namespace identifier may be used by one or more parent controllers (e.g., a parent controller that may be indicated as PF0). In some embodiments, one or more promoted secondary controllers (e.g., a virtual function and/or a physical function may also use a global namespace identifier. In some embodiments, one or more promoted secondary controllers may use one or more global namespace identifiers, for example, with one or more administrative queues. One or more I/O queues for these controllers may use a particular child controller's local namespace identifier. For example, a promoted secondary controller may read and/or write and use one or more normal I/O non-volatile memory (NVM) submission queues (SQs) for their own attached storage space. In some embodiments, one or more promoted secondary controllers may use an administrative queue (and in some embodiments may not use one or more hardware accelerations) to perform one or more operations with another controller's stored data. In other embodiments, a promoted secondary controller may use (e.g., always use) a global namespace identifier. Depending on the implementation details, this utilization of a global namespace identifier may enable a hardware automation path of the parent and/or promoted controllers to access namespaces (NSes) of the children controller at hardware accelerated speeds. Depending on the implementation details, this may result in reads and/or writes of child namespace data that may be unimpeded and still correct to a corresponding global namespace identifier. In some embodiments, a namespace identification scheme in accordance with example embodiments of the disclosure may be used for some, most, or every access, for example, during a migration operation.

Figure 30:
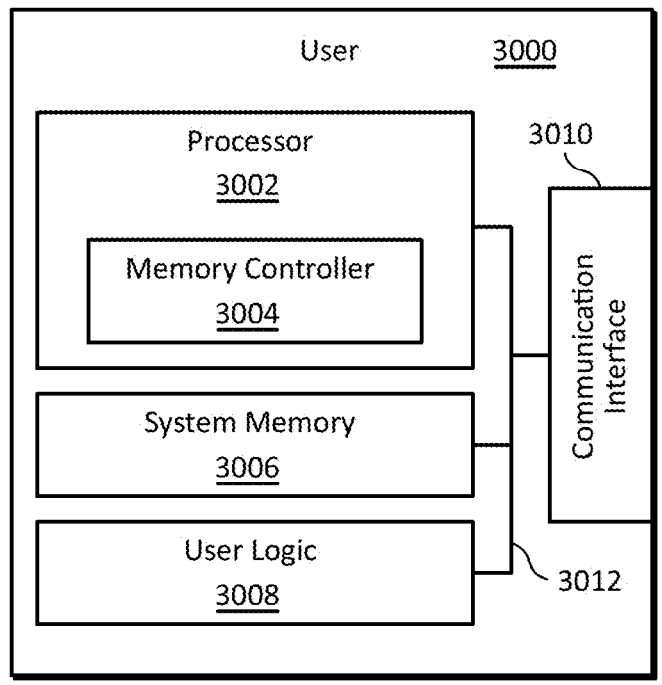
FIG. 30 illustrates an example embodiment of a user apparatus in accordance with example embodiments of the disclosure.

FIG. 30 illustrates an example embodiment of a user apparatus in accordance with example embodiments of the disclosure. The user apparatus illustrated in FIG. 30 may be used, for example, to implement any of the user functionality relating to namespace identifier schemes, data protection schemes, data migration schemes, and/or the like, disclosed herein. The user apparatus 3000 illustrated in FIG. 30 may be implemented with a host, another device, and/or the like. A host may be implemented, for example, with any component or combination of components including one or more of a client device, a server, a storage node, a CPU, a personal computer, a tablet computer, a smartphone, and/or the like.

The user apparatus 3000 illustrated in FIG. 30 may include a processor 3002, which may include a memory controller 3004, a system memory 3006, user logic 3008, and/or a communication interface 3010. Any or all of the components illustrated in FIG. 30 may communicate through one or more system buses 3012. In some embodiments, one or more of the components illustrated in FIG. 30 may be implemented using other components. For example, in some embodiments, the user logic 3008 may be implemented by the processor 3002 executing instructions stored in the system memory 3006 or other memory. In some embodiments, the host logic 3008 may implement any of the user functionality disclosed herein including, for example, one or more hosts, virtual machines, virtual machine managers, and/or the like, that may use a namespace identification scheme, data protection (e.g., encryption), data migration, and/or the like, in accordance with example embodiments of the disclosure.

Figure 31:
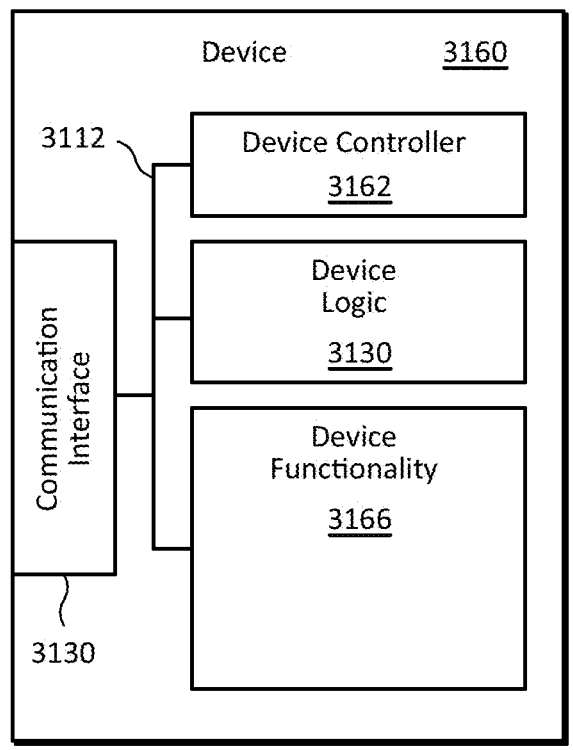
FIG. 31 illustrates an example embodiment of a device in accordance with example embodiments of the disclosure.

FIG. 31 illustrates an example embodiment of a device in accordance with example embodiments of the disclosure. The embodiment illustrated in FIG. 31 may be used to implement any of the device functionality relating to namespace identification, data protection, data migration, and/or the like, disclosed herein. The device 3100 may include a device controller 3102, device logic 3116, a device functionality circuit 3106, and a communication interface 3110. The components illustrated in FIG. 31 may communicate through one or more device buses 3112.

The device functionality circuit 3106 may include any hardware to implement the primary function of the device 3100. For example, if the device 3100 is implemented as a storage device, the device functionality circuit 3106 may include a storage medium such as one or more flash memory devices, an FTL, and/or the like. As another example, if the device 3100 is implemented as a network interface card (NIC), the device functionality circuit 3106 may include one or more modems, network interfaces, physical layers (PHYs), medium access control layers (MACs), and/or the like. As a further example, if the device 3100 is implemented as an accelerator, the device functionality circuit 3106 may include one or more accelerator circuits, memory circuits, and/or the like.

In some embodiments, any of the device functionality (e.g., device resources) implemented with the device functionality circuit 3106 may be configured as one or more namespaces. In some embodiments, the device logic 3116 may be used to implement any of the functionality disclosed relating to namespace identification disclosed herein including, for example, implementing a controller that may access a namespace based on receiving a global and/or local namespace identifier as illustrated, for example, with respect to FIG. 2, FIG. 3, and/or FIG. 4, processing a namespace as illustrated, for example, with respect to FIG. 6 and/or FIG. 7, and/or the like. In some embodiments, the device logic 3116 may be used to implement any of the functionality disclosed relating to data protection (e.g., encryption), data migration, and/or the like, disclosed herein including, for example, implementing a controller that may send migration data (e.g., user data, controller state information, and/or the like) in a protected form as illustrated, for example, with respect to FIGS. 10 through 26.

Figure 32:
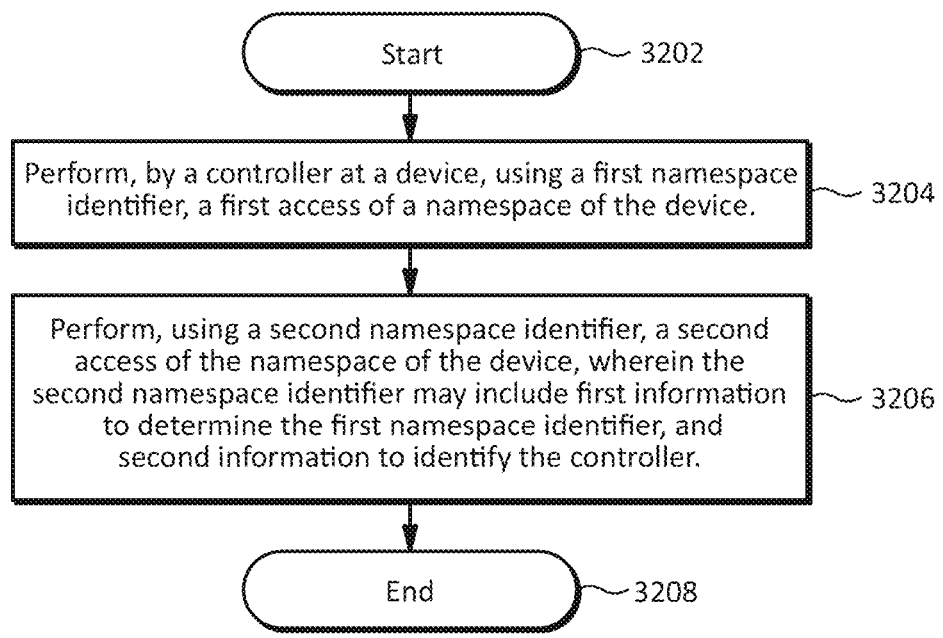
FIG. 32 illustrates an embodiment of a method for accessing a namespace in accordance with example embodiments of the disclosure.

FIG. 32 illustrates an embodiment of a method for accessing a namespace in accordance with example embodiments of the disclosure. The method may begin at operation 3202. At operation 3204, the method may perform, by a controller at a device, using a first namespace identifier, a first access of a namespace of the device. The controller may be implemented, for example, by a child controller such as child controller 216B, 316B, and/or 416B as illustrated in FIG. 2, FIG. 3, and/or FIG. 4. The first namespace identifier may be implemented, for example, with a local namespace identifier such as local namespace identifier 214B, 314B, and/or 414B as illustrated in FIG. 2, FIG. 3, and/or FIG. 4. At operation 3206, the method may perform, using a second namespace identifier, a second access of the namespace of the device. the second access may be performed, for example, by a parent controller such as parent controller 216A, 316A, and/or 416A as illustrated in FIG. 2, FIG. 3, and/or FIG. 4.

The second namespace identifier may include first information to determine the first namespace identifier, and second information to identify the controller. For example, the first and second information may be implemented with the local namespace identifier, and a controller identifier may be implemented with a controller identifier 2176, 317B, and/or 417B illustrated in FIG. 2, FIG. 3, and/or FIG. 4, respectively. The method may end at operation 3208.

Figure 33:
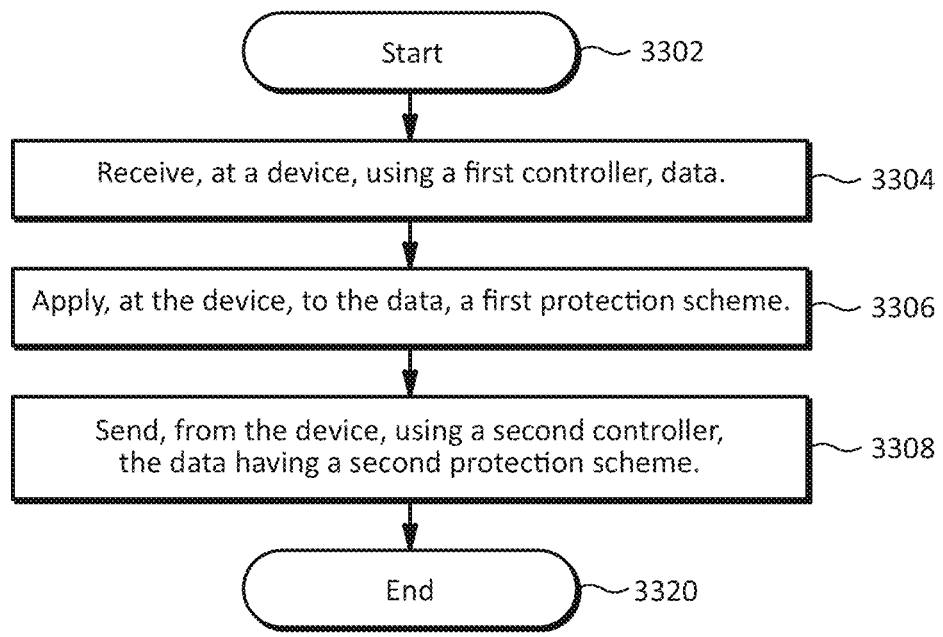
FIG. 33 illustrates an embodiment of a method for protecting data for a data transfer operation in accordance with example embodiments of the disclosure.

FIG. 33 illustrates an embodiment of a method for protecting data for a data transfer operation in accordance with example embodiments of the disclosure. The method may begin at operation 3302. At operation 3304, the method may receive, at a device, using a first controller, data. For example, a child controller such as child controller 1216B may receive data 1258 as illustrated in FIG. 12. At operation 3306, the method may apply, at the device, to the data, a first protection scheme. For example, the child controller 1216B illustrated in FIG. 12 may apply one or more of the first protection schemes (e.g., encryption, salt, and/or the like)

illustrated in FIGS. 16-25. At operation 3308, the method may send, from the device, using a second controller, the data having a second protection scheme. For example, the parent controller 1216A may send the data protected with the second protection scheme 1264 as illustrated in FIG. 12. The method may end at operation 3310.

The embodiments illustrated in FIG. 32 and FIG. 33, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

Some embodiments disclosed above have been described in the context of various implementation details, but aspects of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to a block may refer to the entire block or one or more subblocks. The use of terms such as "first" and "second" in this disclosure and the claims may only be for purposes of distinguishing the elements they modify and may not indicate any spatial or temporal order unless apparent otherwise from context. In some embodiments, a reference to an element may refer to at least a portion of the element, for example, "based on" may refer to "based at least in part on," and/or the like. A reference to a first element may not imply the existence of a second element. The aspects disclosed herein have independent utility and may be embodied individually, and not every embodiment may utilize every aspect. However, aspects of the disclosure may also be embodied in various combinations, some of which may amplify the benefits of the individual aspects in a synergistic manner. The various details and embodiments described above may be combined to produce additional embodiments according to aspects of this patent disclosure.

Since the inventive principles of this patent disclosure may be modified in arrangement and detail without departing from the inventive concepts, such changes and modifications are considered to fall within the scope of the following claims.

The invention claimed is:

1. An apparatus comprising:
a device comprising:
a first controller; and
a second controller;
wherein the device is configured to:
receive, using the first controller, data;
apply a first protection scheme to the data to generate first data;
store the first data to a storage media;
receive, from the storage media, using the second controller, the first data;
decrypt, using the second controller, the first data to generate second data; and
send, from the device, using the second controller, the second data having a second protection scheme.

2. The apparatus of claim 1, wherein the first protection scheme and the second protection scheme are the same.

3. The apparatus of claim 1, wherein the second controller is configured to apply, to the data, the second protection scheme.

4. The apparatus of claim 1, wherein the first protection scheme comprises a salt.

5. The apparatus of claim 4, wherein the salt is a first salt, and the second protection scheme comprises a second salt.

6. The apparatus of claim 5, wherein:
the first salt is determined by the device; and
the second salt is determined by a user.

7. The apparatus of claim 6, wherein the first protection scheme is based on a first key associated with a first request and a second key associated with a second request.

8. The apparatus of claim 1, wherein the first protection scheme is based on a first key associated with a first request and a second key associated with a second request.

9. The apparatus of claim 1, wherein:
the first protection scheme comprises a first type of encryption; and
the second protection scheme comprises a second type of encryption.

10. The apparatus of claim 1, wherein the device is configured to apply, to controller state information for the first controller, a third protection scheme to generate controller state information having the third protection scheme.

11. The apparatus of claim 10, wherein the second controller is configured to send, from the device, the controller state information having the third protection scheme.

12. The apparatus of claim 11, wherein the third protection scheme is the same as the first protection scheme or the second protection scheme.

13. The apparatus of claim 1, wherein the device is configured to:
receive, using the second controller, the second data having the second protection scheme; and
apply the first protection scheme to the second data.

14. A method comprising:
receiving, at a device, using a first controller, data;
applying, at the device, to the data, a first protection scheme to generate first data;
storing the first data to a storage media;
receiving, from the storage media, using a second controller, the first data;
decrypting, using the second controller, the first data to generate second data; and
sending, from the device, using the second controller, the second data having a second protection scheme.

15. The method of claim 14, wherein the first protection scheme and the second protection scheme are the same.

16. The method of claim 14, further comprising applying, at the device, to the data, the second protection scheme.

17. The method of claim 14, further comprising:
applying, at the device, to controller state information for the first controller, a third protection scheme to generate controller state information having the third protection scheme.

18. The method of claim 17, further comprising sending, from the device, using the second controller, the controller state information having the third protection scheme.

19. An apparatus comprising:
a device comprising:
   a first controller; and
   a second controller;
wherein the device is configured to:
   receive, using the first controller, first data;
   apply, to the first data, a first protection scheme;
   store the first data to a storage media;
   receive, from the storage media, using the second controller, the first data;
   generate, based on the first data, second data; and
   send, from the device, using the second controller, the second data having a second protection scheme.

20. The apparatus of claim 19, wherein the device is configured to:
generate the first data having the first protection scheme; and
generate the second data having the second protection scheme by performing an operation on the first data having the first protection scheme.

\* \* \* \* \*